United States Patent
Suenaga et al.

(10) Patent No.: US 9,959,451 B2
(45) Date of Patent: May 1, 2018

(54) IMAGE INSPECTION DEVICE, IMAGE INSPECTION METHOD AND IMAGE INSPECTION PROGRAM

(71) Applicant: Keyence Corporation, Osaka (JP)

(72) Inventors: Tsuyoshi Suenaga, Osaka (JP); Shinya Takahashi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days. days.

(21) Appl. No.: 15/208,628

(22) Filed: Jul. 13, 2016

(65) Prior Publication Data

US 2017/0032177 A1 Feb. 2, 2017

(30) Foreign Application Priority Data

Jul. 30, 2015 (JP) .................. 2015-151260

(51) Int. Cl.
| | |
|---|---|
| *G06K 9/00* | (2006.01) |
| *G06T 7/00* | (2017.01) |
| *G06T 7/40* | (2017.01) |
| *G06T 7/60* | (2017.01) |
| *G06T 7/30* | (2017.01) |
| *G06T 7/70* | (2017.01) |
| *G06K 9/62* | (2006.01) |

(52) U.S. Cl.
CPC ....... *G06K 9/00208* (2013.01); *G06K 9/6202* (2013.01); *G06T 7/001* (2013.01); *G06T 7/30* (2017.01); *G06T 7/40* (2013.01); *G06T 7/60* (2013.01); *G06T 7/70* (2017.01); *G06T 2207/10016* (2013.01); *G06T 2207/10056* (2013.01); *G06T 2207/10148* (2013.01)

(58) Field of Classification Search
None
See application file for complete search history.

(56) References Cited

U.S. PATENT DOCUMENTS

| | | | |
|---|---|---|---|
| 7,982,779 B2 * | 7/2011 | Saeki | ............... G01N 21/9501 348/218.1 |
| 8,743,374 B2 | 6/2014 | Nakatsukasa | |
| 8,885,176 B2 | 11/2014 | Tabuchi | |

(Continued)

FOREIGN PATENT DOCUMENTS

| | | |
|---|---|---|
| JP | H11-132740 A | 5/1999 |
| JP | 2010-169584 A | 8/2010 |

*Primary Examiner* — Delomia L Gilliard
(74) *Attorney, Agent, or Firm* — Kilyk & Bowersox, P.L.L.C.

(57) ABSTRACT

Provided is an image inspection device, an image inspection method and an image inspection program which are capable of easily and accurately inspecting a shape of an inspection target. In a setting mode, positioning image data of a setting target placed on a stage is registered. In an inspection mode, a positioning image is displayed on a display part based on the positioning image data. An image for positioning of the inspection target placed on the stage is displayed in the display part. Thereafter, image data for alignment of the inspection target is acquired, and then aligned to image data for alignment of the setting target. A size in a height direction of a measurement target place of the inspection target is measured based on the aligned height image data, to determine Pass/Fail of the inspection target. The determined determination result is displayed on the display unit.

15 Claims, 47 Drawing Sheets

(56) References Cited

U.S. PATENT DOCUMENTS

| | | |
|---|---|---|
| 9,151,600 B2 | 10/2015 | Nakatsukasa |
| 9,291,450 B2 * | 3/2016 | Takahashi .............. G01B 11/24 |
| 9,638,910 B2 * | 5/2017 | Oba ....................... G02B 21/06 |
| 2014/0071243 A1 * | 3/2014 | Nakatsukasa .......... G01B 11/24 348/46 |
| 2014/0071458 A1 * | 3/2014 | Nakatsukasa .......... G01B 11/25 356/603 |
| 2014/0078498 A1 * | 3/2014 | Ikushima ............... G01N 21/88 356/237.1 |
| 2015/0055823 A1 * | 2/2015 | Kotake ................ G01N 21/956 382/103 |
| 2015/0221077 A1 * | 8/2015 | Kawabata ................ G06T 7/001 382/141 |
| 2015/0355103 A1 * | 12/2015 | Ando ................ G01N 21/8851 348/46 |
| 2015/0355104 A1 * | 12/2015 | Matsuda ............ G01N 21/8806 356/237.2 |
| 2015/0358602 A1 * | 12/2015 | Mayumi ............ G01N 21/8803 348/46 |
| 2017/0030706 A1 | 2/2017 | Natori et al. |
| 2017/0098300 A1 * | 4/2017 | Mayumi ................ G06T 7/0004 |
| 2017/0148153 A1 * | 5/2017 | Nakao ................ G06K 9/4671 |
| 2017/0236269 A1 * | 8/2017 | Ando .................... G06T 7/0004 |

\* cited by examiner

IMAGE INSPECTION DEVICE, IMAGE INSPECTION METHOD AND IMAGE INSPECTION PROGRAM

CROSS-REFERENCE TO RELATED APPLICATIONS

The present application claims foreign priority based on Japanese Patent Application No. 2015-151260, filed Jul. 30, 2015, the contents of which is incorporated herein by reference.

BACKGROUND OF THE INVENTION

1. Field of the Invention

The present invention relates to an image inspection device, an image inspection method and an image inspection program which perform inspection of an inspection target based on image data.

2. Description of Related Art

There has been an image measurement device capable of measuring a shape of a target based on image data obtained by capturing an image of the target (e.g., see JP H11-132740A, JP 2010-169584 A). In the image measurement device, for example, an image of a target placed on a stage is captured by an imaging device disposed above the stage. The shape of the target is measured based on image data obtained by imaging.

The shape of the target is measured using the image measurement device to determine whether or not the measurement result is within a permissible range (tolerance), thereby enabling inspection of the target.

In each of the image measurement devices described in JP 1111-132740 A and JP 2010-169584 A, the shape of the target is measured based on image data corresponding to a two-dimensional image.

Meanwhile, in recent years, an image measurement device of a triangular ranging system has been proposed. In the image measurement device of the triangular ranging system, the surface of a target placed on a stage is irradiated with light, and the reflected light is received by a light receiving element having one-dimensionally or two-dimensionally arranged pixels. The height of the surface of the target can be measured based on a peak position of a light reception amount distribution obtained by the light receiving element. This enables inspection of the height of the target as well.

Here, an area on the surface of the target, where the height is measurable by the image measurement device of the triangular ranging system, changes in accordance with a direction of the light with which the target is irradiated. For this reason, when a plurality of targets are placed on the stage in different positions and postures, there may occur variations in height-measurable area among the plurality of targets. Accordingly, if variations in actually measured portion occur among the plurality of targets, accurate inspection cannot be performed.

SUMMARY OF THE INVENTION

It is an object of the present invention to provide an image inspection device, an image inspection method and an image inspection program which are capable of easily and accurately inspecting a shape of an inspection target.

(1) According to one embodiment of the invention, an image inspection device includes: a stage on which a measurement target is to be placed; a first image data acquisition unit for acquiring first image data representing a texture image of the surface of the measurement target placed on the stage; a second image data acquisition unit for acquiring second image data representing a height image of the surface of the measurement target placed on the stage; a control unit for performing control operation in a setting mode to make setting for inspection and in an inspection mode to perform inspection; and a display unit. The control unit includes a first acquisition command unit for giving a command to the first or second image data acquisition unit to acquire first or second image data for positioning in a state where a setting target is placed as the measurement target on the stage in the setting mode, a first registration unit for registering positioning image data showing a position and a posture of the setting target based on the image data for positioning which is acquired by the command of the first acquisition command unit in the setting mode, a second acquisition command unit for giving a command to the first or second image data acquisition unit to acquire first or second image data for alignment in the state where the setting target is placed on the stage in the setting mode, a second registration unit for registering as reference image data the image data for alignment which is acquired by the command of the second acquisition command unit in the setting mode, a third acquisition command unit for giving a command to the second image data acquisition unit to acquire second image data for measurement in the state where the setting target is placed on the stage in the setting mode, a first measurement unit for measuring a size in a height direction of a measurement target portion of the setting target based on the second image data for measurement which is acquired by the command of the third acquisition command unit in the setting mode, an acceptance unit for accepting input of at least either value of a design value or a tolerance of the measurement target portion of the setting target in the setting mode, a first display command unit for giving a command to the display unit to display a positioning image based on the positioning image data registered by the first registration unit in the inspection mode, a fourth acquisition command unit for giving a command to the first or second image data acquisition unit to acquire first or second image data for positioning in a state where an inspection target is placed as the measurement target on the stage in the inspection mode, a second display command unit for giving a command to the display unit to display an image based on the image data for positioning which is acquired by the command of the fourth acquisition command unit in the inspection mode, a fifth acquisition command unit for giving a command to the first or second image data acquisition unit to acquire image data for alignment which corresponds to the reference image data registered by the second registration unit after the command by the first and second display command units in the state where the inspection target is placed on the stage in the inspection mode, a third registration unit for registering, as alignment image data, the image data for alignment which is acquired by the command of the fifth acquisition command unit in the inspection mode, a sixth acquisition command unit for giving a command to the second image data acquisition unit to acquire second image data for measurement in the state where the inspection target is placed on the stage in the inspection mode, an alignment unit for aligning the second image data acquired by the command of the sixth acquisition command unit by alignment of the alignment data and the reference image data by pattern matching in the inspection mode, a second measurement unit for measuring a size of a measurement target place of the inspection target which corresponds to a measurement target place of the setting target based on the second image data for measurement aligned by the alignment unit in the inspection mode, a determination unit for determining Pass/Fail of the inspection target based on the size measured by the first measurement unit, the size measured by the second measurement unit, and at least either value of the design value or the tolerance accepted by the acceptance unit in the inspection mode, and a third display command unit for giving a command to the display unit to display the determination result determined by the determination unit in the inspection mode.

In this image inspection device, control operation is performed in a setting mode to make setting for inspection and in an inspection mode to perform inspection. During the setting mode, a setting creator places a setting target as a measurement target on the stage. In the setting mode, first or second image data for positioning is acquired. Here, the first image data represents a texture image of the surface of the setting target, and the second image data represents a height image of the surface of the setting target. Based on the acquired image data for positioning, positioning image data showing a position and a posture of the setting target is registered. Next, first or second image data for alignment is acquired in a state where the setting target is placed on the stage. The acquired image data for alignment is registered as reference image data. Further, second image data for measurement is acquired in the state where the setting target is placed on the stage. Based on the acquired the second image data for measurement, a size in a height direction of a measurement target portion of the setting target is measured. Input of at least one value of a design value and a tolerance of the measurement target portion of the setting target is accepted.

During the inspection mode, an inspection operator places an inspection target as the measurement target on the stage. In the inspection mode, a positioning image is displayed on the display unit based on the registered positioning image data. First or second image data for positioning is acquired in a state where the inspection target is placed on the stage. An image is displayed on the display unit based on the acquired image data for positioning. In the state where the inspection target is placed on the stage, after the positioning image and the image of the inspection target are displayed on the display unit, image data for alignment which corresponds to the registered reference image data is acquired. The acquired image data for alignment is registered as alignment image data. Further, second image data for measurement is acquired in the state where the inspection target is placed on the stage. The alignment data and the reference image data are aligned by pattern matching, to thereby perform alignment of the second image data for measurement concerning the inspection target. A size of a measurement target place of the inspection target which corresponds to a measurement target place of the setting target is measured based on the aligned second image data for measurement. Pass/Fail of the inspection target is determined based on the size measured concerning the setting target, the size measured concerning the inspection target, and at least either value of the design value or tolerance accepted. The determined determination result is displayed on the display unit.

With this configuration, in the setting mode, the positioning image data showing the position and the posture of the setting target is registered. The positioning image based on the positioning image data shows the position and the posture of the setting target. In the setting mode, the positioning image data can be acquired in a state where the setting creator has adjusted the position and the posture of the setting target so as to prevent generation of a shade, multiple reflection of light, and the like in the measurement target portion of the setting target. In the inspection mode, the image data for positioning of the inspection target is acquired, and the image of the inspection target based on the image data for positioning is displayed on the display unit along with the positioning image. Thus, by viewing the image of the inspection target and the positioning image displayed on the display unit, the inspection operator can bring the position and the posture of the inspection target close to the position and the posture of the setting target at the time of placing the inspection target on the stage. Accordingly, even when the inspection operator is not a skilled operator, the position and the posture of the setting target can be adjusted so as to prevent generation of a shade, multiple reflection of light, and the like in the measurement target portion of the inspection target in the inspection mode.

Further, the image data for alignment concerning the inspection target which is acquired in the inspection mode is aligned with high accuracy to the image data for alignment concerning the setting target which is acquired in the setting mode. Hence the size of the measurement target portion of the inspection target, which corresponds to the measurement target portion of the setting target measured in the setting mode, can be measured with high accuracy in the inspection mode. Accordingly, even when the inspection operator is not a skilled operator, a size of a desired measurement target portion can be measured concerning a plurality of inspection targets in the inspection mode. As a result, it is possible to easily and accurately inspect the shape of the inspection target.

(2) The first registration unit may register a plurality of pieces of positioning image data respectively showing a plurality of portions of the setting target, or a plurality of pieces of positioning image data with mutually different magnifications, in the setting mode.

With this configuration, when a plurality of portions of the inspection target are to be inspected or the inspection target is to be inspected with mutually different magnifications in the inspection mode, the inspection operator can easily bring the position and the posture of the inspection target close to the position and the posture of the setting target.

(3) The image inspection device may further include a first operation unit that is operated for sequentially displaying on the display unit a plurality of positioning images registered by the first registration unit. The first display command unit may give a command to the display unit to sequentially display positioning images based on the plurality of pieces of positioning image data registered by the first registration unit on the basis of operation of the first operation unit in the inspection mode.

In this case, by sequentially viewing the plurality of positioning images displayed on the display unit, the inspection operator can adjust the position and the posture of the inspection target in stages. Hence it is possible to more accurately bring the position and the posture of the inspection target close to the position and the posture of the setting target.

(4) The control unit may further include a matching degree calculation unit for calculating a matching degree between the positioning image data registered by the first registration unit and the image data for positioning which is acquired by the command of the fourth acquisition command unit in the inspection mode, and a fourth display command unit for giving a command to the display unit to display a result of calculation by the matching degree calculation unit in the inspection mode.

In this case, by viewing the matching degree displayed on the display unit, the inspection operator can easily bring the position and the posture of the inspection target close to the position and the posture of the setting target at the time of placing the inspection target on the stage.

(5) The fourth display command unit may give a command to the display unit to display information showing a threshold concerning a predetermined matching degree.

In this case, by viewing the threshold concerning the matching degree displayed on the display unit, the inspection operator can recognize a permissible degree at the time of bringing the position and the posture of the inspection target close to the position and the posture of the setting target.

(6) The fourth acquisition command unit may give a command to the first image data acquisition unit to acquire, as live image data, first image data showing a temporal change of the inspection target placed on the stage in the inspection mode. The second display command unit may give a command to the display unit to display a live image overlapped with a positioning image in the inspection mode, the live image showing the temporal change of the inspection target based on the live image data acquired by the command of the fourth acquisition command unit.

In this case, by viewing an overlapping state of the live image and the positioning image displayed on the display unit, the inspection operator can easily bring the position and the posture of the inspection target close to the position and the posture of the setting target.

(7) The second acquisition command unit may give commands respectively to the first and second image data acquisition units to acquire first and second image data in the state where the setting target is placed on the stage in the setting mode. The image inspection device may further include a second operation unit which is operated for selecting either the first or second image data acquired by the command of the second acquisition command unit. The second registration unit may register, as the reference image data, image data selected by operation of the second operation unit in the setting mode.

In this case, it is possible to select either the first or second image data as the reference image data. Appropriately selecting the reference image data in accordance with the texture image of the surface of the inspection target and the height image of the surface thereof makes it possible to align with high accuracy the image data for alignment concerning the inspection target to the image data for alignment concerning the setting target. As a result, a size of a desired measurement target portion concerning a plurality of inspection targets can be measured with high accuracy.

(8) The control unit may further include a fifth display command unit for giving a command to the display unit to display at least one of a texture image based on the first image data and a height image based on the second image data acquired by the command of the second acquisition command unit in the setting mode.

In this case, at the time of selecting the reference image data to be registered in the setting mode, at least one image of the texture image based on the first image data and the height image based on the second image data is displayed on the display unit. This enables the setting creator to appropriately select the reference image data to be registered while viewing the image displayed on the display unit.

(9) The image inspection device may further include a third operation unit that is operated for specifying a search range for pattern matching. The alignment unit may align the alignment image data to the reference image data by pattern matching within the search range specified by operation of the third operation unit in the inspection mode.

In this case, since the search range for performing pattern matching is specified, the alignment image data can be aligned to the reference image data in a short period of time.

(10) The first and second image data acquisition units may be disposed so as to respectively acquire the first and second image data from a common axis.

In this case, the portion of the first image data and the portion of the second image data can be easily associated with each other. Hence it is possible to simplify the configuration for using both the first and second image data as the image data for positioning and the image data for alignment.

(11) The image inspection device may further include a fourth operation unit that is operated for specifying any reference plane in the second image data acquired by the second image data acquisition unit. The control unit may further include a fourth registration unit for registering the reference plane specified by operation of the fourth operation unit in the setting mode. The second image data acquisition unit may correct the acquired second image data such that a position of each portion on the surface of the measurement target represents a distance from the reference plane registered by the fourth registration unit in a direction orthogonal to the reference plane.

In this case, based on the corrected second image data, it is possible to easily recognize the position of each portion on the surface of the measurement target from the reference plane in the direction orthogonal to the reference plane.

(12) According to another embodiment of the invention, an image inspection method includes the steps of acquiring first image data representing a texture image of the surface of a setting target, or second image data representing a height image of the surface of the setting target, as image data for positioning in a state where the setting target is placed as a measurement target on a stage in a setting mode; registering positioning image data showing a position and a posture of the setting target based on the acquired image data for positioning in the setting mode, acquiring first or second image data for alignment in the state where the setting target is placed on the stage in the setting mode, registering as reference image data the acquired image data for alignment in the setting mode, acquiring second image data for measurement in the state where the setting target is placed on the stage in the setting mode, measuring a size in a height direction of a measurement target portion of the setting target based on the acquired second image data for measurement in the setting mode, accepting input of at least either value of a design value or a tolerance of the measurement target portion of the setting target in the setting mode, moving the stage or an inspection target to a position where second image data representing a height image of the surface of the inspection target can be acquired based on the registered positioning image data in a state where the inspection target is placed as the measurement target on the stage in an inspection mode, acquiring image data for alignment which corresponds to the registered reference image data after movement of the stage or the inspection target in the state where the inspection target is placed on the stage in the inspection mode, registering the acquired image data for alignment as alignment image data in the inspection mode, acquiring second image data for measurement in the state where the inspection target is placed on the stage in the inspection mode, aligning the second image data for measurement concerning the inspection target by alignment of the alignment data and the reference image data by pattern matching in the inspection mode, measuring a size of a measurement target place of the inspection target which corresponds to a measurement target place of the setting target based on the aligned second image data for measurement in the inspection mode, determining Pass/Fail of the inspection target based on the size measured concerning the setting target, the size measured concerning the inspection target, and at least either value of the design value or tolerance accepted in the inspection mode, and displaying the determined determination result on a display unit in the inspection mode.

According to this image inspection method, control operation is performed in a setting mode to make setting for inspection and in an inspection mode to perform inspection. During the setting mode, a setting creator places a setting target as a measurement target on the stage. In the setting mode, first or second image data for positioning is acquired. Here, the first image data represents a texture image of the surface of the setting target, and the second image data represents a height image of the surface of the setting target. Based on the acquired image data for positioning, positioning image data showing a position and a posture of the setting target is registered. Next, first or second image data for alignment is acquired in a state where the setting target is placed on the stage. The acquired image data for alignment is registered as reference image data. Further, second image data for measurement is acquired in the state where the setting target is placed on the stage. Based on the acquired the second image data for measurement, a size in a height direction of a measurement target portion of the setting target is measured. Input of at least one value of a design value and a tolerance of the measurement target portion of the setting target is accepted.

During the inspection mode, an inspection operator places an inspection target as the measurement target on the stage. In the inspection mode, the stage or the inspection target is moved to a position where the second image data representing the height image of the surface of the inspection target can be acquired in the state where the inspection target is placed on the stage. In the state where the inspection target is placed on the stage, after movement of the stage or the inspection target, image data for alignment which corresponds to the registered reference image data is acquired. The acquired image data for alignment is registered as alignment image data. Further, second image data for measurement is acquired in the state where the inspection target is placed on the stage. The alignment data and the reference image data are aligned by pattern matching, to thereby perform alignment of the second image data for measurement concerning the inspection target. A size of a measurement target place of the inspection target which corresponds to a measurement target place of the setting target is measured based on the aligned second image data for measurement. Pass/Fail of the inspection target is determined based on the size measured concerning the setting target, the size measured concerning the inspection target, and at least either value of the design value or tolerance accepted. The determined determination result is displayed on the display unit.

According to this method, in the setting mode, the positioning image data showing the position and the posture of the setting target is registered. The positioning image based on the positioning image data shows the position and the posture of the setting target. In the setting mode, the positioning image data showing the position and the posture of the setting target is registered. In the inspection mode, based on the registered positioning image data, it is possible to move the stage or the inspection target such that the position and the posture of the inspection target get close to the position and the posture of the setting target. Accordingly, even when the inspection operator is not a skilled operator, the position and the posture of the setting target can be adjusted so as to prevent generation of a shade, multiple reflection of light, and the like in the measurement target portion of the inspection target in the inspection mode.

Further, the image data for alignment concerning the inspection target which is acquired in the inspection mode is aligned with high accuracy to the image data for alignment concerning the setting target which is acquired in the setting mode. Hence the size of the measurement target portion of the inspection target, which corresponds to the measurement target portion of the setting target measured in the setting mode, can be measured with high accuracy in the inspection mode. Accordingly, even when the inspection operator is not a skilled operator, a size of a desired measurement target portion can be measured concerning a plurality of inspection targets in the inspection mode. As a result, it is possible to easily and accurately inspect the shape of the inspection target.

(13) The step of moving the stage or the inspection target may include: displaying a positioning image on the display unit based on the registered positioning image data in the inspection mode; acquiring first or second image data for positioning in the state where the inspection target is placed on the stage in the inspection mode; displaying an image on the display unit based on the acquired image data for positioning in the inspection mode; and accepting movement of the stage or the inspection target after the positioning image and the image based on the image data for positioning are displayed in the inspection mode.

In this case, in the inspection mode, the image data for positioning of the inspection target is acquired, and the image of the inspection target based on the image data for positioning is displayed on the display unit along with the positioning image. Thus, by viewing the image of the inspection target and the positioning image displayed on the display unit, the inspection operator can easily move the stage or the inspection target such that the position and the posture of the inspection target get close to the position and the posture of the setting target.

(14) According to still another embodiment of the invention, an image inspection program is an image inspection program executable by a processing device, and causes the processing device to perform the processing of; acquiring first image data representing a texture image of the surface of a setting target, or second image data representing a height image of the surface of the setting target, as image data for positioning in a state where the setting target is placed as a measurement target on a stage in a setting mode; registering positioning image data showing a position and a posture of the setting target based on the acquired image data for positioning in the setting mode, acquiring first or second image data for alignment in the state where the setting target is placed on the stage in the setting mode, registering as reference image data the acquired image data for alignment in the setting mode, acquiring second image data for measurement in the state where the setting target is placed on the stage in the setting mode, measuring a size in a height direction of a measurement target portion of the setting target based on the acquired second image data for measurement in the setting mode, accepting input of at least either value of a design value or a tolerance of the measurement target portion of the setting target in the setting mode, moving the stage or an inspection target to a position where second image data representing a height image of the surface of the inspection target can be acquired based on the registered positioning image data in a state where the inspection target is placed as the measurement target on the stage in an inspection mode, acquiring image data for alignment which corresponds to the registered reference image data after movement of the stage or the inspection target in the state where the inspection target is placed on the stage in the inspection mode, registering the acquired image data for alignment as alignment image data in the inspection mode, acquiring second image data for measurement in the state where the inspection target is placed on the stage in the inspection mode, aligning the second image data for measurement concerning the inspection target by alignment of the alignment data and the reference image data by pattern matching in the inspection mode, measuring a size of a measurement target place of the inspection target which corresponds to a measurement target place of the setting target based on the aligned second image data for measurement in the inspection mode, determining Pass/Fail of the inspection target based on the size measured concerning the setting target, the size measured concerning the inspection target, and at least either value of the design value or tolerance accepted in the inspection mode, and displaying the determined determination result on a display unit in the inspection mode.

According to this image inspection program, the control operation is performed in a setting mode to make setting for inspection and in an inspection mode to perform inspection. During the setting mode, a setting creator places a setting target as a measurement target on the stage. In the setting mode, first or second image data for positioning is acquired. Here, the first image data represents a texture image of the surface of the setting target, and the second image data represents a height image of the surface of the setting target. Based on the acquired image data for positioning, positioning image data showing a position and a posture of the setting target is registered. Next, first or second image data for alignment is acquired in a state where the setting target is placed on the stage. The acquired image data for alignment is registered as reference image data. Further, second image data for measurement is acquired in the state where the setting target is placed on the stage. Based on the acquired the second image data for measurement, a size in a height direction of a measurement target portion of the setting target is measured. Input of at least one value of a design value and a tolerance of the measurement target portion of the setting target is accepted.

During the inspection mode, an inspection operator places an inspection target as the measurement target on the stage. In the inspection mode, the stage or the inspection target is moved to a position where the second image data representing the height image of the surface of the inspection target can be acquired in the state where the inspection target is placed on the stage. In the state where the inspection target is placed on the stage, after movement of the stage or the inspection target, image data for alignment which corresponds to the registered reference image data is acquired. The acquired image data for alignment is registered as alignment image data. Further, second image data for measurement is acquired in the state where the inspection target is placed on the stage. The alignment data and the reference image data are aligned by pattern matching, to thereby perform alignment of the second image data for measurement concerning the inspection target. A size of a measurement target place of the inspection target which corresponds to a measurement target place of the setting target is measured based on the aligned second image data for measurement. Pass/Fail of the inspection target is determined based on the size measured concerning the setting target, the size measured concerning the inspection target, and at least either value of the design value or tolerance accepted. The determined determination result is displayed on the display unit.

According to this program, in the setting mode, the positioning image data showing the position and the posture of the setting target is registered. The positioning image based on the positioning image data shows the position and the posture of the setting target. In the setting mode, the positioning image data showing the position and the posture of the setting target is registered. In the inspection mode, based on the registered positioning image data, it is possible to move the stage or the inspection target such that the position and the posture of the inspection target get close to the position and the posture of the setting target. Accordingly, even when the inspection operator is not a skilled operator, the position and the posture of the setting target can be adjusted so as to prevent generation of a shade, multiple reflection of light, and the like in the measurement target portion of the inspection target in the inspection mode.

Further, the image data for alignment concerning the inspection target which is acquired in the inspection mode is aligned with high accuracy to the image data for alignment concerning the setting target which is acquired in the setting mode. Hence the size of the measurement target portion of the inspection target, which corresponds to the measurement target portion of the setting target measured in the setting mode, can be measured with high accuracy in the inspection mode. Accordingly, even when the inspection operator is not a skilled operator, a size of a desired measurement target portion can be measured concerning a plurality of inspection targets in the inspection mode. As a result, it is possible to easily and accurately inspect the shape of the inspection target.

(15) The processing of moving the stage or the inspection target may include: displaying a positioning image on the display unit based on the registered positioning image data in the inspection mode; acquiring first or second image data for positioning in the state where the inspection target is placed on the stage in the inspection mode; displaying an image on the display unit based on the acquired image data for positioning in the inspection mode; and accepting movement of the stage or the inspection target after the positioning image and the image based on the image data for positioning are displayed in the inspection mode.

In this case, in the inspection mode, the image data for positioning of the inspection target is acquired, and the image of the inspection target based on the image data for positioning is displayed on the display unit along with the positioning image. Thus, by viewing the image of the inspection target and the positioning image displayed on the display unit, the inspection operator can easily move the stage or the inspection target such that the position and the posture of the inspection target get close to the position and the posture of the setting target.

According to the present invention, it is possible to easily and accurately inspect a shape of an inspection target.

BRIEF DESCRIPTION OF THE DRAWINGS

DETAILED DESCRIPTION OF PREFERRED EMBODIMENTS (1) Configuration of Image Inspection Device FIG. 2 is a schematic view showing a configuration of a measuring part of an image inspection device 500 of FIG. 1. Hereinafter, the image inspection device 500 according to the present embodiment will be described with reference to FIGS. 1 and 2. As illustrated in FIG. 1, the image inspection device 500 is provided with a measuring part 100, a PC (personal computer) 200, a control part 300, and a display part 400.

As shown in FIG. 1, the measuring part 100 is a microscope, for example, and includes a light projection part 110, a light reception part 120, an illumination light output part 130, a stage device 140, and a control board 150. The light projection part 110, the light reception part 120 and the illumination light output part 130 constitute a measurement head 100H. As shown in FIG. 2, the light projection part 110 includes a measurement light source 111, a pattern generation part 112, and a plurality of lenses 113, 114, 115. The light reception part 120 includes a camera 121 and a plurality of lenses 122, 123, and has a digital zoom function.

As shown in FIG. 1, the stage device 140 includes a stage 141, a stage operation part 142, and a stage drive part 143. A measurement target S is placed on the stage 141. As shown in FIG. 2, the stage 141 is made up of an X-Y stage 10, a Z stage 20, and a θ stage 30. The stage 141 may further include a fixation member (clamp), not shown, for fixing the measurement target S to the surface where the measurement target S is placed (hereinafter referred to as placement surface).

As shown in FIG. 2, the light projection part 110 is disposed obliquely above the stage 141. The measuring part 100 may include a plurality of light projection parts 110. In the example of FIG. 2, the measuring part 100 includes two light projection parts 110. Hereinafter, when the two light projection parts 110 are to be distinguished, one light projection part 110 is referred to as a light projection part 110A, and the other light projection part 110 is referred to as a light projection part 110B. The light projection parts 110A, 110B are symmetrically disposed with a light axis of the light reception part 120 located therebetween.

Figure 1:
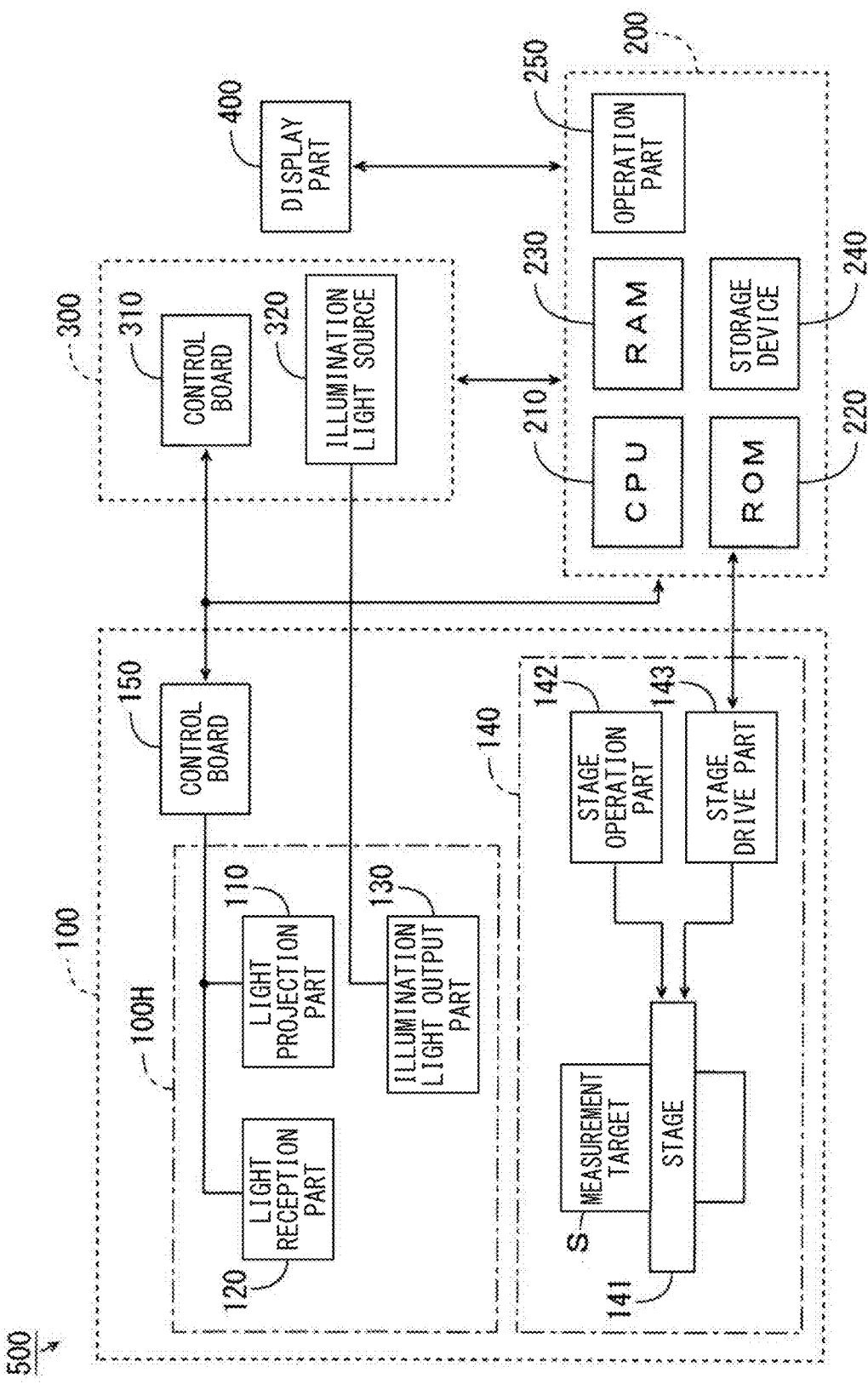
FIG. 1 is a block diagram showing a configuration of an image inspection device according to one embodiment of the present invention.

The measurement light source 111 of each of the light projection parts 110A, 110B is, for example, a halogen lamp that emits white light. The measurement light source 111 may be another light source such as a white LED (light emitting diode) that emits white light. Light emitted from the measurement light source 111 (hereinafter referred to as measurement light) is appropriately collected by the lens 113, and thereafter incident on the pattern generation part 112.

The pattern generation part 112 is a DMD (digital micromirror device), for example. The pattern generation part 112 may be an LCD (liquid crystal display), an LCOS (liquid crystal on silicon), or a mask. The measurement light incident on the pattern generation part 112 is converted to have a previously set pattern and a previously set intensity (brightness), and then emitted. Hereinafter, a portion of the measurement light with an intensity not smaller than a prescribed value is referred to as a bright portion, and a portion of the measurement light with an intensity smaller than the prescribed value is referred to as a dark portion.

The measurement light emitted from the pattern generation part 112 is converted to light having a relatively large diameter by a plurality of lenses 114, 115. Thereafter, the measurement target S on the stage 141 is irradiated with the converted light. The light reception part 120 is disposed above the stage 141. The measurement light reflected upward from the stage 141 by the measurement target S is collected to form an image by a plurality of lenses 122, 123 of the light reception part 120, which is then received by a camera 121.

The camera 121 is, for example, a CCD (charge coupled device) camera including an imaging element 121a and a lens. The imaging element 121a is a monochrome CCD (charge coupled device), for example. The imaging element 121a may be a color CCD, or another imaging element such as a CMOS (complementary metal-oxide semiconductor) image sensor. From each pixel of the imaging element 121a, an analog electric signal corresponding to a light reception amount (hereinafter referred to as light reception signal) is outputted to the control board 150.

The control board 150 is mounted with an A/D converter (analog/digital converter) and a FIFO (first in first out) memory, not shown. The light reception signal outputted from the camera 121 is sampled in a constant sampling cycle and converted to a digital signal by the A/D converter of the control board 150 based on control by the control part 300. The digital signals outputted from the A/D converter are sequentially stored into the FIFO memory. The digital signals stored in the FIFO memory are sequentially transmitted as pixel data to the PC 200.

As shown in FIG. 1, the PC 200 includes a CPU (central processing unit) 210, a ROM (read only memory) 220, a RAM (random access memory) 230, a storage device 240, and an operation part 250. Further, the operation part 250 includes a keyboard and a pointing device. As the pointing device, a mouse, a joystick, or the like is used.

A system program is stored into the ROM 220. The RAM 230 is to be used for processing a variety of data. The storage device 240 is made up of a hard disk and the like. An image inspection program is stored into the storage device 240. Further, the storage device 240 is to be used for saving a variety of data, such as pixel data, given from the control board 150.

The CPU 210 generates image data based on the pixel data given from the control board 150. Further, the CPU 210 performs a variety of processing on the generated image data by use of the RAM 230, and displays on the display part 400 an image based on the image data. Further, the CPU 210 applies a drive pulse to the stage drive part 143. The display part 400 is formed of an LCD panel or an organic EL (electroluminescence) panel, for example.

The control part 300 includes a control board 310 and an illumination light source 320. The control board 310 is mounted with a CPU, not shown. The CPU of the control board 310 controls the light projection part 110, the light reception part 120 and the control board 150 based on a command from the CPU 210 of the PC 200.

The illumination light source 320 includes three LEDs respectively emitting red light, green light, and blue light, for example. Controlling the luminance of the light emitted from each LED enables generation of light with any color from the illumination light source 320. The light generated from the illumination light source 320 (hereinafter referred to as illumination light) is outputted from the illumination light output part 130 of the measuring part 100 through a light guiding member (light guide). Note that the illumination light source 320 may not be provided in the control part 300 but be provided in the measuring part 100. In this case, the illumination light output part 130 is not provided in the measuring part 100.

Figure 2:
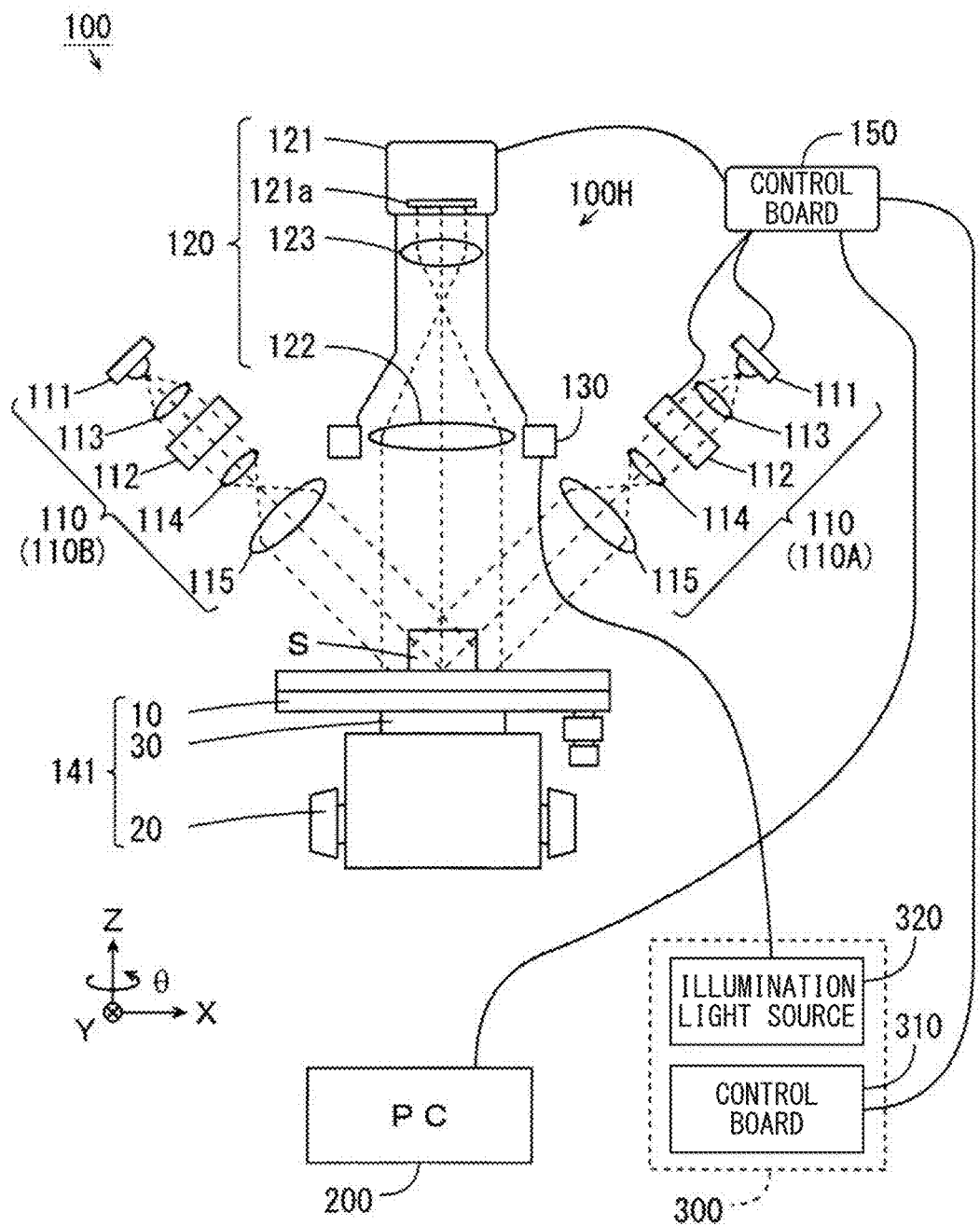
FIG. 2 is a schematic view showing a configuration of a measuring part of the image inspection device of FIG. 1.

The illumination light output part 130 of FIG. 2 has a ring shape, and is disposed above the stage 141 so as to surround the lens 122 of the light reception part 120. Thereby, the measurement target S is irradiated with the illumination light from the illumination light output part 130 such that a shade is not generated. Since the irradiation with the illumination light is performed from substantially straight above the measurement target S, even when the measurement target S has a hole, the illumination light reaches the bottom of the hole. It is thus possible to observe the bottom of the hole as well as the surface of the measurement target S by the illumination light.

In the measuring part 100, data representing a pattern of the surface of the measurement target S is generated as texture image data in a state where the measurement target S is irradiated with the illumination light from the illumination light output part 130. The pattern of the surface includes a design and a color, for example. Hereinafter, an image based on the texture image data is referred to as a texture image. Further, in the measuring part 100, data representing the shape of the surface of the measurement target S is generated as height image data in the state where the measurement target S is irradiated with the measurement light from the light projection part 110. Hereinafter, an image based on the height image data is referred to as a height image. Moreover, in the measuring part 100, synthesized image data showing a synthesized image of the texture image and the height image may be generated. Note that the height image is an image also referred to as a distance image.

The texture image and the height image are displayed on the display part 400. When the above synthesized image data is generated by the measuring part 100, a synthesized image based on the synthesized image data may be displayed on the display part 400.

(2) Configuration of Stage

In the measuring part 100, a three-dimensional coordinate system and a position of the origin which are unique to the device are defined. The three-dimensional coordinate system of the present example has an X-axis, a Y-axis and a Z-axis that are orthogonal to each other. In FIG. 2, a direction parallel to the X-axis is taken as an X-direction and indicated by an arrow X, a direction parallel to the Y-axis is taken as a Y-direction and indicated by an arrow Y, and a direction parallel to the Z-axis is taken as a Z-direction and indicated by an arrow Z. Further, a direction of rotation around an axis parallel to the Z-direction is defined as a θ-direction and indicated by an arrow θ. In the present embodiment, the Z-direction is a direction parallel to the light axis of the light reception part 120.

The placement surface of the stage 141 is included in a plane parallel to the X-direction and the Y-direction. The X-Y stage 10 has an X-directional movement mechanism and a Y-directional movement mechanism. The Z stage 20 has a Z-directional movement mechanism. The θ stage 30 has a θ-directional rotation mechanism.

A plane located at a focal point of the light reception part 120 and vertical to the light axis of the light reception part 120 is referred to as a focal plane of the light reception part 120. The relative positional relation of the light projection parts 110A, 110B, the light reception part 120 and the stage 141 is set such that a light axis of the light projection part 110A, a light axis of the light projection part 110B and the light axis of the light reception part 120 intersect with each other on the focal plane of the light reception part 120.

Further, a plane located at a focal point of the light projection part 110 (a point at which an image of a pattern of the measurement light is formed) and vertical to the light axis of the light projection part 110 is referred to as a focal plane of the light projection part 110. The light projection parts 110A, 110B are configured such that the focal plane of the light projection part 110A and the focal plane of the light projection part 110B intersect at a position that includes the focal point of the light reception part 120.

The center of the θ-directional rotational axis of the θ stage 30 matches the light axis of the light reception part 120. Thus, when the θ stage 30 is rotated in the θ-direction, it can be rotated around the rotational axis within a field of vision without getting the measurement target S out of the field of vision. Further, the X-Y stage 10 and the θ stage 30 are supported by the Z stage 20.

A stepping motor is to be used for each of the X-directional movement mechanism, the Y-directional movement mechanism, the Z-directional movement mechanism, and the θ-directional rotation mechanism of the stage 141. The X-directional movement mechanism, the Y-directional movement mechanism, the Z-directional movement mechanism, and the θ-directional rotation mechanism of the stage 141 are driven by the stage operation part 142 or the stage drive part 143 of FIG. 1.

The user operates the stage operation part 142 of FIG. 1 by hand, and can thereby move the placement surface of the stage 141 in the X-direction, the Y-direction or the Z-direction relatively to the light reception part 120, or rotate it in the θ-direction. The stage drive part 143 supplies a current to a stepping motor of the stage 141 based on the drive pulse applied from the PC 200, and can thereby move the stage 141 in the X-direction, the Y-direction or the Z-direction relatively to the light reception part 120, or rotate it in the θ-direction.

In the present embodiment, the stage 141 is an electric stage that can be operated by hand as well as driven by the stepping motor, but this is not restrictive. The stage 141 may be an electric stage that can be driven only by the stepping motor, or may be a manual stage that can be operated only by hand. Further, the disposition of the X-Y stage 10, the Z stage 20 and the θ stage 30 is not restricted to the above example. For example, although the X-Y stage 10 is disposed on the θ stage 30 in the example of FIG. 2, this is not restrictive, and the θ stage 30 may be disposed on the X-Y stage 10.

(3) Measurement of Shape of Measurement Target

Figure 3:
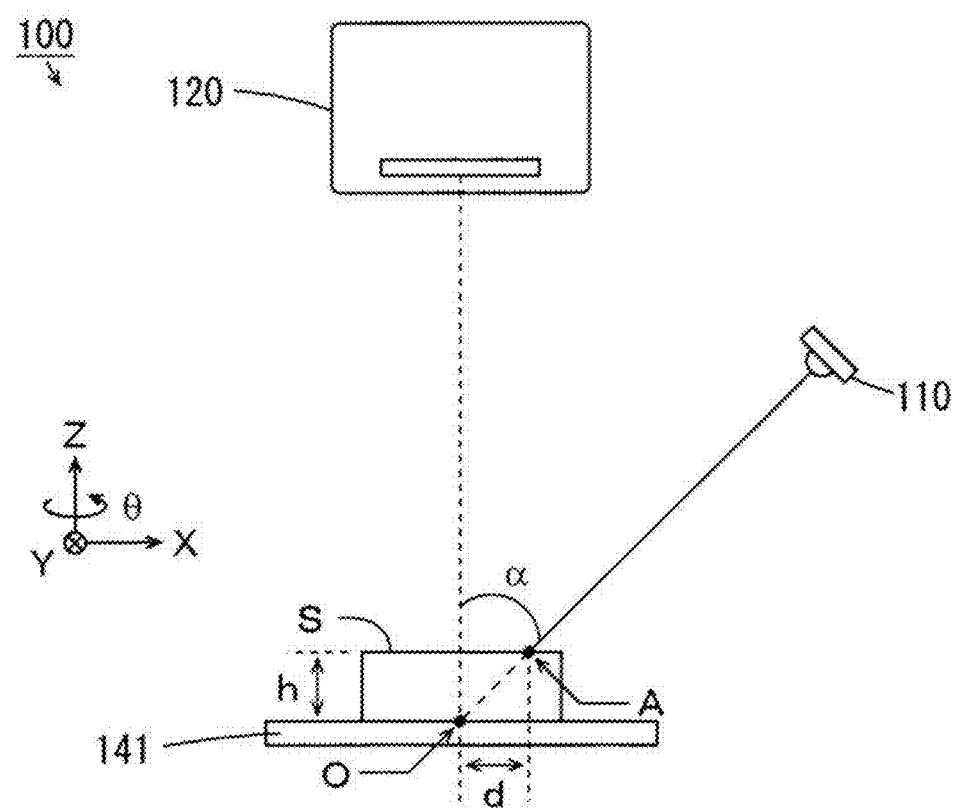
FIG. 3 is a view for explaining a principle of a triangular ranging system.

In the measuring part 100, the shape of the measurement target S is measured by the triangular ranging system. FIG. 3 is a view for explaining a principle of the triangular ranging system. As shown in FIG. 3, an angle α between the light axis of the measurement light emitted from the light projection part 110 and the light axis of the measurement light incident on the light reception part 120 (the light axis of the light reception part 120) is previously set. The angle α is larger than 0 degrees and smaller than 90 degrees.

When the measurement target S is not placed on the stage 141, the measurement light emitted from the light projection part 110 is reflected at the point O on the placement surface of the stage 141 and incident on the light reception part 120. On the other hand, when the measurement target S is placed on the stage 141, the measurement light emitted from the light projection part 110 is reflected at the point A on the surface of the measuring target S and incident on the light reception part 120.

When a distance between the point O and the point A in the X-direction is taken as d, a height h at the point A of the measurement target S with respect to the placement surface of the stage 141 is given by: $h = d \div \tan(\alpha)$. The CPU 210 of the PC 200 of FIG. 1 measures the distance d between the point O and the point A in the X-direction based on the pixel data of the measurement target S which is given by the control board 150. Further, the CPU 210 calculates the height h of the point A on the surface of the measurement target S based on the measured distance d. The heights of all points on the surface of the measurement target S are calculated, to measure a three-dimensional shape of the measurement target S.

In order for all the points on the surface of the measurement target S to be irradiated with measurement light, measurement light having a variety of patterns is emitted from the light projection part 110 of FIG. 1. FIGS. 4A to 4D are views showing examples of the pattern of the measurement light emitted from the light projection part 110. The kind of the pattern of the measurement light is controlled by the pattern generation part 112 of FIG. 1.

Figure 4B:
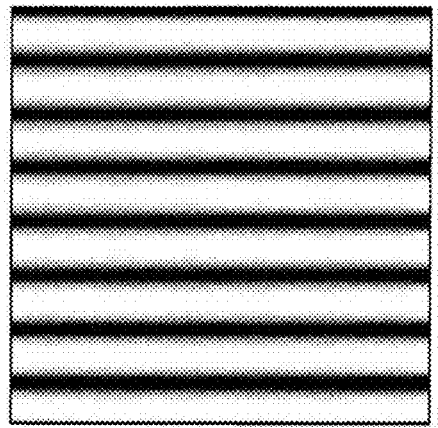
FIGS. 4A to 4D are views showing examples of a pattern of measurement light emitted from a light projection part.
Figure 4D:
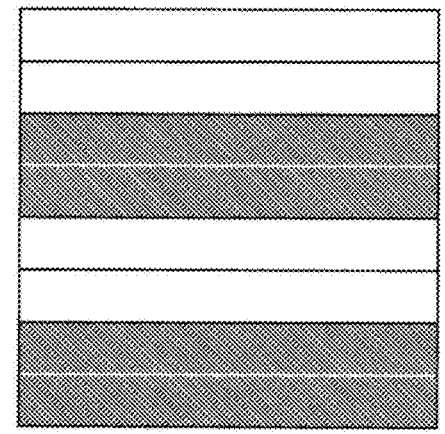
Figure 4A:
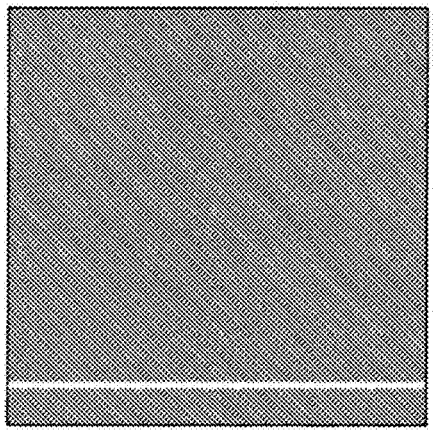

Measurement light of FIG. 4A is referred to as linear measurement light. The linear measurement light is measurement light having a linear cross section parallel to one direction. Measurement light of FIG. 4B is referred to as sinusoidal measurement light. The sinusoidal measurement light is measurement light having a linear cross section parallel to one direction and having a pattern of intensity that changes in a sinusoidal form in the other direction orthogonal to the one direction.

Figure 4C:
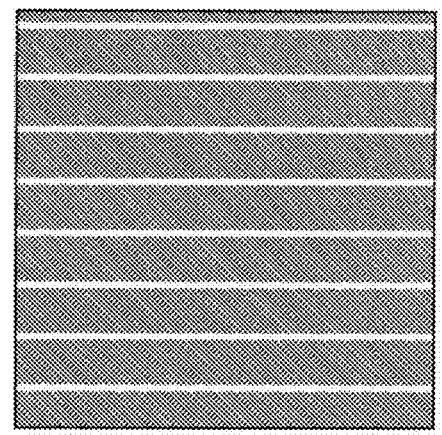

Measurement light of FIG. 4C is referred to as striped measurement light. The striped measurement light is measurement light having a linear cross section parallel to one direction and arrayed in the other direction orthogonal to the one direction. Measurement light of FIG. 4D is referred to as cord-like measurement light. The cord-like measurement light is measurement light having a linear cross section parallel to one direction and having the bright portion and the dark portion arrayed in the other direction orthogonal to the one direction.

A method for scanning the linear measurement light on the measurement target S is generally called an optical cutting method. The linear measurement light is scanned such that the whole range of irradiation with the measurement light is irradiated with the bright portion of the linear measurement light at least once in accordance with the general optical cutting method, thus generating height image data of the measurement target S.

Meanwhile, a method for irradiating the measurement target S with the sinusoidal measurement light, the striped measurement light or the cord-like measurement light is categorized as a pattern projection method. Among pattern projection methods, the method for irradiating the measurement target S with the sinusoidal measurement light or the striped measurement light is categorized as a phase shift method, and the method for irradiating the measurement target S with the cord-like measurement light is categorized as a spatial code method.

The sinusoidal measurement light or the striped measurement light are scanned such that the whole range of irradiation with the measurement light is irradiated with the bright portion of the sinusoidal measurement light or the striped measurement light at least once in accordance with the general phase shift method, thus generating height image data of the measurement target S. Further, the measurement target S is sequentially irradiated with a plurality of cord-like measurement light beams having mutually different patterns in accordance with the general spatial code method, thus generating height image data of the measurement target S.

(4) Specific Examples of Texture Image and Height Image

Figure 5:
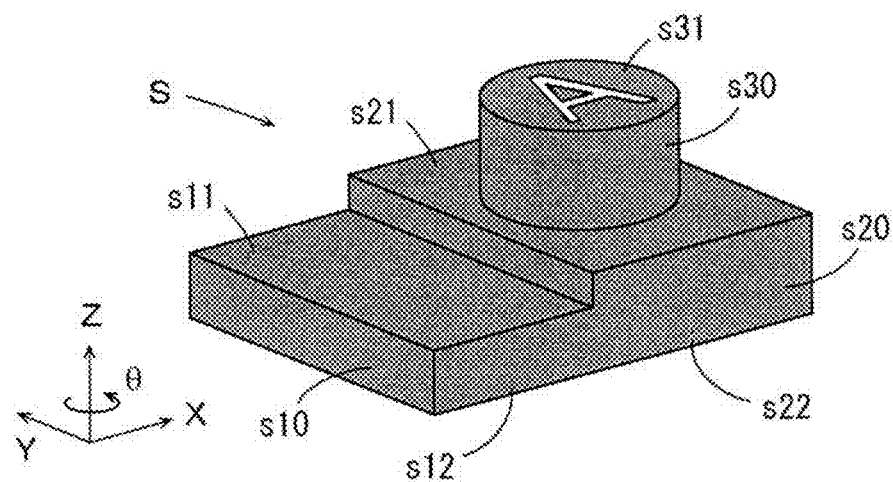
FIG. 5 is an external perspective view showing one example of a measurement target placed on a stage.

FIG. 5 is an external perspective view showing one example of the measurement target S placed on the stage 141. The measurement target S of FIG. 5 has a thin part s10, a thick part s20, and a cylindrical part s30. Each of the thin part s10 and the thick part s20 has a rectangular plate shape. One side of the thin part s10 and one side of the thick part s20 are joined with each other. With the thin part s10 joined with the thick part s20, a lower surface s12 of the thin part s10 and a lower surface s22 of the thick part s20 form one surface. The thickness of the thick part s20 is larger than the thickness of the thin part s10 in the Z-direction. The cylindrical part s30 is provided on an upper surface s21 of the thick part s20 so as to extend upward.

A comparison is made among positions (heights) of an upper surface s11 of the thin part s10, the upper surface s21 of the thick part s20, and an upper surface s31 of the cylindrical part s30 in the Z-direction. In this case, the upper surface s11 of the thin part s10 is the lowest, and the upper surface s31 of the cylindrical part s30 is the highest. The upper surface s21 of the thick part s20 is higher than the upper surface s11 of the thin part s10 and lower than the upper surface s31 of the cylindrical part s30.

Figure 6:
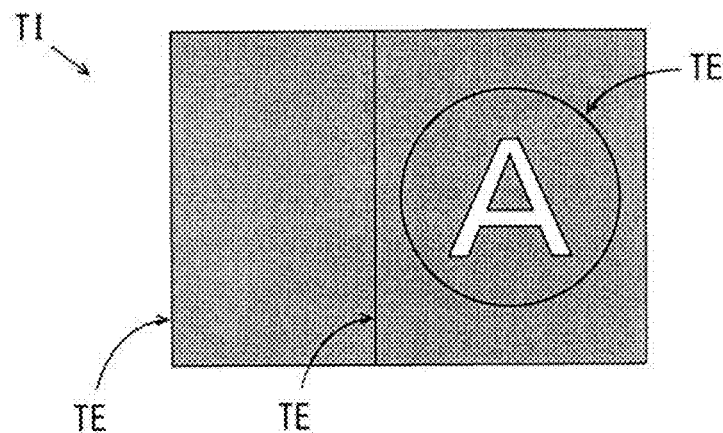
FIG. 6 is an example of a texture image of the measurement target of FIG. 5.

An outlined letter "A" is printed on the upper surface s31 of the cylindrical part s30. The external surface of the measurement target S of FIG. 5 is coated with dark gray except for the portion of the outlined letter "A". FIG. 6 is an example of a texture image of the measurement target S of FIG. 5, and FIG. 7 is an example of a height image of the measurement target S of FIG. 5.

As shown in FIG. 6, a texture image TI is an image of the measurement target S seen in the Z-direction. According to the texture image TI of FIG. 6, the letter "A" printed on the upper surface s31 of the cylindrical part s30 (FIG. 5) can be clearly recognized as a pattern on the surface of the measurement target S. Meanwhile, since the portions of the measurement target S of FIG. 5 other than the letter "A" are coated with dark gray, outlines TE indicating borders of the thin part s10, the thick part s20, and the cylindrical part s30 of FIG. 5 on the image are difficult to recognize in the texture image TI.

Figure 7:
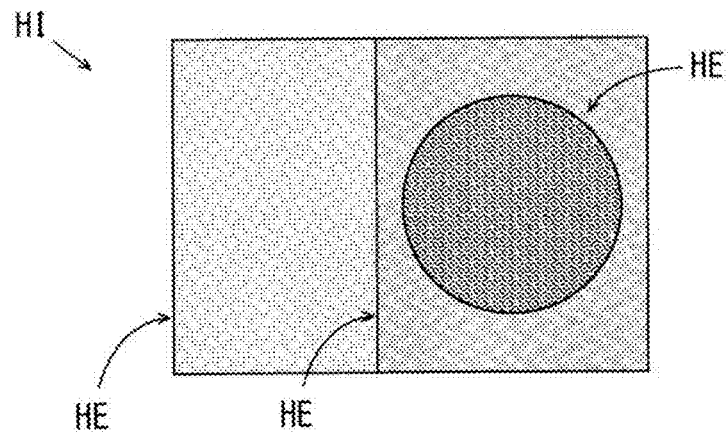
FIG. 7 is an example of a height image of the measurement target of FIG. 5.

On the other hand, as shown in FIG. 7, a height image HI represents the height of each part of the surface of the measurement target S by use of a plurality of kinds of different colors. In FIG. 7, differences in color are represented by differences in dot pattern. For example, the lowest portion is represented by blue, and the highest portion is represented by red. The other portions are represented by colors in accordance with the heights thereof such that the color of the higher portion is closer to red and the color of the lower portion is closer to blue.

In the height image of FIG. 7, the pattern on the surface of the measurement target S cannot be recognized. Hence the letter "A" shown in the texture image TI of FIG. 6 cannot be recognized. Meanwhile, in the height image HI of FIG. 7, the surface of the measurement target S is represented by the colors in accordance with the heights, and hence outlines HE indicating borders of the thin part s10, the thick part s20, and the cylindrical part s30 of FIG. 5 on the image are easy to recognize.

(5) Example of Use of Image Inspection Device (5-1) Setting Mode and Inspection Mode In the following description, of the users of the image inspection device 500, the user to manage inspection operation on the measurement target S is appropriately referred to as a setting creator, and the user to perform inspection operation on the measurement target S under management of the setting creator is appropriately referred to as an inspection operator. Further, the posture of the measurement target S means an angle of rotation of the measurement target S on the stage 141.

The image inspection device 500 can be used in a plurality of kinds of modes including a setting mode for the setting creator and an inspection mode for the inspection operator. In the setting mode, the setting creator decides a measurement target portion concerning one measurement target S, and measures the size of the measurement target portion. Thereby, information for inspecting another measurement target S designed in a similar manner to the one measurement target S is generated as inspection setting information. A data file of the generated inspection setting information is stored into the storage device 240 of FIG. 1 as an inspection setting file. The inspection setting information includes the measurement target portion of the setting target S, and a design value and a tolerance of the measurement target portion, for example. Hereinafter, in the setting mode, the measurement target S measured by the setting creator is referred to as a setting target S.

In the inspection mode, the inspection operator can inspect another measurement target S based on the inspection setting file stored in the storage device 240 of FIG. 1. Hereinafter, the measurement target S inspected by the inspection operator in the inspection mode is referred to as an inspection target S.

At the time of inspecting the inspection target S, while the size of the measurement target portion is measured, it is determined whether or not the measured size is within the range of the tolerance of the design value. When the measured size is within the range of the tolerance, the inspection target S is determined as a non-defective product. On the other hand, when the measured size is not within the range of the tolerance, the inspection target S is determined as a defective product. A result of the Pass/Fail determination of the inspection target S is displayed as an inspection result in the display part 400 of FIG. 1. Further, a data file showing the inspection result is stored as an inspection result file into the storage device 240 of FIG. 1.

(5-2) Detail of Setting Mode

Figure 8:
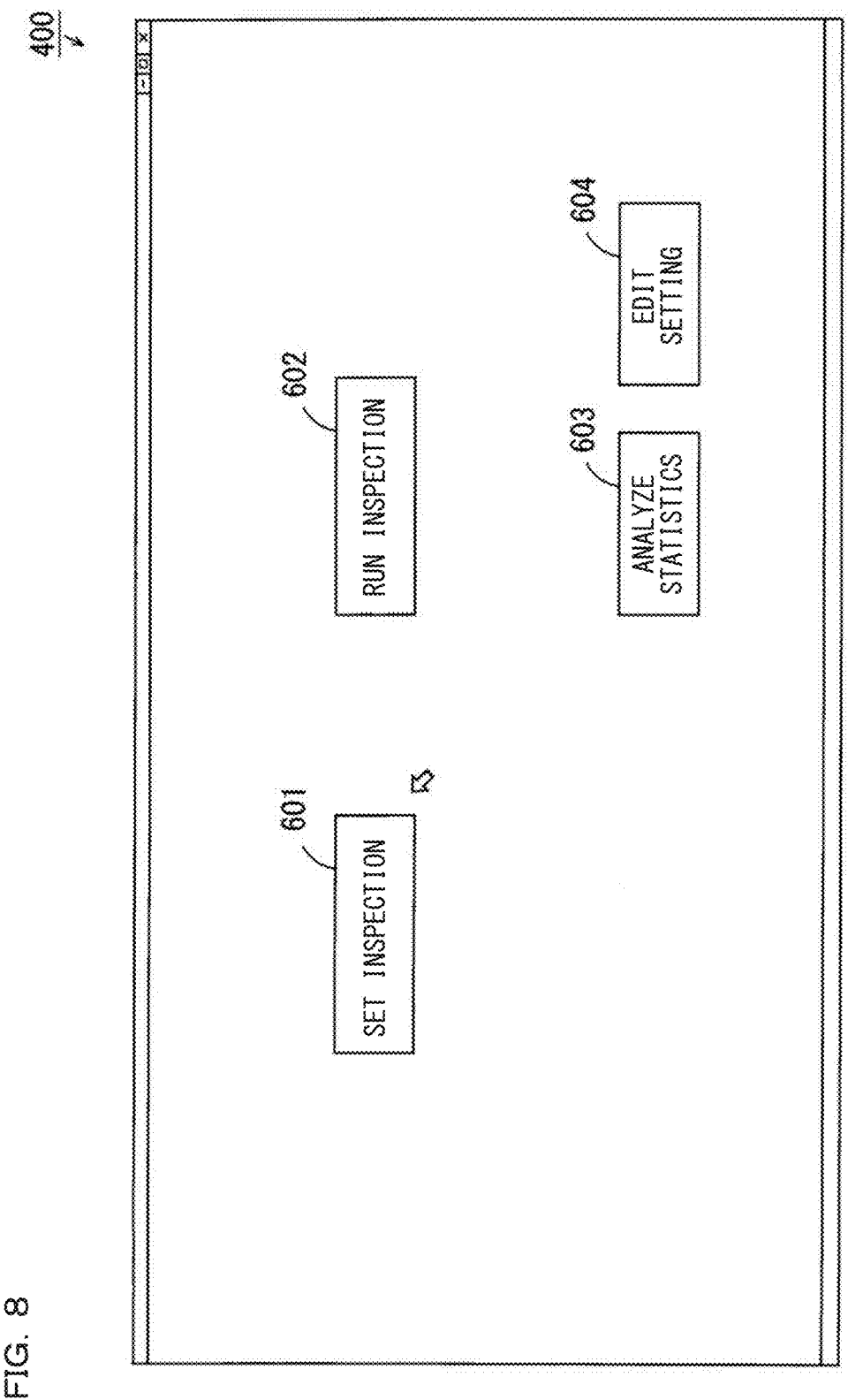
FIG. 8 is a view showing one example of an initial screen displayed on a display part of the image inspection device.

FIG. 8 is a view showing one example of an initial screen displayed on the display part 400 of the image inspection device 500. As shown in FIG. 8, an inspection setting button 601, an inspection run button 602, a statistics analysis button 603, and a setting edit button 604 are displayed in the initial screen of the image inspection device 500.

The setting creator operates the inspection setting button 601. Thereby, the CPU 210 of FIG. 1 is operated in the setting mode. FIGS. 9 to 27 are views each for explaining one example of the use of the image inspection device 500 in the setting mode. The setting creator first mounts the setting target S with a desired posture in a desired position on the stage 141 of FIG. 1.

Figure 9:
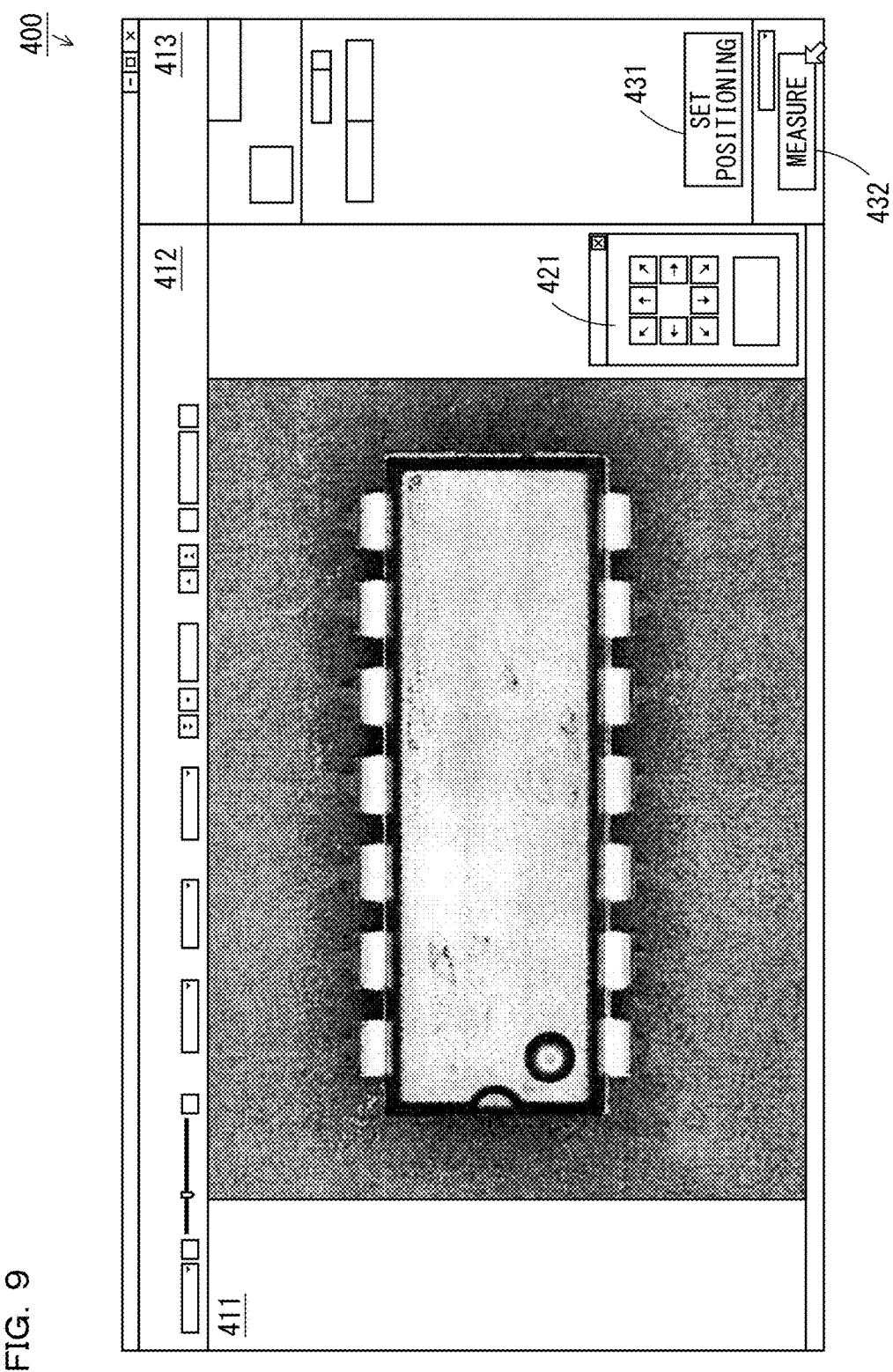
FIG. 9 is a view for explaining one example of use of the image inspection device in a setting mode.

As shown in FIG. 9, a main display field 411, a top sub-display field 412, and a side sub-display field 413 are displayed in the display part 400. The main display field 411 is allocated to a wide area from the left side toward the central part of the screen of the display part 400. The top sub-display field 412 is allocated to a band-like area above the main display field 411. The side sub-display field 413 is allocated to a band-like area beside the right side of the main display field 411.

In the main display field 411, the texture image, the height image and the synthesized image of the setting target S placed on the stage 141 are mainly displayed, and a variety of other pieces of information concerning measurement of the size of the setting target S are displayed.

In the measuring part 100, the texture images of the setting target S are successively generated at a prescribed frame rate. In the example of FIG. 9, the latest texture image including the image of the placement surface of the stage 141 and the setting target S is displayed in real time (displayed in video) in the main display field 411. The setting target S of FIG. 9 is a semiconductor package.

A stage operation button 421 is displayed in the main display field 411 along with the texture image. The user operates the stage operation button 421 by use of the operation part 250 of FIG. 1, and can thus move the position of the placement surface of the stage 141 in the X-direction, the Y-direction, and the Z-direction.

The setting creator adjusts the position and the posture of the setting target S with respect to the light projection part 110 and the light reception part 120 of FIG. 1, while viewing the texture image displayed in the main display field 411. The position and the posture of the setting target S are adjusted such that the size of the measurement target portion of the setting target S can be appropriately measured.

In the top sub-display field 412, there are displayed a plurality of operation parts for respectively adjusting imaging conditions such as a magnification of the light reception part 120 and the brightness of the illumination light and the measurement light to be applied onto the stage 141. Accordingly, the setting creator operates the plurality of operation parts displayed in the top sub-display field 412 while viewing the texture image displayed in the main display field 411, to adjust the imaging conditions. The imaging conditions are adjusted such that the size of the measurement target portion of the setting target S can be appropriately measured.

A positioning setting button 431 and a measurement button 432 are displayed in the side sub-display field 413. By operating the positioning setting button 431, the setting creator can set a method for registering positioning image data described later.

After the imaging conditions are appropriately adjusted while the position and the posture of the setting target S are appropriately adjusted, the setting creator operates the measurement button 432. In response to the operation of the measurement button 432, texture image data is acquired. The acquired texture image data is stored into the storage device 240 of FIG. 1. Further, the setting target S on the stage 141 is irradiated with the measurement light, and height image data is acquired. The acquired height image data is stored into the storage device 240 of FIG. 1. Further, in the present embodiment, the generated texture image data and height image data are synthesized to acquire synthesized image data. The acquired synthesized image data is stored into the storage device 240 of FIG. 1.

In the present embodiment, a common optical system and the imaging element 121*a* are to be used for acquiring the texture image data and the height image data. At the time of acquiring the texture image data and the height image data by the operation of the measurement button 432, the texture image data and the height image data are associated with each other per pixel of the imaging element 121*a* in the CPU 210. Accordingly, the acquired texture image data and height image data are stored into the storage device 240 in the state of being associated with each other per pixel.

Figure 10:
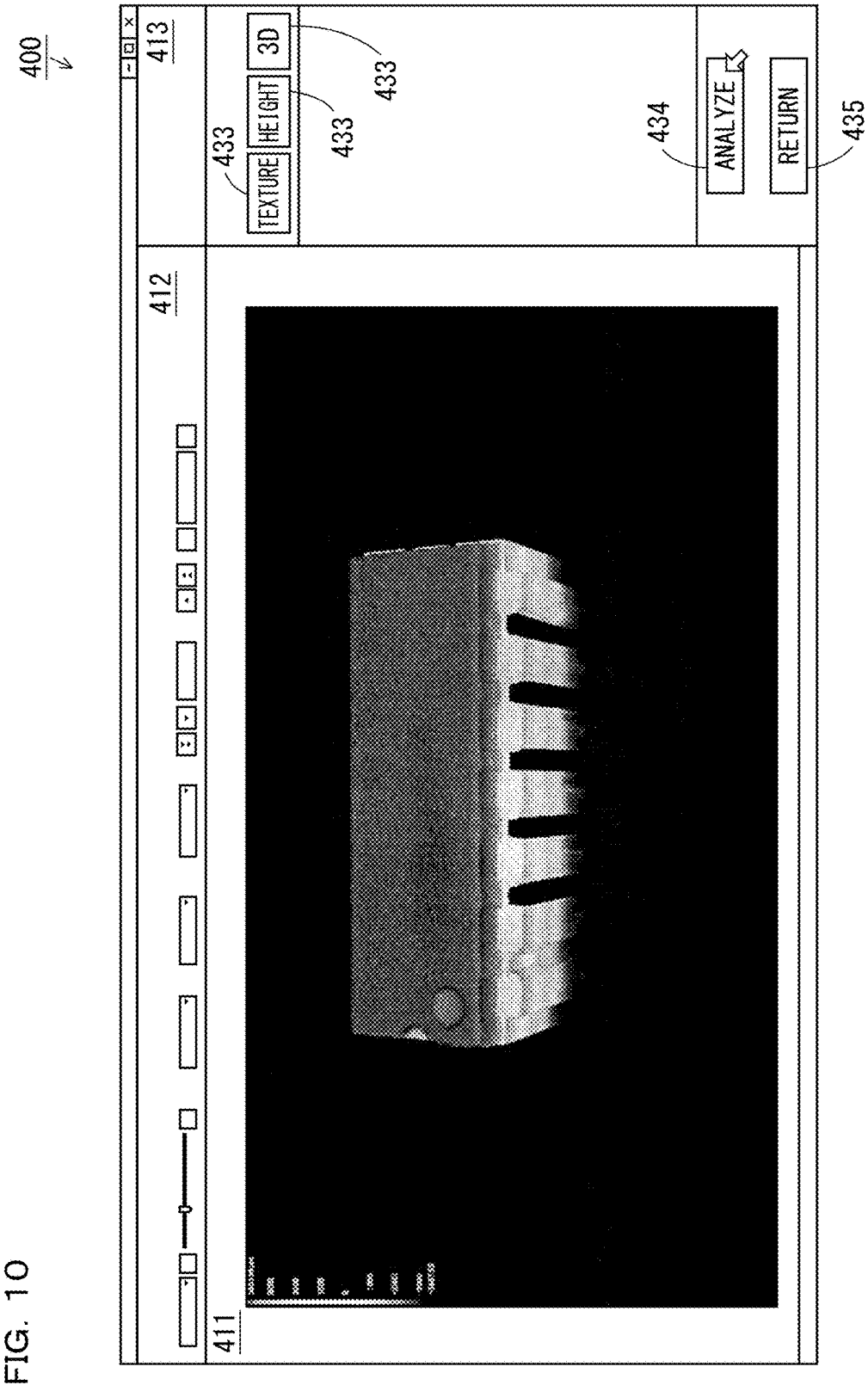
FIG. 10 is a view for explaining one example of use of the image inspection device in the setting mode.

After the texture image data, the height image data and the synthesized image data are generated, as shown in FIG. 10, an image of the setting target S based on any of the texture image data, the height image data and the synthesized image data is displayed in the main display field 411. In this state, a plurality of image selection buttons 433 for selection of the kind of the image to be displayed in the main display field 411 are displayed in the side sub-display field 413.

In the example of FIG. 10, as the plurality of image selection buttons 433, there are displayed a button for selection of a texture image, a button for selection of a height image that corresponds to a plan view, and a button for selection of a three-dimensional height image that corresponds to an external perspective view. The setting creator selects any of the plurality of image selection buttons 433, and can thereby switch and display a desired image concerning the setting target S in the main display field 411.

An analysis button 434 and a return button 435 are displayed at the bottom of the side sub-display field 413. By operating the return button 435, the setting creator can return the display part 400 to the display state of FIG. 9. Accordingly, the setting creator can reacquire the texture image data, the height image data and the synthesized image data.

Figure 11:
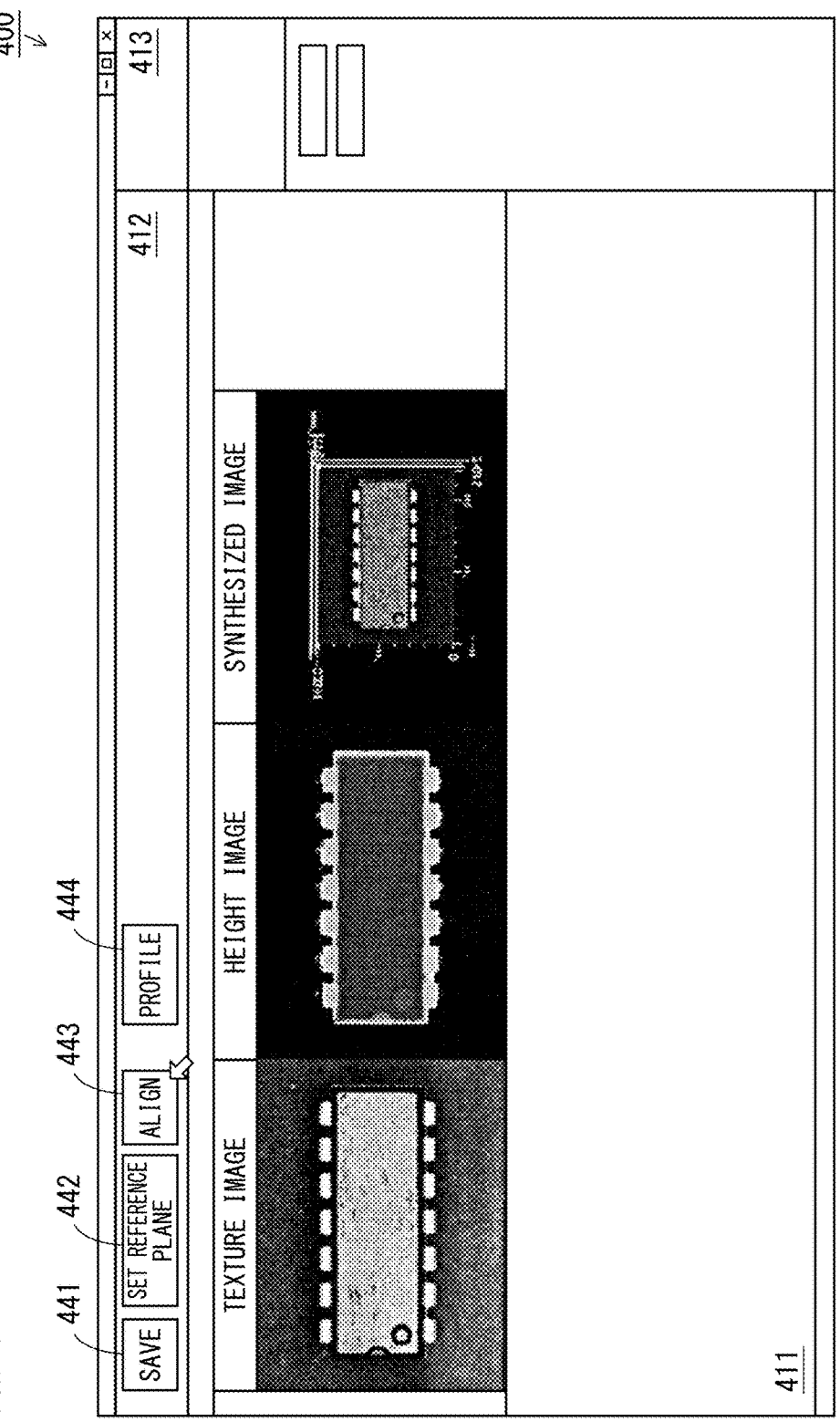
FIG. 11 is a view for explaining one example of use of the image inspection device in the setting mode.

The setting creator operates the analysis button 434 of FIG. 10 so as to generate inspection setting information. In this case, as shown in FIG. 11, a list of the texture image, the height image and the synthesized image, which are based on the texture image data, the height image data and the synthesized image data stored by the immediately preceding operation of the measurement button 432, is displayed in the main display field 411. Further, in the top sub-display field 412, there are displayed a save button 441, a reference plane setting button 442, an alignment button 443, and a profile button 444.

In the setting mode, either the acquired texture image data or height image data can be registered as reference image data. The reference image data is to be used for aligning the texture image data and the height image data of the inspection target S which are acquired in the inspection mode described later. The alignment is performed by pattern matching of the reference image data registered in the setting mode with either the texture image data or the height image data of the inspection target S. This enables accurate inspection of the size of the measurement target place in the inspection target S in the inspection mode. A detail of the alignment using the reference image data will be described later.

Figure 12:
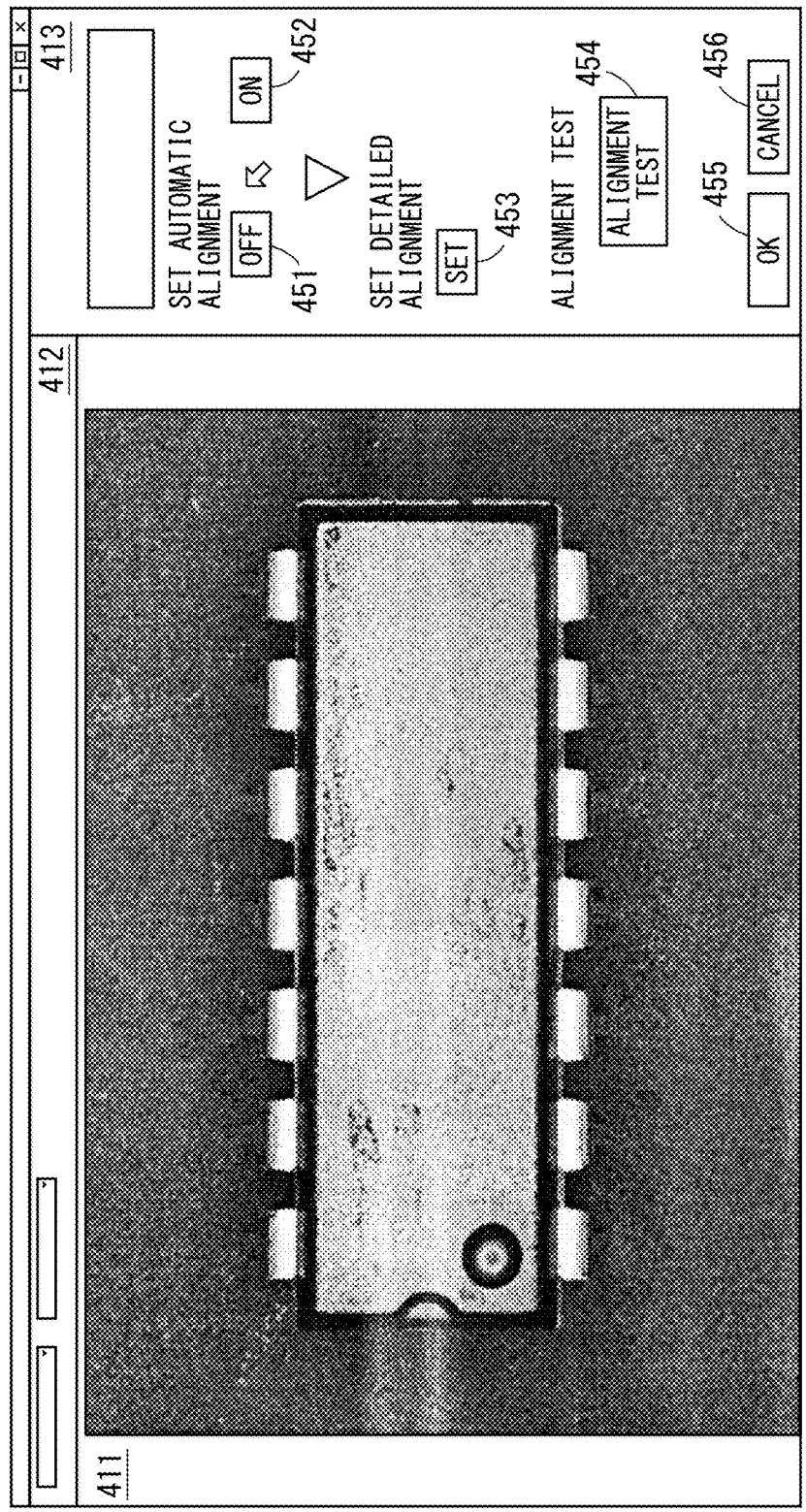
FIG. 12 is a view for explaining one example of use of the image inspection device in the setting mode.

The setting creator operates the alignment button 443 of FIG. 11 for making a setting concerning the reference image data. In this case, as shown in FIG. 12, the texture image of the setting target S is displayed in the main display field 411, and in the side sub-display field 413, there are displayed an OFF button 451 for specifying that the reference image data is not to be registered, and an ON button 452 for specifying that the reference image data is to be registered. Further, in addition to the OFF button 451 and the ON button 452, a detail alignment setting button 453, an alignment test button 454, an OK button 455, and a cancel button 456 are displayed in the side sub-display field 413.

When the position and the posture of each of the setting target S and the inspection target S placed on the stage 141 do not change due to the use of a jig or the like, the alignment is not necessarily required to be performed in the inspection mode. In such a case, the setting creator operates the OK button 455 as well as operating the OFF button 451. Thereby, the reference image data is not registered.

Figure 13:
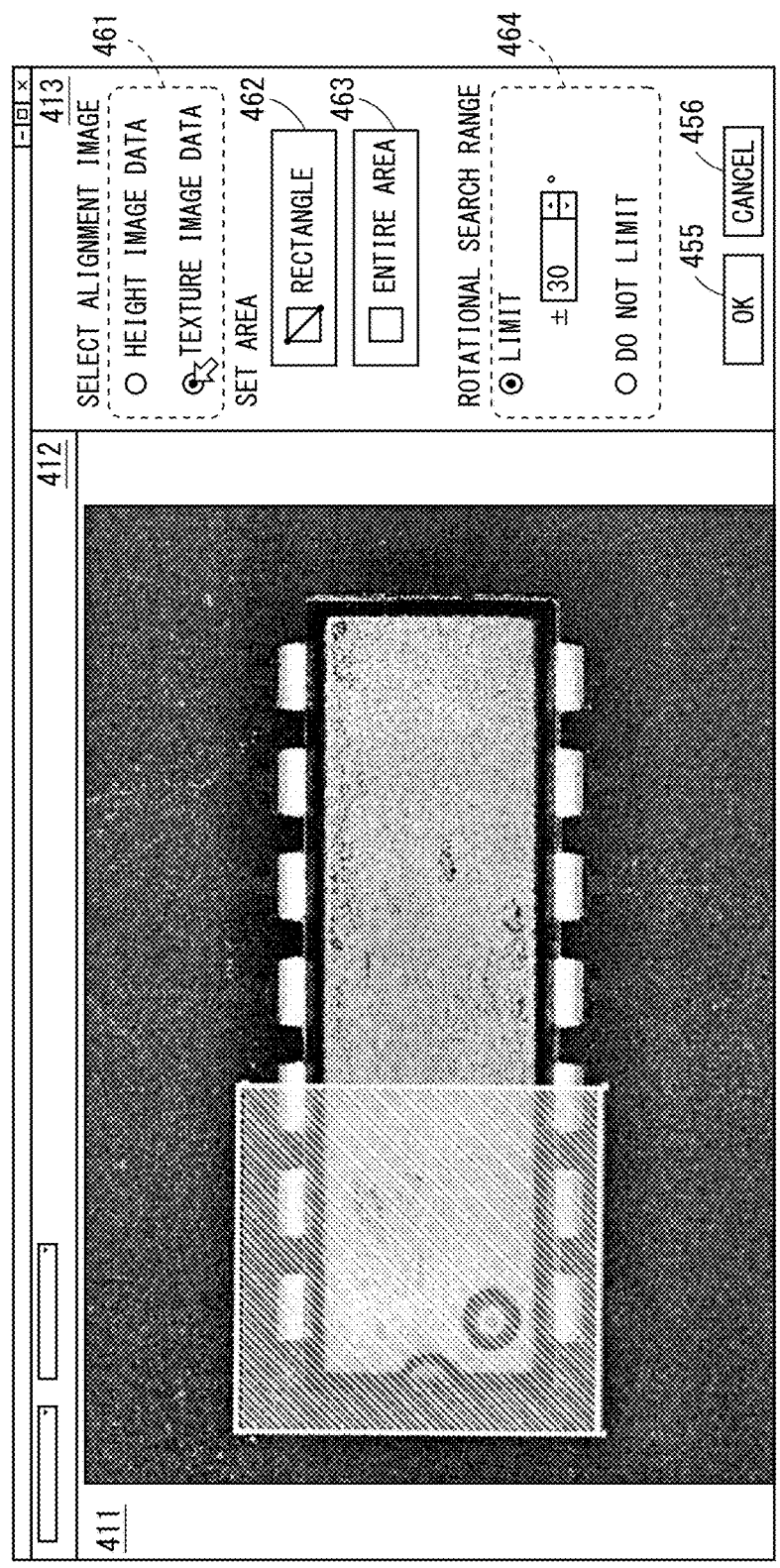
FIG. 13 is a view for explaining one example of use of the image inspection device in the setting mode.

On the other hand, when the setting creator operates the ON button 452 in order to register the reference image data, as shown in FIG. 13, an area specification image is overlapped and displayed on the texture image displayed in the main display field 411. This area specification image is an image for specifying an area on the image which corresponds to the reference image data to be registered. In FIG. 13 and subsequent drawings, a rectangular area specification image is appropriately indicated by white hatching.

Further, in the example of FIG. 13, in the side sub-display field 413, there are displayed an image selection operation part 461, a rectangular area setting button 462, an entire area setting button 463, and a rotation range setting area 464. By operating the image selection operation part 461, the setting creator can select either the texture image data or the height image data as the image data to be used for registering the reference image data.

Figure 14:
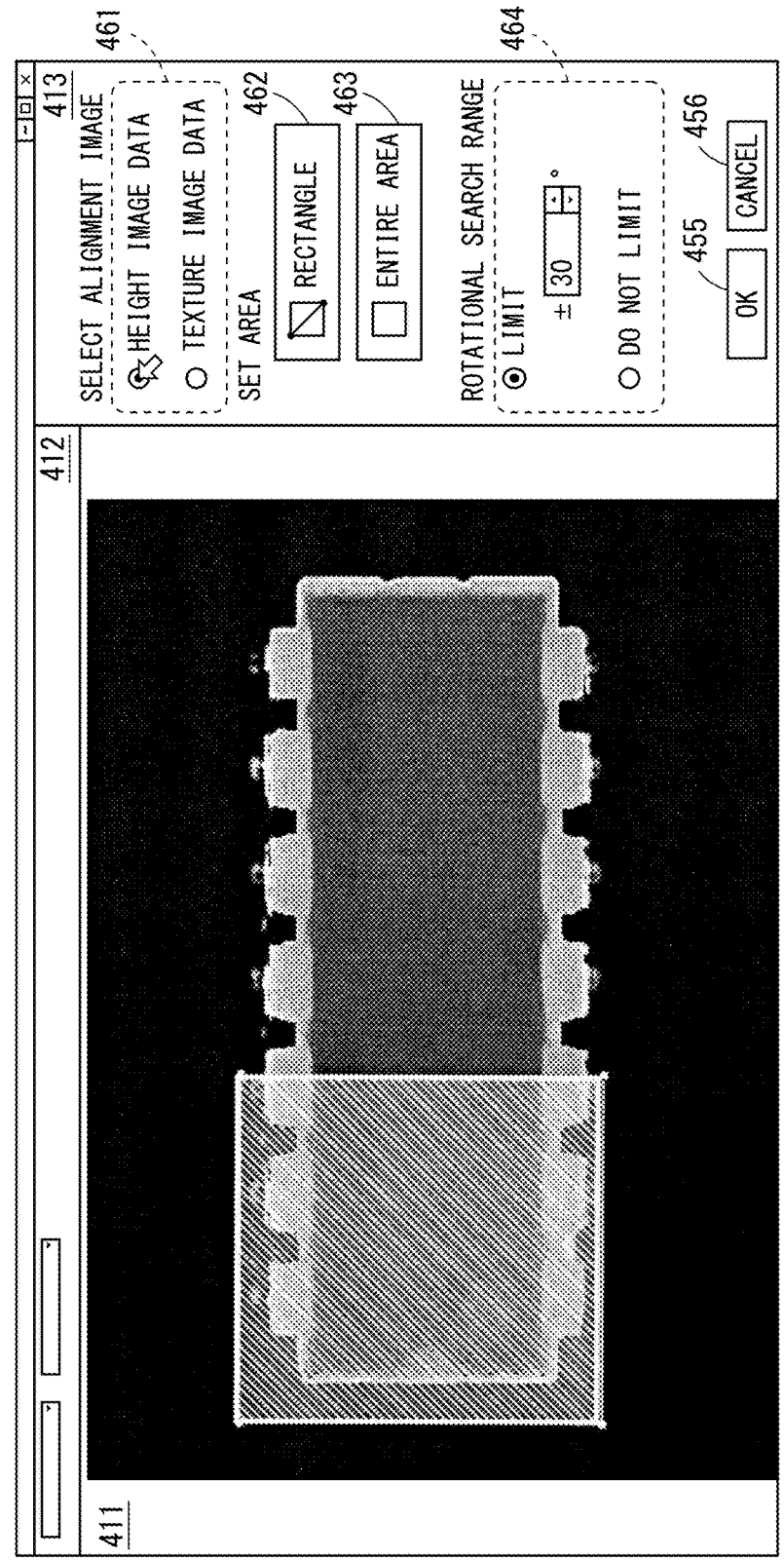
FIG. 14 is a view for explaining one example of use of the image inspection device in the setting mode.

When the texture image data is selected, the texture image is displayed in the main display field 411 as shown in FIG. 13. On the other hand, when the height image data is selected, the height image is displayed in the main display field 411 as shown in FIG. 14. Accordingly, by viewing the main display field 411 while operating the image selection operation part 461, the setting creator can judge image data appropriate for the reference image data.

After selecting the image data to be used for registering the reference image data, the setting creator operates the rectangular area setting button 462, for example. In this case, the setting creator performs drag operation on the main display field 411, and can thereby change the position and the size of the rectangular area specification image. This enables the setting creator to set an area on the image which corresponds to the reference image data to have a desired size at a desired position, and register the reference image data corresponding to the set area.

Meanwhile, after selecting the image data to be used for registering the reference image data, the setting, creator operates the entire area setting button 463, for example. Thereby, the setting creator can register the reference image data corresponding to the entire area of the selected image data.

The area of the image of the reference image data registered by the above operation is set as a search area for pattern matching in the alignment in the inspection mode described later. In the image inspection device 500 of the present example, as a search condition for pattern matching in the alignment in the inspection model, a search angle can be set in addition to the search area.

By operating the rotation range setting area 464 of FIGS. 13 and 14, the setting creator can set that the search angle is to be limited or the search angle is not to be limited. Further, when the search angle is to be limited, the setting creator can specify the magnitude of the search angle. In this case, the search angle is set with the specified magnitude.

After completing the selection of the image data, the setting of the search area and the setting of the search angle, the setting creator operates the OK button 455 displayed in the side sub-display field 413. Thereby, the display part 400 returns to the display state of FIG. 12, with the reference image data in the registered state.

Registering a characteristic portion of the setting target S in the setting mode allows more detailed alignment (hereinafter referred to as detailed alignment) to be performed based on the registered characteristic portion after the alignment by pattern matching in the inspection mode.

When the characteristic portion of the setting target S is to be registered, the setting creator operates the detail alignment setting button 453 of FIG. 12 after performing the registration operation concerning the reference image data. In this case, as shown in FIG. 15, the texture image of the setting target S is displayed in the main display field 411, and in the side sub-display field 413, there are displayed a plurality of drawing buttons 471, an edge detection button 472, an image selection operation part 473, and a plurality of detailed alignment method buttons 474.

By operating the image selection operation part 473, the setting creator can select either the texture image data or the height image data as the image data to be used for registering the characteristic portion.

Figure 15:
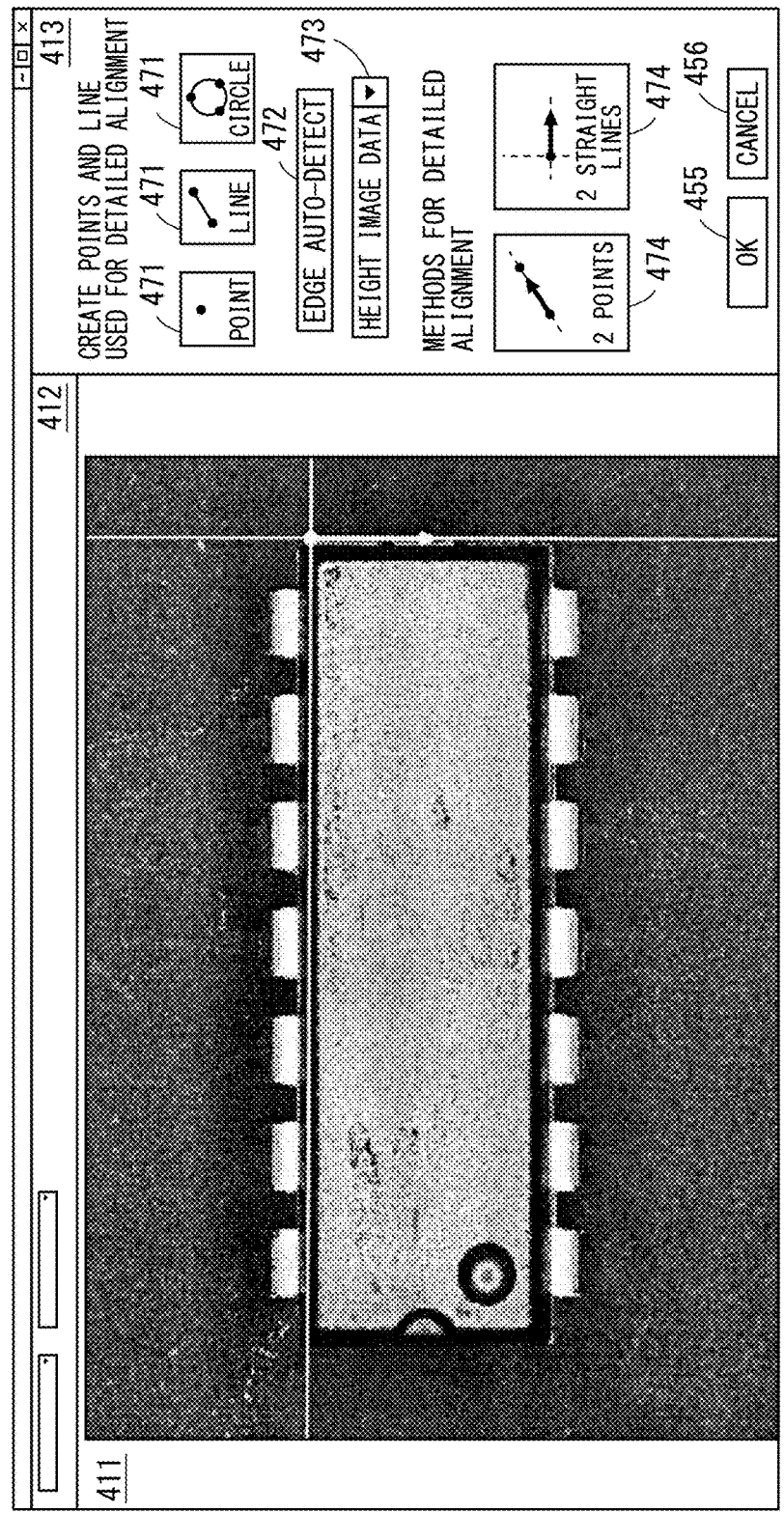
FIG. 15 is a view for explaining one example of use of the image inspection device in the setting mode.

When the texture image data is selected, the texture image is displayed in the main display field 411 as shown in FIG. 15. On the other hand, when the height image data is selected, the height image is displayed in the main display field 411. Accordingly, by viewing the main display field 411 while operating the image selection operation part 473, the setting creator can judge image data appropriate for registering the characteristic portion.

Subsequently, the setting creator operates the plurality of drawing buttons 471, to draw a point or a line as a geometric figure for specifying the characteristic portion on the image of the setting target S displayed in the main display field 411. In the example of FIG. 15, two straight lines are drawn respectively along one short side and one long side of the image of the setting target S having a substantially rectangular shape, the long side being orthogonal to the short side. Here, the setting creator operates the edge detection button 472 prior to the drawing operation, and can thereby draw each of the two straight lines along an edge detected on the image of the setting target S.

After completing the drawing of the geometric figure for specifying the characteristic portion, the setting creator operates any of the plurality of detailed alignment method buttons 474. Thereby, the method for specifying the characteristic portion based on the drawn geometric figure is set.

In the example of FIG. 15, the two straight lines drawn on the texture image specifies a corner of the setting target S which is located at an intersection of the two straight lines. Further, one short side of the setting target S along the straight line extending from the corner is specified. The specified corner and one short side are registered as characteristic portions of the setting target S.

After completing the registration of the characteristic portions, the setting creator operates the OK button 455 displayed in the side sub-display field 413. Thereby, the display part 400 returns to the display state of FIG. 12.

Before generation of the inspection setting information using the setting target S, texture image data and height image data of the measurement target S having the same shape as that of the setting target S are previously acquired as specimen image data and stored in the storage device 240 of FIG. 1.

Figure 16:
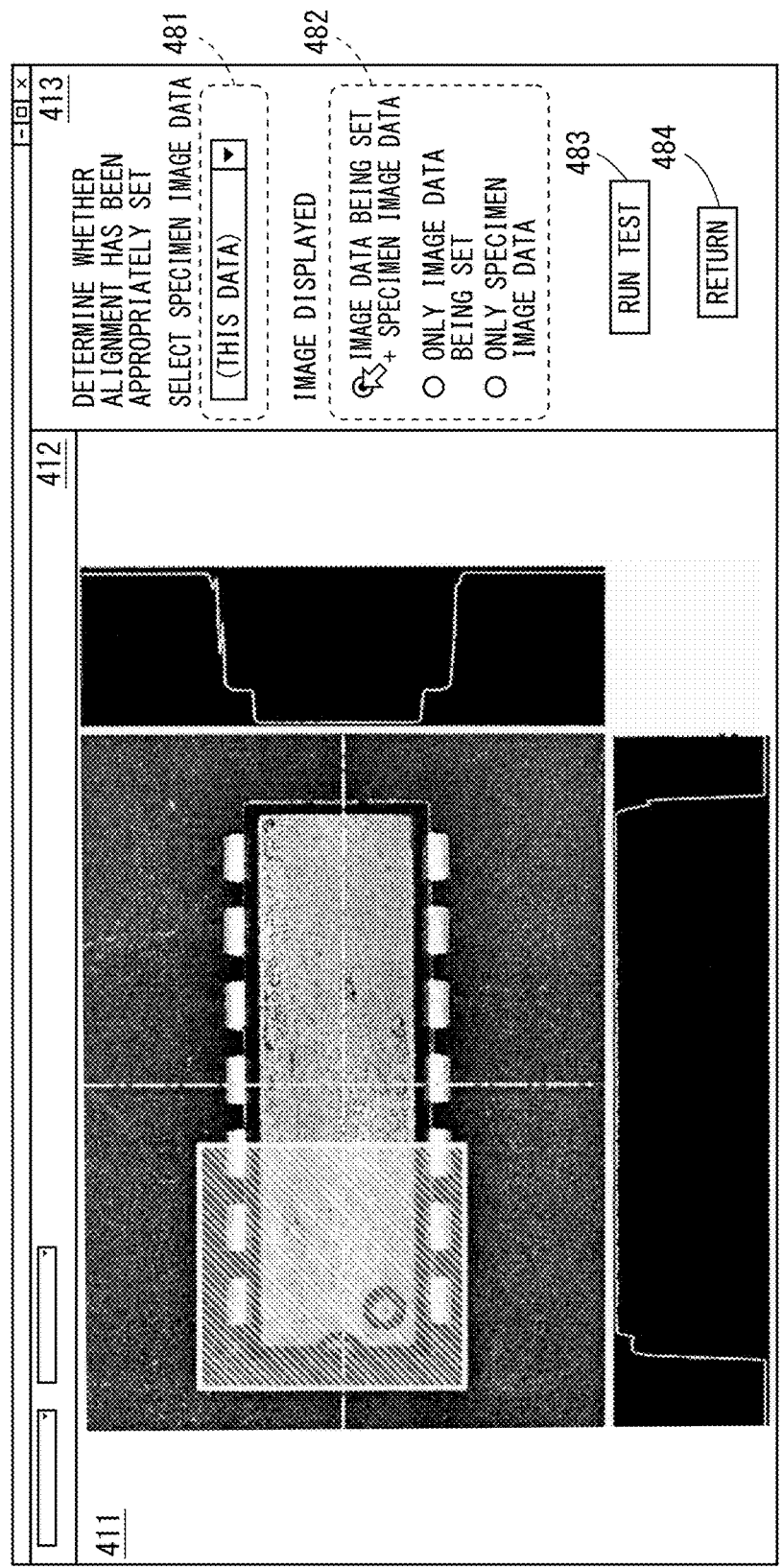
FIG. 16 is a view for explaining one example of use of the image inspection device in the setting mode.

Based on the specimen image data, the setting creator can determine whether or not the alignment in the inspection mode will be appropriately performed by the registered reference image data. In this case, the setting creator operates the alignment test button 454 displayed in the side sub-display field 413 of FIG. 12. Thereby, as shown in FIG. 16, the texture image of the setting target S is displayed in the main display field 411. On the texture image, two straight lines that orthogonally intersect at the center are overlapped and displayed as indicated by white dashed lines. Further, on the texture image, a search area corresponding to the registered reference image data is overlapped and displayed. In FIG. 16, the search area is indicated by white hatching.

Below the texture image, there is represented a surface shape of the setting target S which corresponds to a straight line extending horizontally on the texture image. Further, beside the texture image, there is represented a surface shape of the setting target S which corresponds to a straight line extending vertically on the texture image. At this point, the plurality of images displayed in the main display field 411 are images based on the texture image data and the height image data of the setting target S which are acquired before registration of the reference image data.

As described above, with the plurality of images displayed in the main display field 411, in the side sub-display field 413, there are displayed a specimen image selection operation part 481, a display image selection operation part 482, a test run button 483, and a return button 484.

The specimen image selection operation part 481 includes a pulldown menu, for example, and is configured so as to allow selection of one or more pieces of specimen image data previously stored in the storage device 240 of FIG. 1. By operating the specimen image selection operation part 481, the setting creator selects a desired specimen image data. Thereby, the selected specimen image data is read out.

Figure 17:
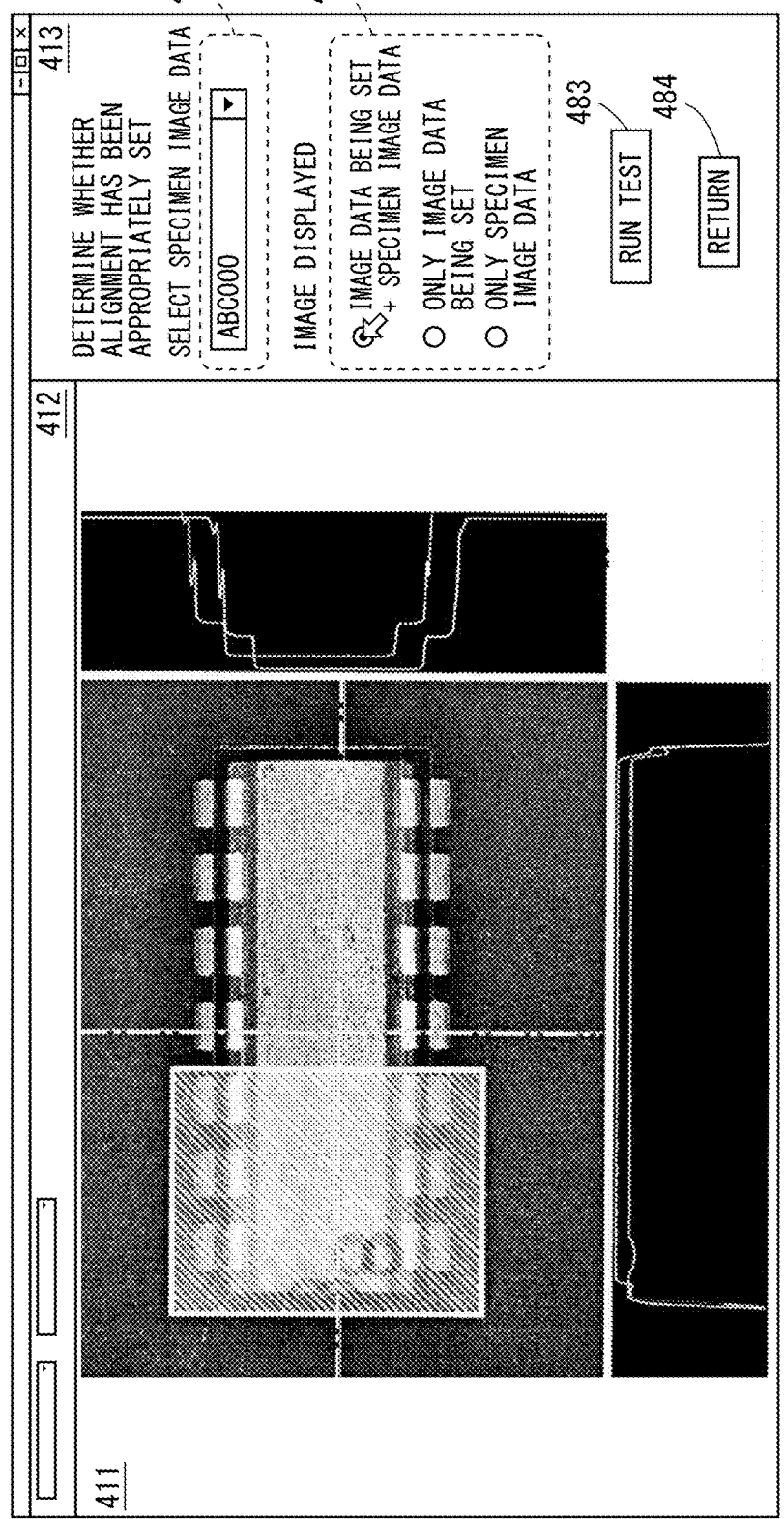
FIG. 17 is a view for explaining one example of use of the image inspection device in the setting mode.

Next, by operating the display image selection operation part 482, the setting creator can select the image to be displayed in the main display field 411. For example, the setting creator enables only the image of the setting target S to be displayed in the main display field 411. Further, the setting creator enables only the image based on the read-out specimen image data to be displayed in the main display field 411. Moreover, as shown in FIG. 17, the setting creator enables the image of the setting target S and the image based on the specimen image data to be superimposed and displayed on the main display field 411.

In a state where the specimen image data corresponding to the setting target S has been read out, the setting creator operates the test run button 483. Thereby, the specimen image data corresponding to the reference image data registered concerning the setting target S is registered as alignment image data.

That is, when the reference image data is the texture image data, the specimen image data of the texture image data is registered as the alignment image data. On the other hand, when the reference image data is the height image data, the specimen image data of the height image data is registered as the alignment image data.

Figure 18:
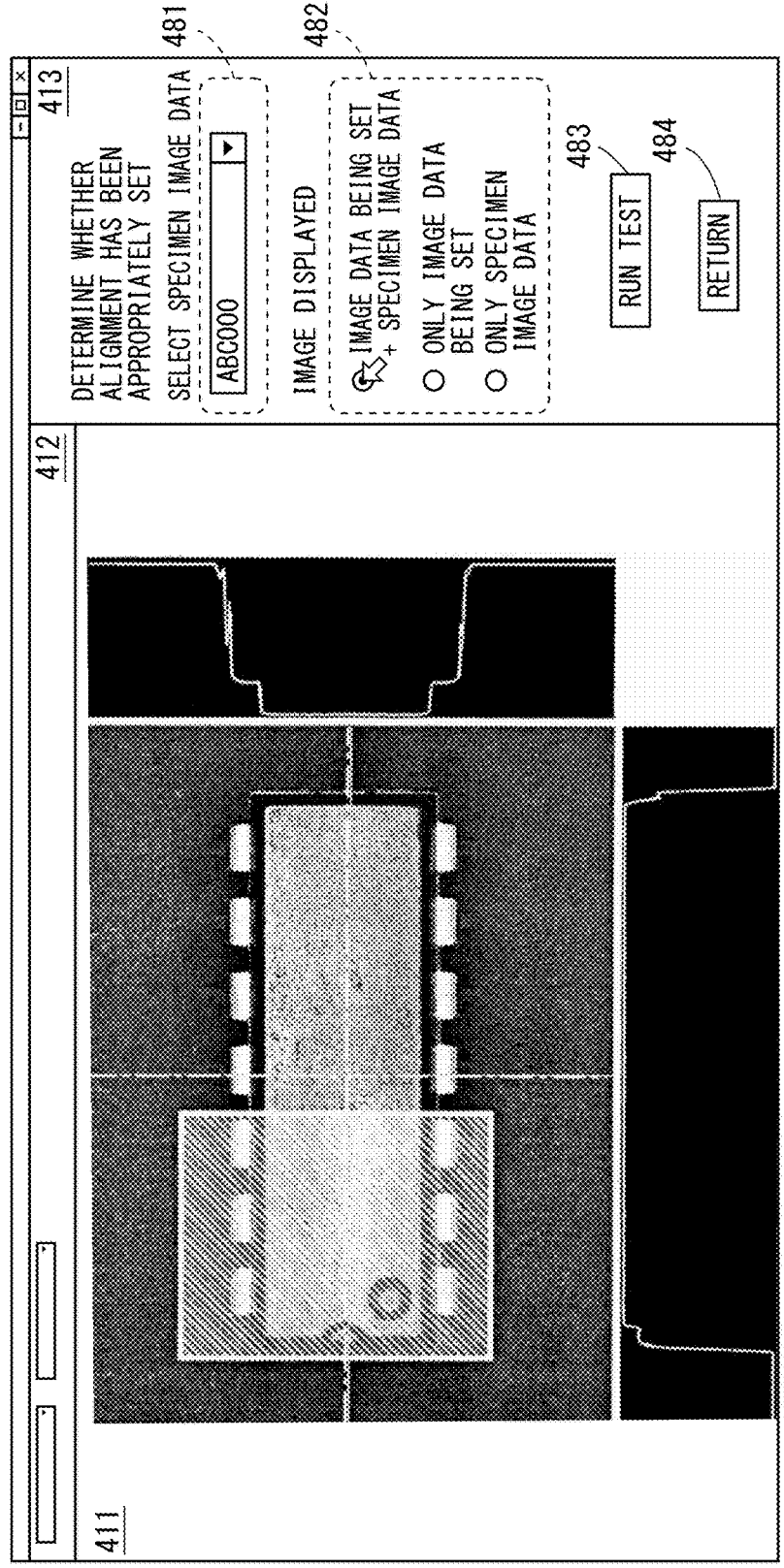
FIG. 18 is a view for explaining one example of use of the image inspection device in the setting mode.

Thereafter, the alignment image data is aligned to the reference image data by pattern matching. In this state, for example as shown in FIG. 18, the setting creator can confirm that the texture image of the setting target S and the texture image based on the specimen image data overlap in a wide range on the main display field 411. Hence the appropriateness of the registered reference image data can be easily determined in a short period of time.

Figure 19:
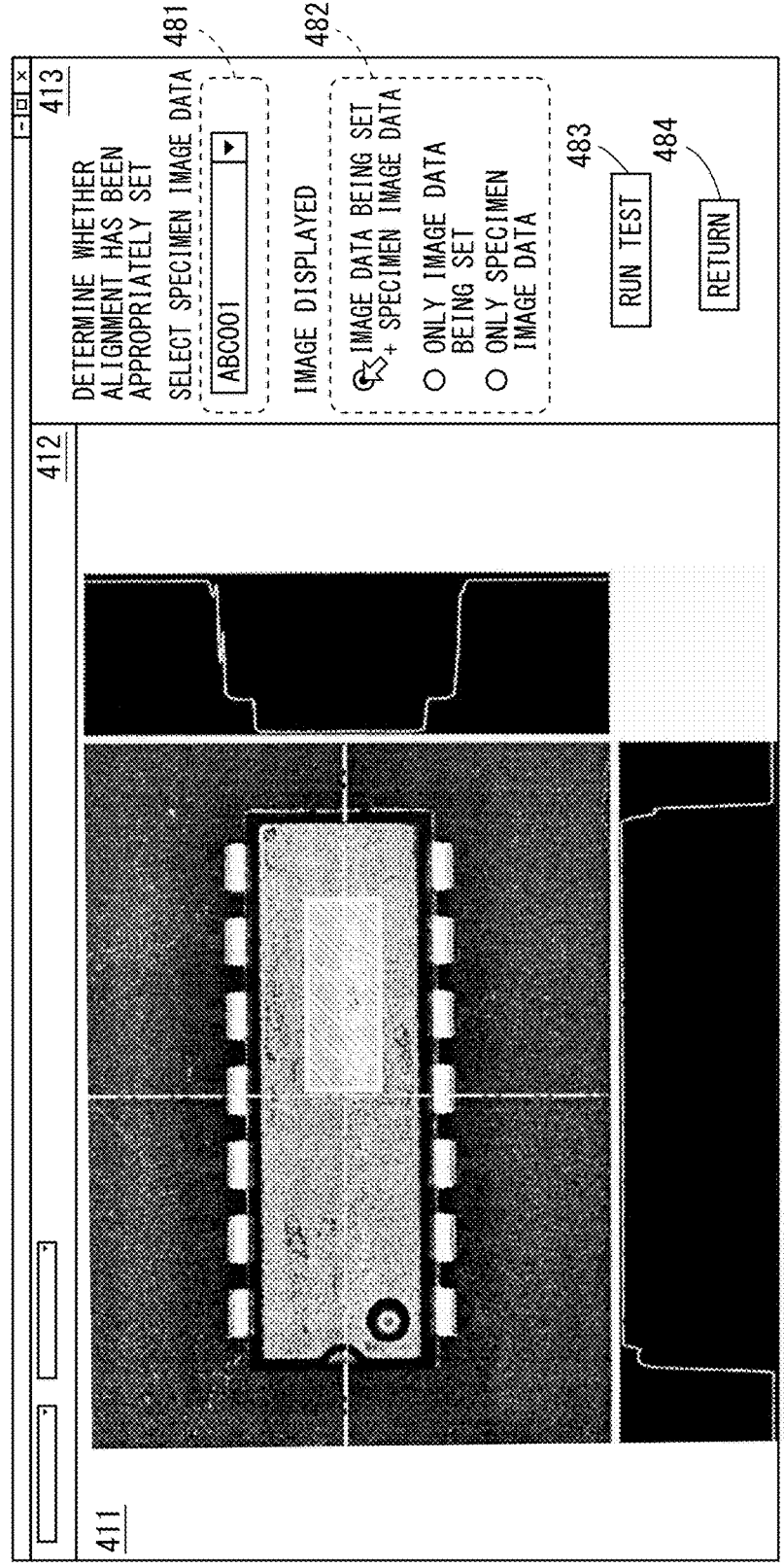
FIG. 19 is a view for explaining one example of use of the image inspection device in the setting mode.
Figure 20:
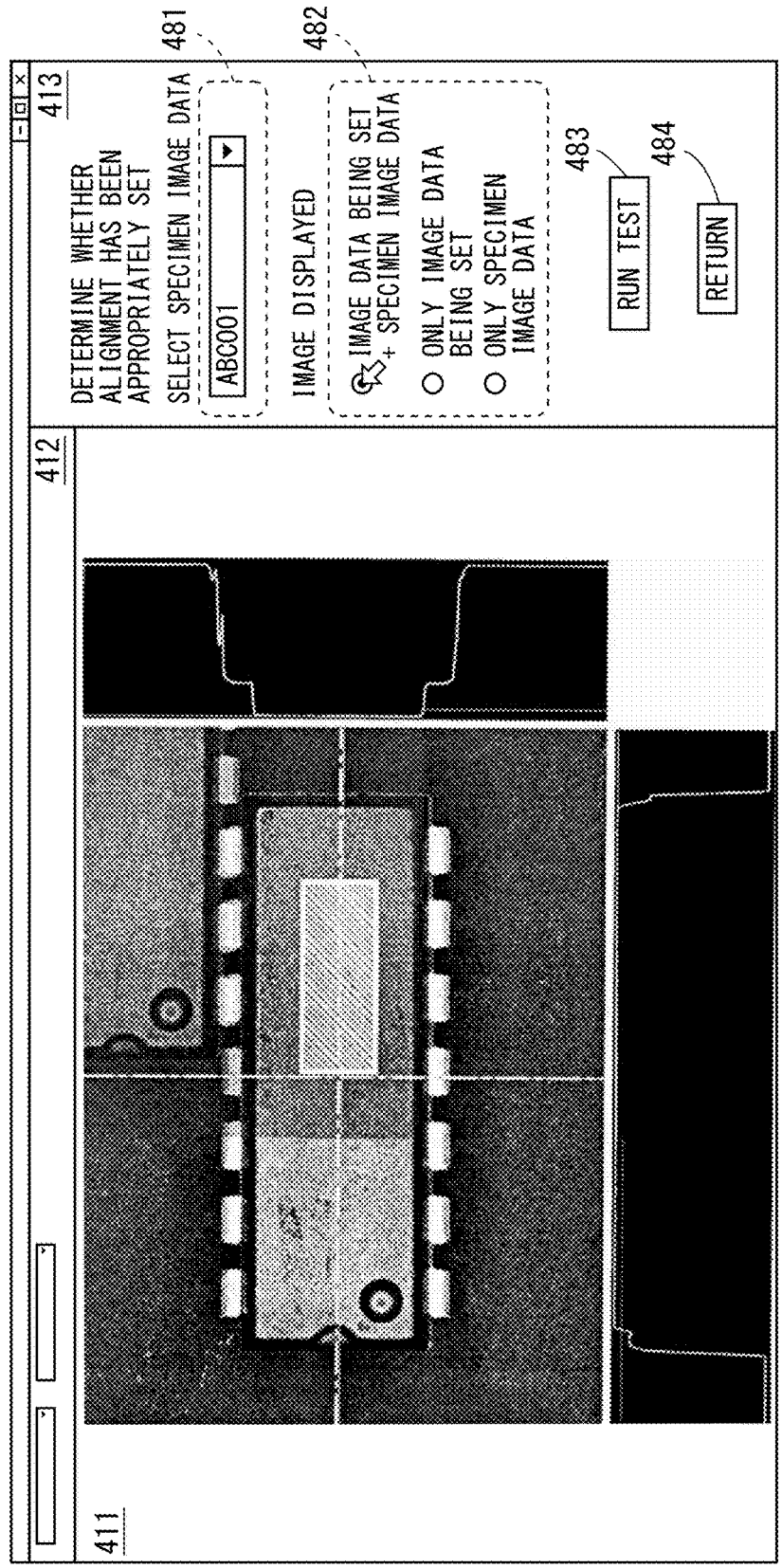
FIG. 20 is a view for explaining one example of use of the image inspection device in the setting mode.

Here, as shown in FIG. 19, when reference image data corresponding to a portion without a characteristic pattern in the texture image of the setting target S is to be registered, pattern matching may not be appropriately performed. In this case, as shown in FIG. 20, the texture image of the setting target S and the texture image based on the specimen image data are displayed in the state of hardly overlapping each other. Thus, by viewing the main display field 411, the setting creator can easily determine the inappropriateness of the registered reference image data in a short period of time. Accordingly, the setting creator can again register new reference image data.

When it is possible to determine in the CPU 210 of FIG. 1 whether or not the alignment image data has been accurately aligned to the reference image data, the determination result may be displayed in the display part 400.

After the determination on the registered reference image data is performed as described above, the setting creator operates the return button 484. Thereby, the display part 400 returns to the display state of FIG. 11.

Figure 21:
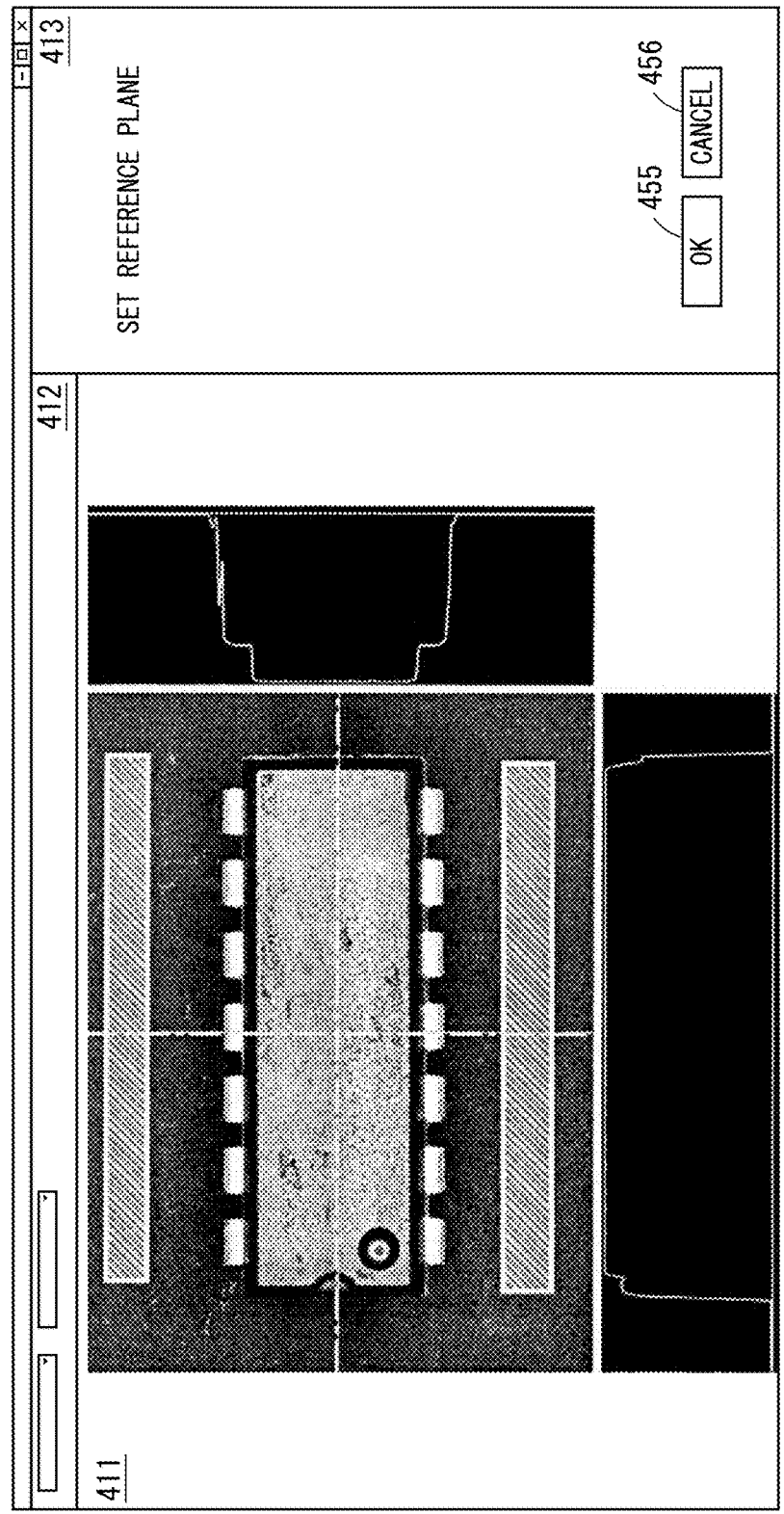
FIG. 21 is a view for explaining one example of use of the image inspection device in the setting mode.

In the setting mode, after the texture image data and the height image data of the setting target S are acquired, any reference plane intersecting with the Z-direction can be specified. In this case, the setting creator operates the reference plane setting button 442 of FIG. 11. Thereby, as shown in FIG. 21, the texture image of the setting target S is displayed in the main display field 411. On the texture image, as in the example of FIG. 16, two straight lines that orthogonally intersect at the center are overlapped and displayed. Further, below the texture image, there is represented a surface shape of the setting target S which corresponds to a straight line extending horizontally. Moreover, beside the texture image, there is represented a surface shape of the setting target S which corresponds to a straight line extending vertically.

By performing drag operation on the main display field 411, the setting creator can specify a desired number of rectangular areas with desired sizes in desired positions as indicated by white hatching. In this case, the reference plane is calculated so as to include the whole of one or more specified rectangular areas, and then registered. Specifically, the reference plane is calculated for example by use of the method of least squares based on a Z-directional position of each position on the surface of the one or more specified rectangular areas.

By registering the reference plane as thus calculated, the height image data acquired concerning the setting target S is corrected such that the position of each portion on the surface of the setting target S represents a distance from the registered reference plane in a direction orthogonal to the reference plane. In this case, according to the height data after the correction, it is possible to easily confirm the position of each portion on the surface of the setting target S from the reference plane.

For example, as shown in FIG. 21, when the reference plane is to be registered in some area of the placement surface of the stage 141 where the setting target S is placed, the height image data is corrected such that the position of each portion on the surface of the setting target S represents a distance from the placement surface of the stage 141. After completing the registration of the reference plane, the setting creator operates the OK button 455 displayed in the side sub-display field 413. Thereby, the display part 400 returns to the display state of FIG. 11.

Figure 22:
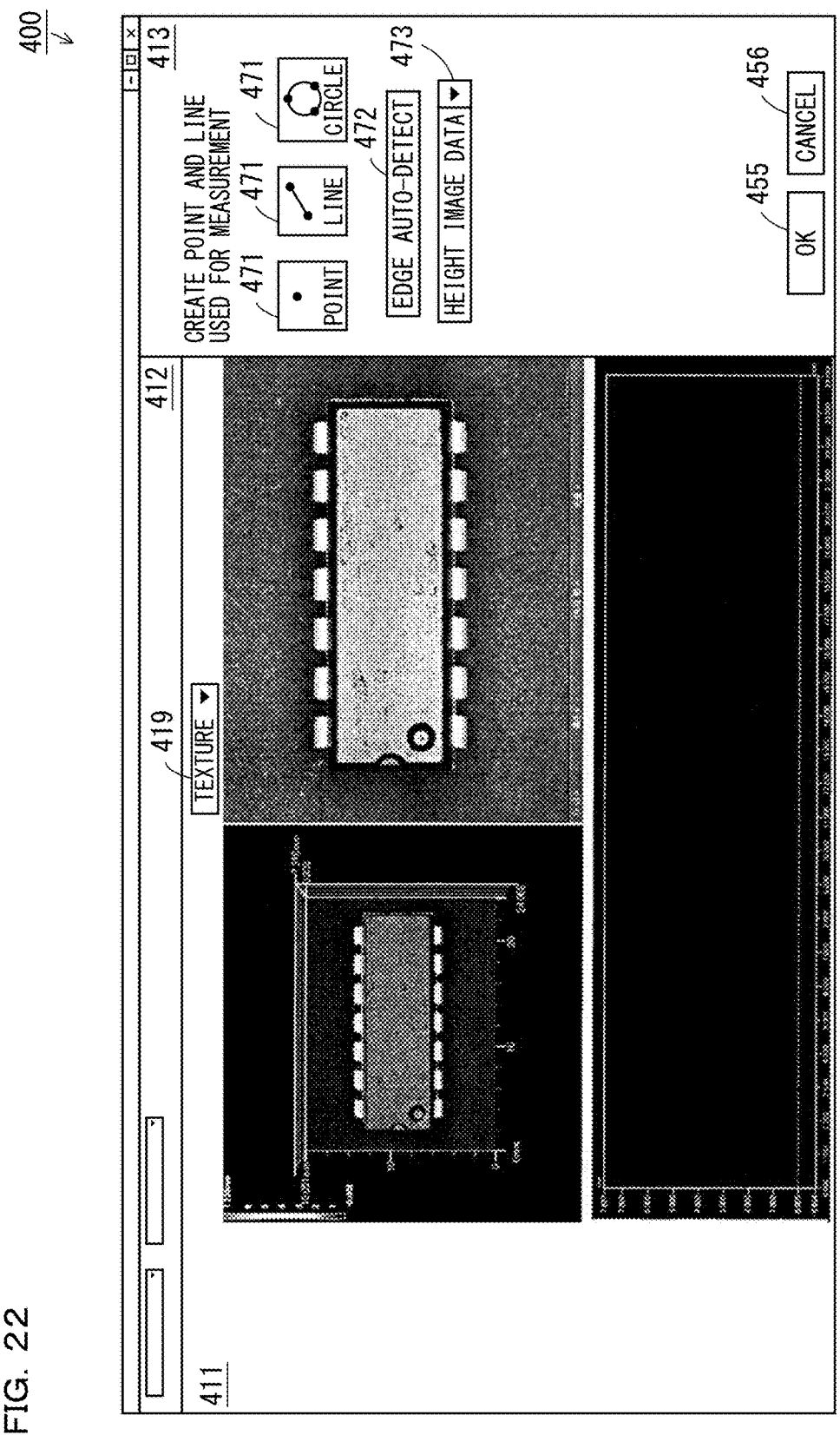
FIG. 22 is a view for explaining one example of use of the image inspection device in the setting mode.

The setting creator measures the size of the measurement target portion predetermined based on the texture image data and the height image data acquired concerning the setting target S. In this case, the setting creator operates the profile button 444 of FIG. 11. Thereby, as shown in FIG. 22, the synthesized image and the texture image of the setting target S are displayed in the main display field 411 so as to be adjacent to each other. Further, below the synthesized image and the texture image, a display area for displaying the surface shape of the setting target S is formed.

In the display state of FIG. 22, a display image switch button 419 is displayed above the texture image. By operating the display image switch button 419, the setting creator can switch the texture image displayed in the main display field 411 to the height image. Further, the setting creator can switch the height image displayed in the main display field 411 to the texture image.

A plurality of drawing buttons 471, the edge detection button 472 and the image selection operation part 473 are displayed in the side sub-display field 413. The setting creator first operates the image selection operation part 473, and can thereby select either the texture image data or the height image data as image data to be used for measuring the size of the measurement target portion.

Subsequently, the setting creator operates the plurality of drawing buttons 471, to draw a point or a line as a geometric figure for specifying the measurement target portion on the image of the setting target S displayed in the main display field 411. Here, the setting creator operates the edge detection button 472 prior to the drawing operation, and can thereby easily draw a line or points along an edge detected on the image of the setting target S.

Figure 23:
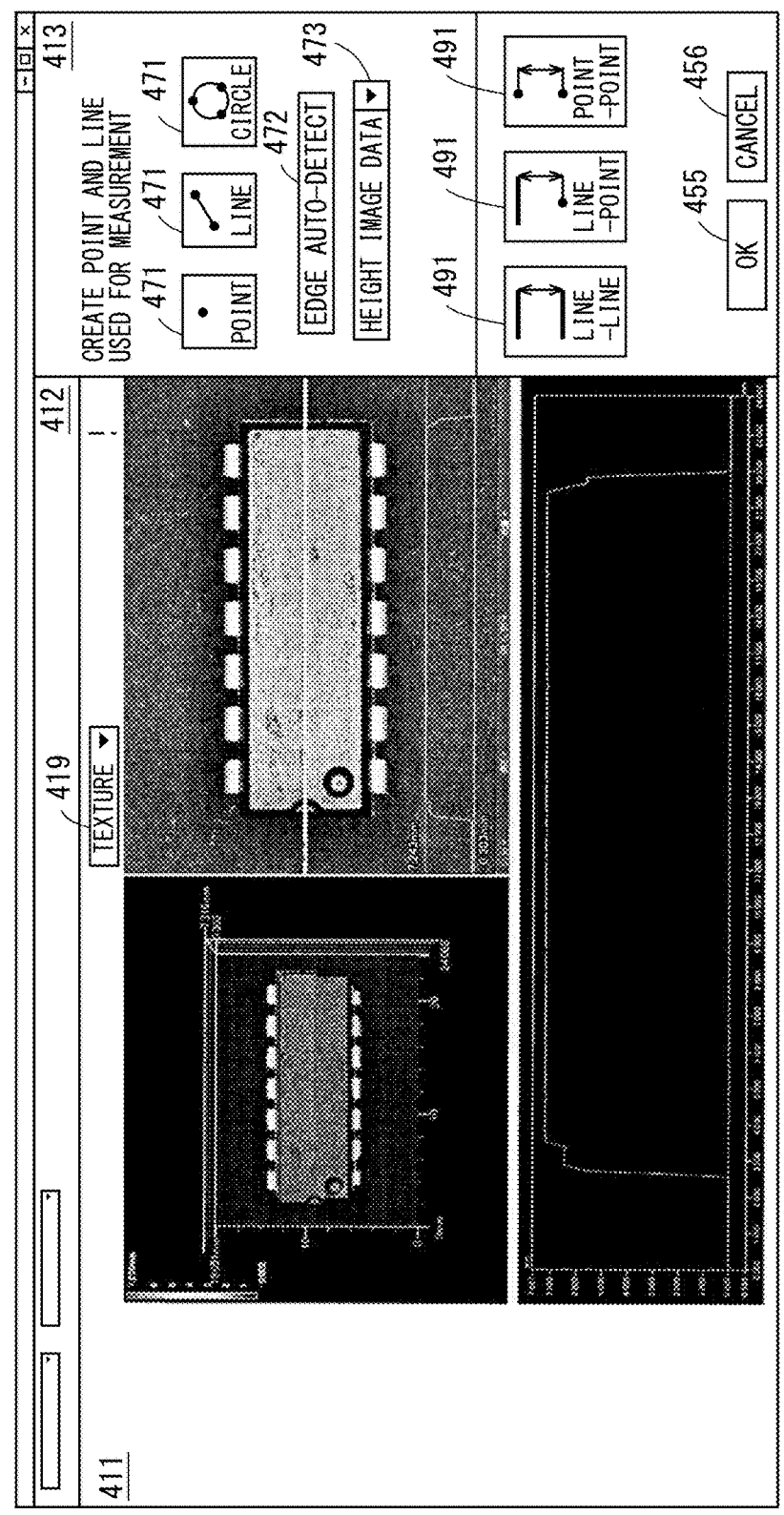
FIG. 23 is a view for explaining one example of use of the image inspection device in the setting mode.

As shown in FIG. 23, the drawn geometric figure is overlapped and displayed on the image of the setting target S displayed in the main display field 411. In the example of FIG. 23, a straight line extending horizontally is overlapped and displayed on the texture image displayed in the main display field 411. Further, below the synthesized image and the texture image, a surface shape of the setting target S which corresponds to the straight line is displayed.

Figure 24:
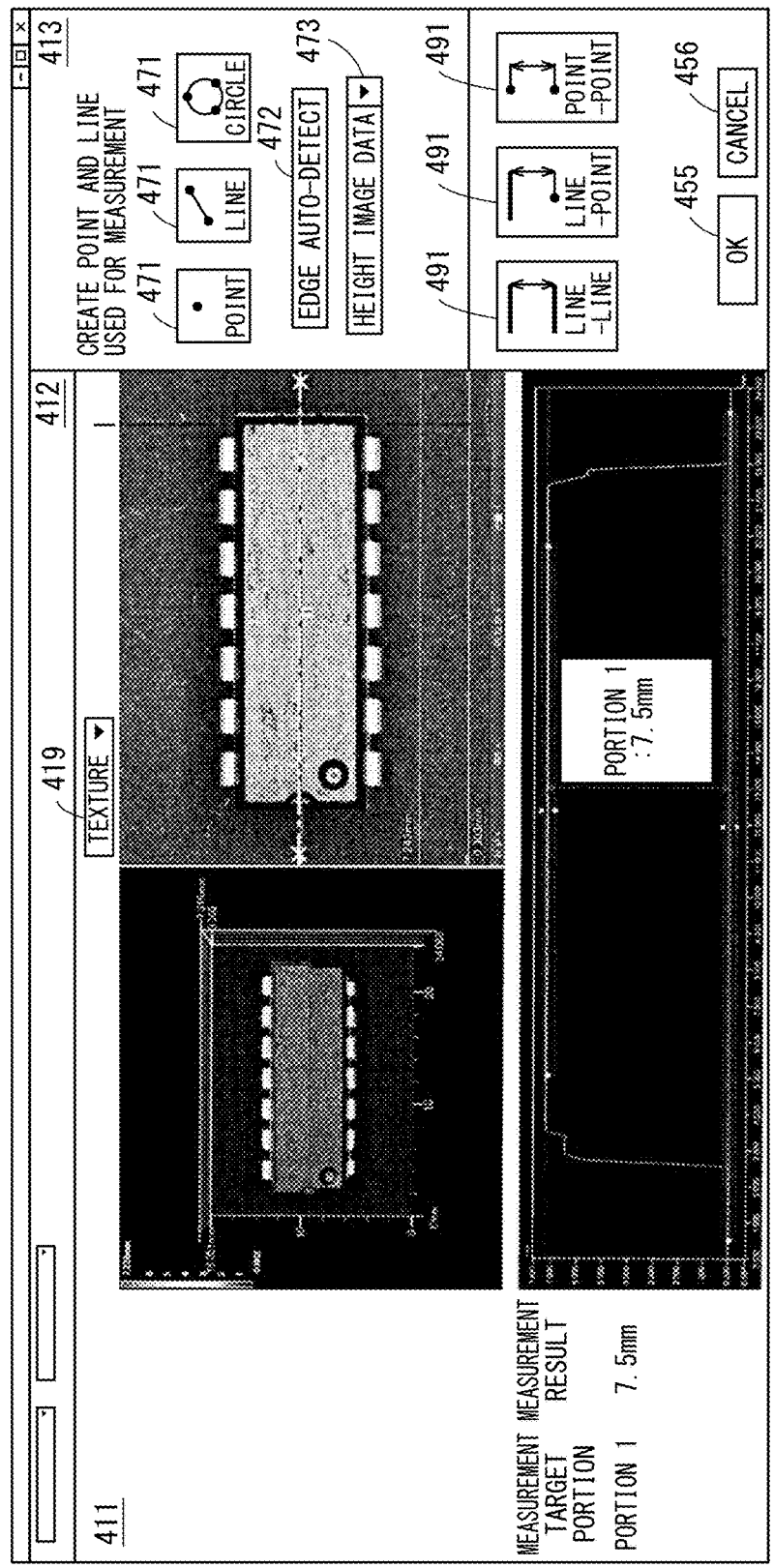
FIG. 24 is a view for explaining one example of use of the image inspection device in the setting mode.

In this state, a plurality of size measurement method buttons 491 are displayed in the side sub-display field 413. Then, the setting creator operates any of the plurality of size measurement method buttons 491, and specifies the measurement target portion on the plurality of images displayed in the main display field 411. Thereby, the size of the specified measurement target portion is measured. As a result, as shown in FIG. 24, the measurement result (measured value) is displayed in the main display field 411 while the image showing the measurement target portion is overlapped and displayed on the image of the setting target S.

Figure 25:
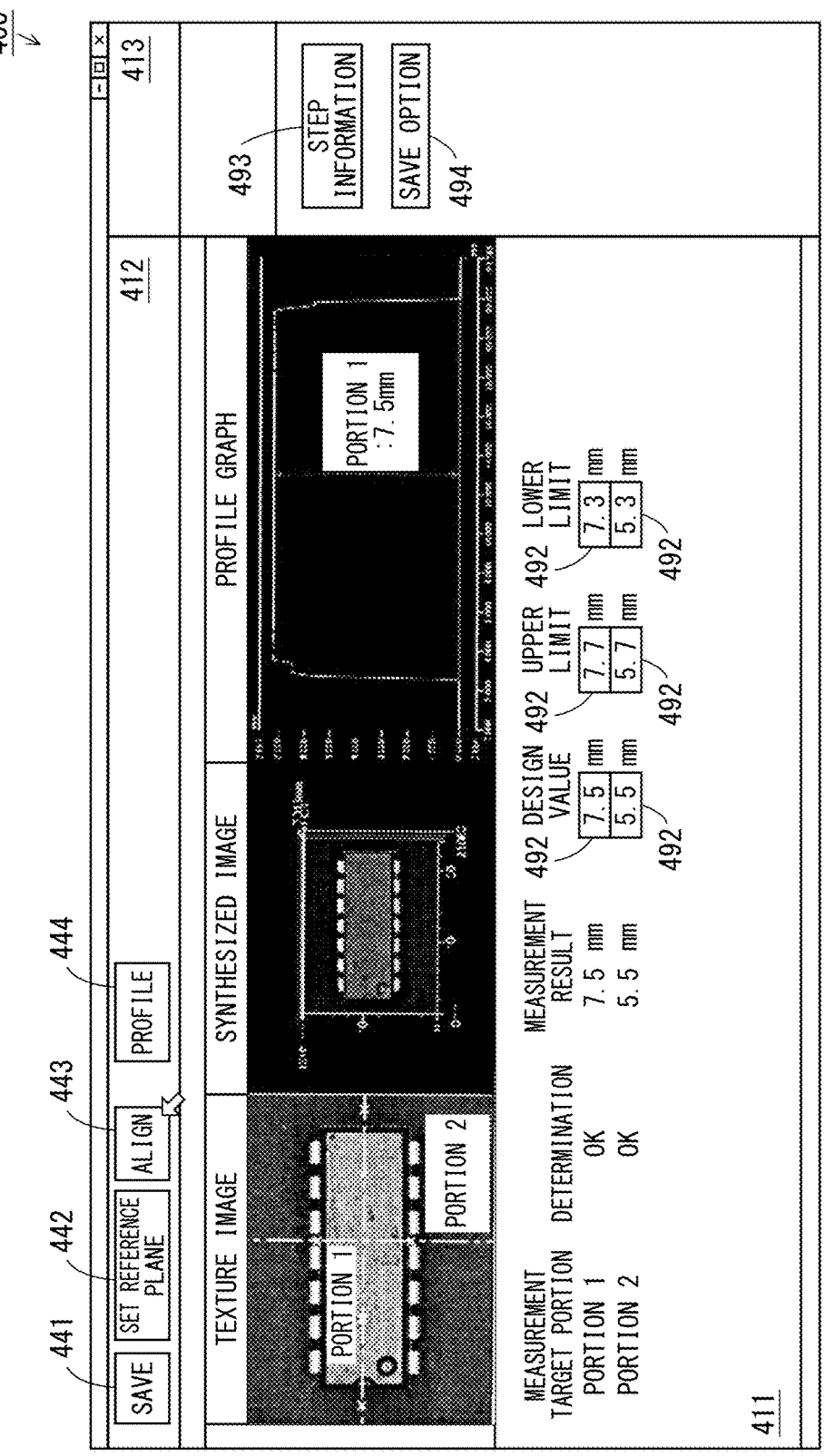
FIG. 25 is a view for explaining one example of use of the image inspection device in the setting mode.

In such a manner as thus described, after one or more measurement target portions are measured, the setting creator operates the OK button 455 displayed in the side sub-display field 413. Accordingly, as shown in FIG. 25, while a plurality of images concerning the setting target S are displayed in the main display field 411, a list of measurement results is displayed below those images. At this time, there are displayed a plurality of input fields 492 for receiving a design value, an upper limit and a lower limit of the size for each measurement target portion. In the present example, a range between the upper limit and the lower limit corresponds to a tolerance.

The setting creator inputs the design value, the upper limit, and the lower limit for each measurement target portion while confirming the measurement result. Accordingly, when the measurement result is within the range between the inputted upper limit and lower limit (tolerance), it can be determined that the size of the measurement target portion which corresponds to the measurement result is appropriate. On the other hand, when the measurement result is not within the range between the inputted upper limit and lower limit (tolerance), it can be determined that the size of the measurement target portion which corresponds to the measurement result is not appropriate.

Thereafter, the setting creator operates the save button 441 in the top sub-display field 412 of FIG. 25. Thereby, a data file of inspection setting information including a variety of information for measuring the size of the measurement target portion of the setting target S is stored into the storage device 240 of FIG. 1 as an inspection setting file. This completes the generation operation for the inspection setting information.

The inspection setting information mainly includes the imaging conditions, the movement amount of the X-Y stage 10 (the placement surface of the stage 141), the reference image data, the image processing setting conditions, the characteristic portion specifying method, the reference plane registration conditions, the measurement target portion specifying method, the size measurement method, the design value of the size, the upper limit of the size, the lower limit of the size, the texture image data, the height image data, the synthesized image data, the positioning image data described later, and the like.

In the display state of FIG. 25, a step information button 493 and a save option button 494 are displayed in the side sub-display field 413. By operating the step information button 493, the setting creator can input, as the inspection setting information, information such as a "lot number", a "product name" and a "shipment destination" of the inspection target S in the inspection mode described later. Further, by operating the save option button 494, the setting creator can input a variety of information, such as a condition in which the measurement result is to be saved, in the inspection mode described later.

In the setting mode, positioning image data is registered as the inspection setting information. By registering the positioning image data, at the time of inspecting the inspection target S in the inspection mode described later, the position and the posture of the inspection target S can be easily and accurately aligned to the position and the position and the posture of the setting target S in the setting mode.

As described above, by operating the positioning setting button 431 displayed in the side sub-display field 413 of FIG. 9, the setting creator can set a method for registering positioning image data. In the following description, an image based on the positioning image data is referred to as a positioning image.

For example, the setting creator can set the method for registering the positioning image data such that the texture image data of the setting target S which is acquired by operation of the measurement button 432 of FIG. 9 is registered as the positioning image data. In this case, for example, the texture image of the setting target S shown in FIG. 9 serves as the positioning image.

Further, the setting creator can set the method for registering the positioning image data such that a plurality of pieces of positioning image data are registered. When registration operation for the plurality of pieces of positioning image data is started, as shown in FIG. 26, a registration button 415 and a completion button 417 are displayed in the side sub-display field 413 while the texture image of the setting target S is displayed in the main display field 411.

The setting creator operates the registration button 415, with the setting target S in a desired position and posture. Thereby, the acquired texture image data is registered as one piece of positioning image data. Subsequently, the setting creator changes the imaging condition and moves the X-Y stage 10 (the placement surface of the stage 141) to readjust the position and the posture of the setting target S, and thereafter operates the registration button 415. Accordingly, newly acquired texture image data is registered as the next positioning image data. Repetition of such registration operation leads to registration of a plurality of pieces of positioning image data.

Figure 26:
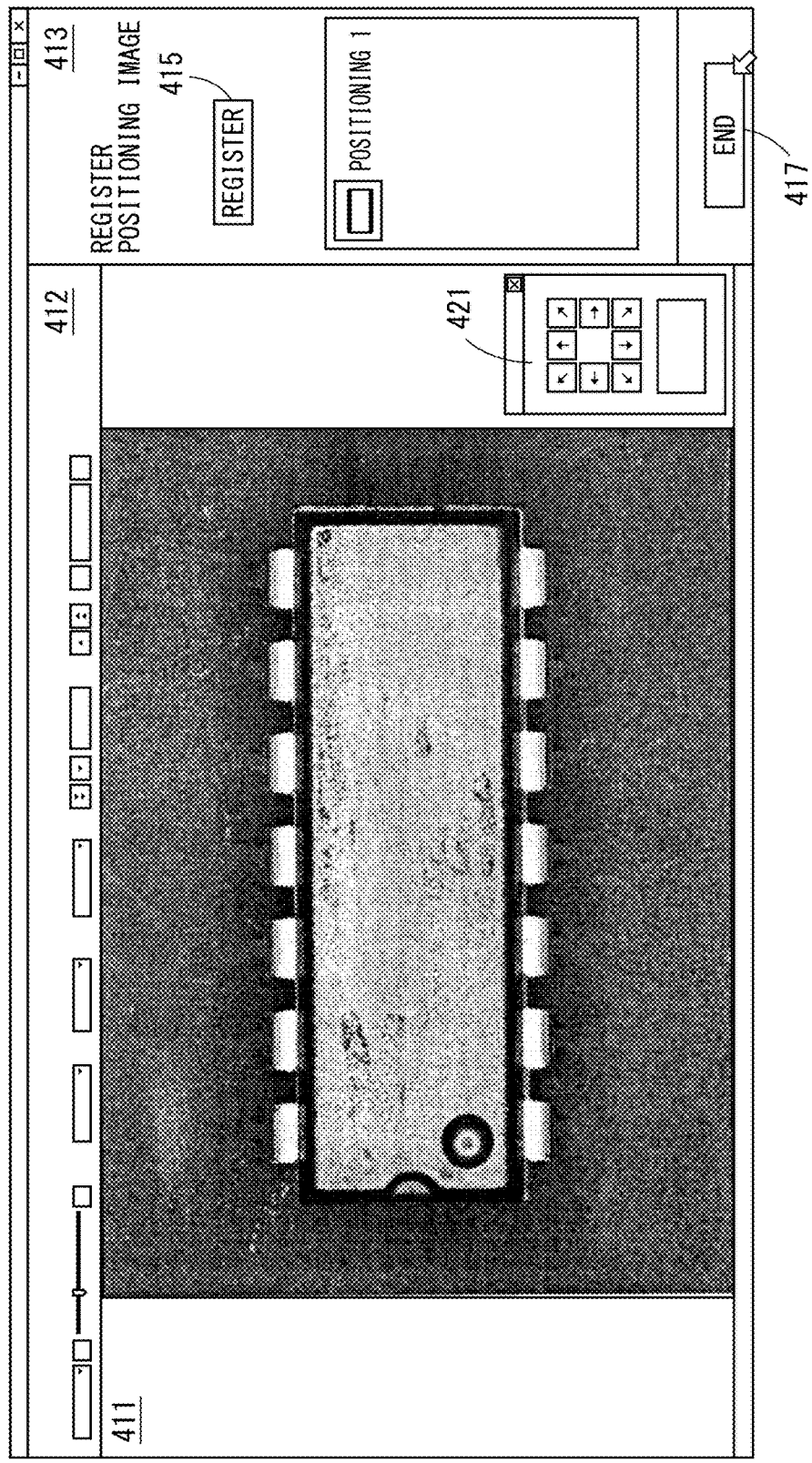
FIG. 26 is a view for explaining one example of use of the image inspection device in the setting mode.
Figure 27:
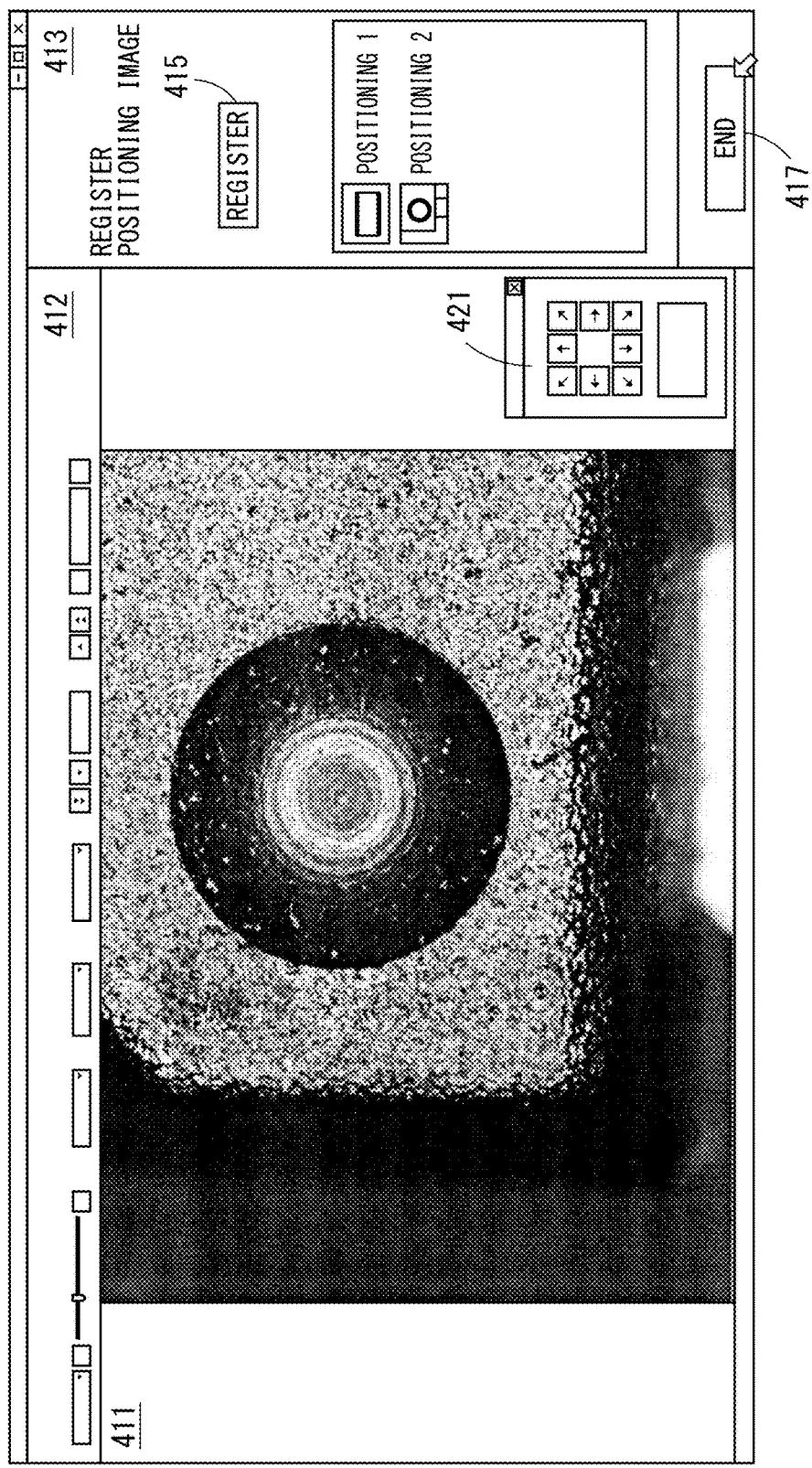
FIG. 27 is a view for explaining one example of use of the image inspection device in the setting mode.

At this time, the positioning images based on the registered positioning image data are sequentially reduced and displayed in the side sub-display field 413 as shown in FIGS. 26 and 27. This enables the setting creator to easily recognize the plurality of pieces of registered positioning image data.

Here, when one or more pieces of positioning image data are to be separately registered, each piece of the positioning image data is stored into the storage device 240 of FIG. 1 in the state of being associated with imaging conditions at the time of being acquired. Further, when the plurality of pieces of positioning image data are to be registered, the plurality of pieces of positioning image data are stored into the storage device 240 in the state of being associated with movement amounts of the X-Y stage 10 in the X-direction, the Y-direction, and the Z-direction which is moved by the setting creator at the time of the registration operation.

For example, first in the state of the light reception part 120 being set to a low magnification, as shown in FIG. 26, texture image data showing the whole of the setting target S is acquired, and the acquired texture image data is registered as first positioning image data. At this time, the first positioning image data is stored into the storage device 240 in the state of being associated with imaging conditions including the magnification of the light reception part 120 at the time of registration.

Next, the setting creator moves the X-Y stage 10 (the placement surface of the stage 141) in the X-direction and the Y-direction such that one corner of the setting target S is displayed at the center of the texture image. Thereafter, the setting creator changes the magnification of the light reception part 120 from a low magnification to a high magnification. Accordingly, as shown in FIG. 27, there is acquired texture image data showing an image with one corner of the setting target S expanded. In this state the acquired texture image data is registered as second positioning image data. At this time, the second positioning image data is stored into the storage device 240 in the state of being associated with imaging conditions including the magnification of the light reception part 120 at the time of registration. Further, the movement amount of the X-Y stage 10 after acquisition of the first positioning image data until acquisition of the second positioning image data is stored into the storage device 240 in the state of being associated with those pieces of positioning image data.

After a desired number of pieces of positioning image data are registered, the setting creator operates the completion button 417. Thereby, the display part 400 returns to the display state of FIG. 9.

(5-3) Detail of Inspection Mode

By the inspection operator operating the inspection run button 602 of FIG. 8, the CPU 210 of FIG. 1 operates in the inspection mode. In the inspection mode, the inspection operator inspects the inspection target S based on the inspection setting information generated by the setting creator.

Figure 28:
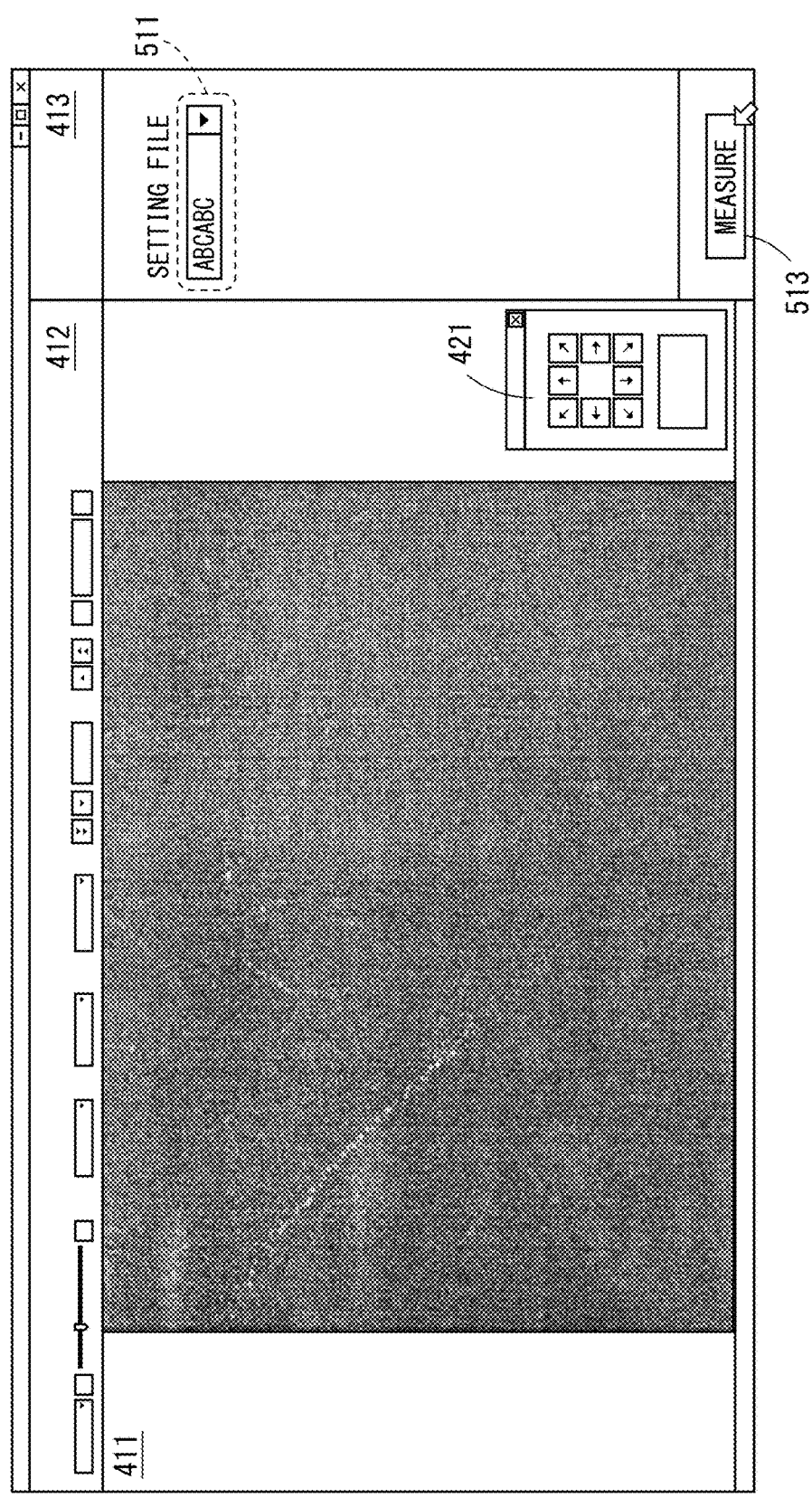
FIG. 28 is a view for explaining one example of use of the image inspection device in an inspection mode.

FIGS. 28 to 34 are views each for explaining one example of the use of the image inspection device 500 in the inspection mode. By operation of the inspection run button 602 of FIG. 8, as shown in FIG. 28, the main display field 411, the top sub-display field 412, and the side sub-display field 413 are displayed in the display part 400.

In the example of FIG. 28, a texture image showing the placement surface of the stage 141 is displayed in the main display field 411. In the top sub-display field 412, for example, a plurality of pulldown menus for adjusting a plurality of kinds of imaging conditions are displayed.

In the side sub-display field 413, an inspection setting file selection part 511 and a measurement button 513 are displayed. The inspection setting file selection part 511 includes a pulldown menu, for example, and is configured so as to allow selection of one or more inspection setting files previously stored in the storage device 240 of FIG. 1 in the setting mode.

By operating the inspection setting file selection part 511, the inspection operator selects a desired inspection setting file. Thereby, inspection setting information of the selected inspection setting file is read out. In the present example, the inspection setting information generated in the procedure shown in FIGS. 9 to 25 in the above setting mode is assumed to be read out.

Figure 29:
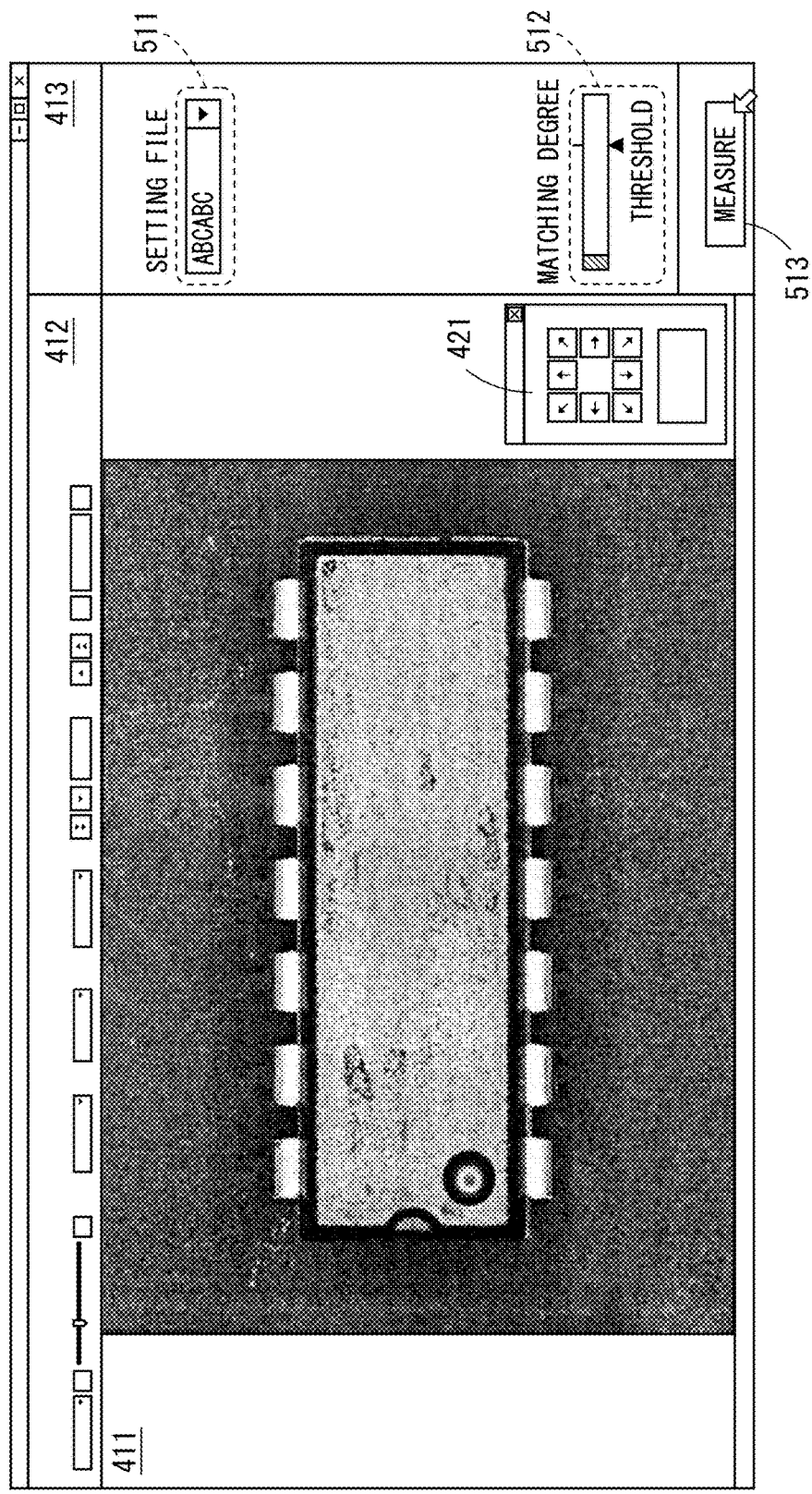
FIG. 29 is a view for explaining one example of use of the image inspection device in the inspection mode.

When one piece of positioning image data is included in the inspection setting information, as shown in FIG. 29, a positioning image based on the positioning image data is displayed in a translucent state in the main display field 411 so as to overlap the texture image that is displayed in real time. At this time, the imaging conditions associated with the positioning image data are read out. Thereby, the imaging conditions such as the magnification of the light reception part 120 are adjusted to the read-out imaging conditions corresponding to the positioning image data.

Figure 30:
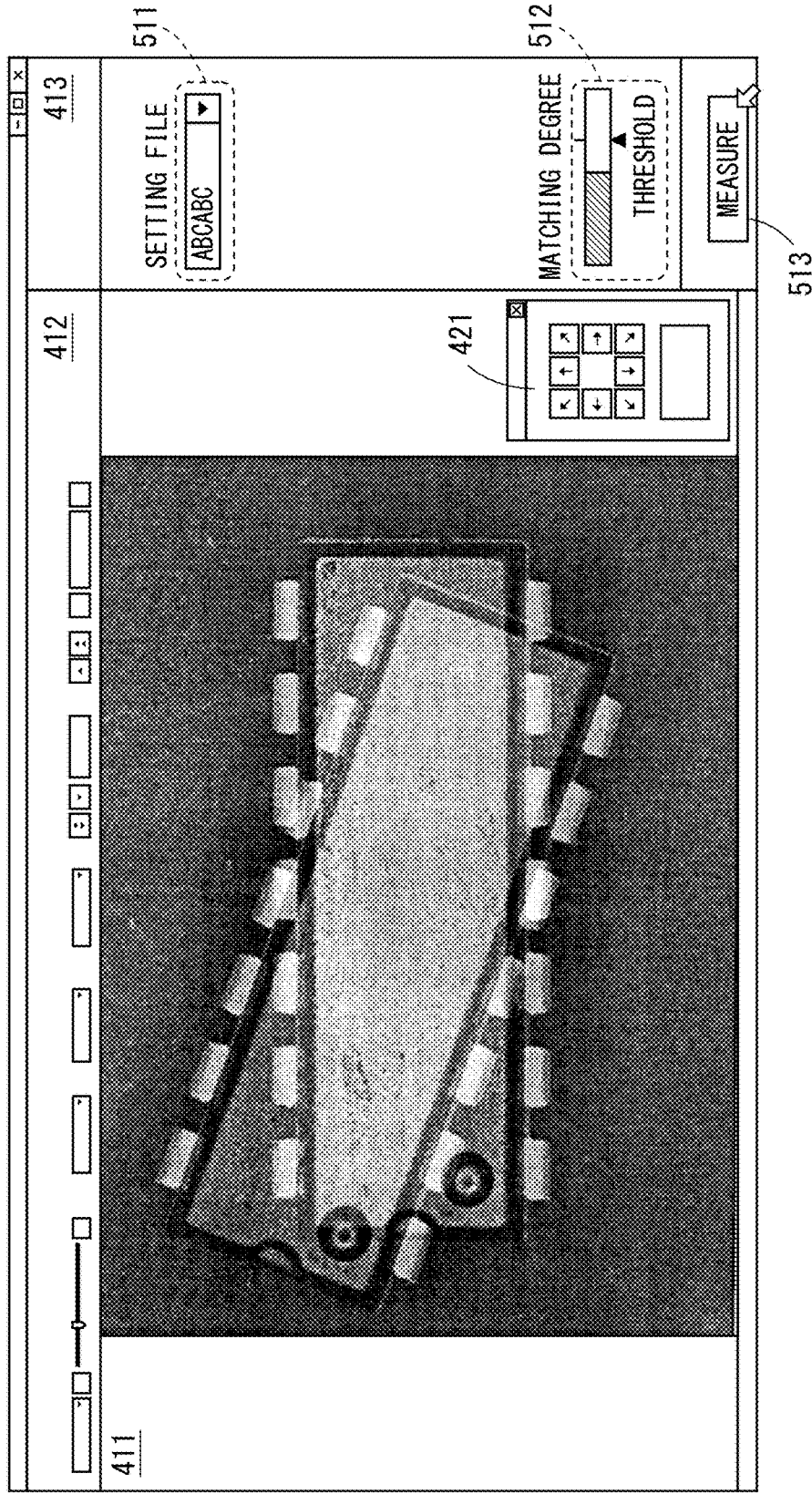
FIG. 30 is a view for explaining one example of use of the image inspection device in the inspection mode.

In this state, the inspection operator places the inspection target S on the stage 141. When the inspection target S enters an area for imaging by the light reception part 120, as shown in FIG. 30, the positioning image of the setting target S and the latest texture image of the setting target S are simultaneously displayed in the main display field 411.

Figure 31:
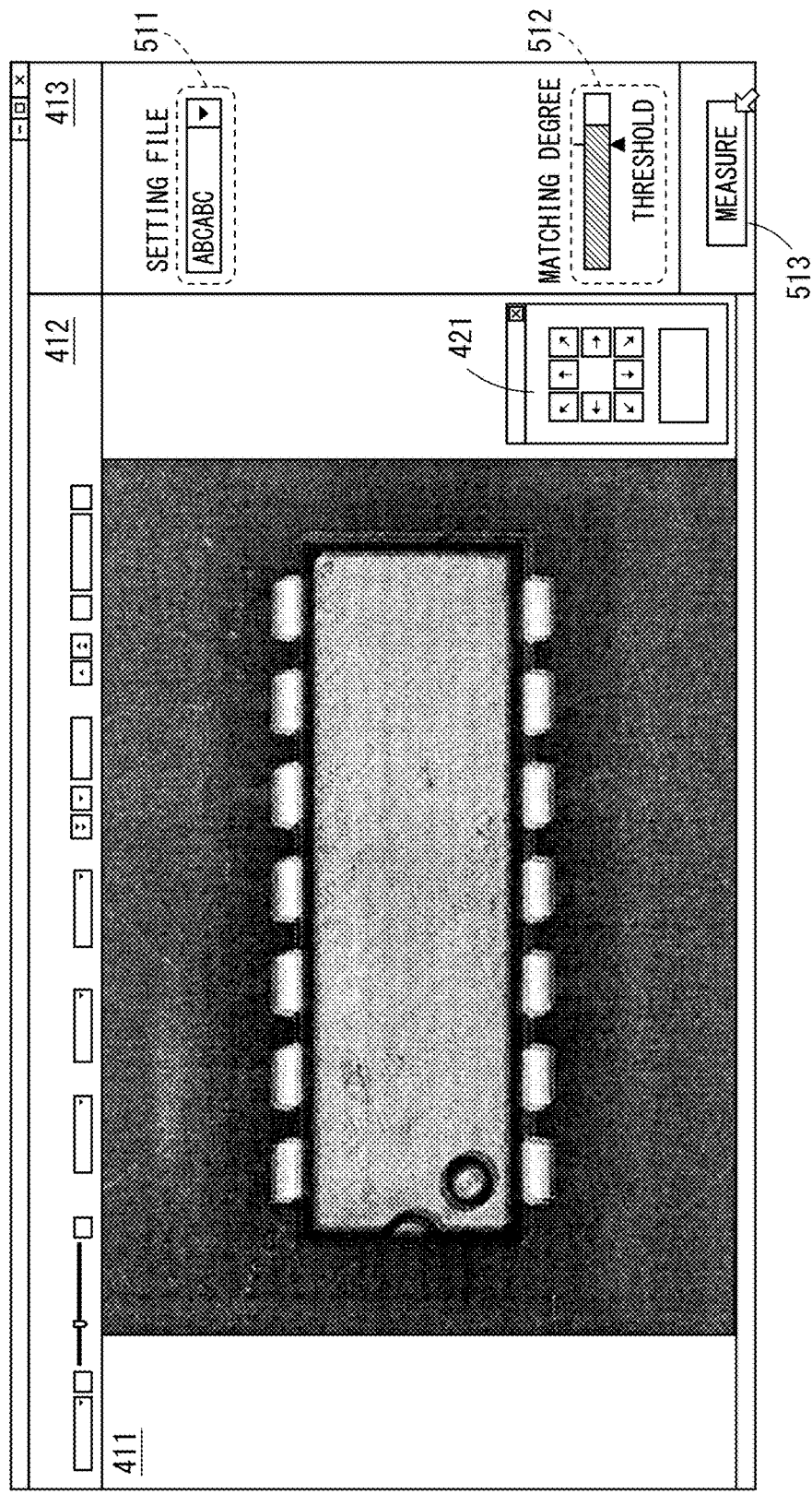
FIG. 31 is a view for explaining one example of use of the image inspection device in the inspection mode.

By viewing the main display field 411, the inspection operator adjusts the position and the posture of the inspection target S such that the portion of the setting target S in the positioning image overlaps the portion of the inspection target S in the texture image in almost all the area, as shown in FIG. 31. Accordingly, the position and the posture of the inspection target S match, or get close to, the position and the posture of the setting target S at the time of generation of the positioning image in the setting mode.

When the positioning image is displayed in the main display field 411, in the CPU 210 of FIG. 1, the matching degree of the positioning image data and the latest texture image data is calculated as a matching degree. The higher the matching degree becomes with increase in an overlapping area of the portion of the setting target S in the positioning image and the portion of the inspection target S in the texture image. The smaller the matching degree becomes with a decrease in the overlapping area.

In the present embodiment, a predetermined threshold is set for the matching degree. The threshold is defined in consideration of an error range of the position and the posture of the inspection target S which is permissible for obtaining not less than a certain degree of inspection accuracy.

As shown in FIGS. 29 to 31, a matching degree indicator 512 is displayed in the side sub-display field 413. In the matching degree indicator 512, the calculated matching degree is represented by a bar chart, and the threshold is represented by a prescribed scale. Therewith, the inspection operator can easily and accurately adjust the position and the posture of the inspection target S on the stage 141 based on the matching degree displayed by the matching degree indicator 512 while viewing the positioning image of the setting target S and the texture image of the inspection target S.

After completing the adjustment of the position and the posture of the inspection target S, the inspection operator operates the measurement button 513. Accordingly, the measurement target place of the inspection target S is measured based on the read-out inspection setting information, to inspect the inspection target S.

Specifically, first, texture image data and height image data for measuring the size of the measurement target portion concerning the inspection target S on the stage 141 are acquired. At this time, the acquired texture image data and height image data are stored into the storage device 240 in the state of being associated with each other per pixel. Thereafter, image data corresponding to the reference image data read out as the inspection setting information is registered as the alignment image data. For example, when the reference image data is the texture image data, the texture image data of the inspection target S is registered as the alignment image data. Further, when the reference image data is the height image data, the height image data of the inspection target S is registered as the alignment image data. Thereafter, the alignment image data is aligned to the reference image data by pattern matching, to align the texture image data and the height image data of the inspection target S.

Next, when information of the characteristic portion for detailed alignment is included in the inspection setting information, a portion of the image data of the inspection target S which corresponds to the registered characteristic portion is detected. Further, the texture image data and the height image data of the inspection target S are aligned with each other in more detail such that the detected portion is coincident with the characteristic portion of the image data of the setting target S.

Subsequently, when information of the reference plane is included in the inspection setting information, there are extracted height image data of one or more areas corresponding to one or more rectangular areas specified for registering the reference plane. Further, the reference plane is calculated based on the extracted height image data, and is then registered. Thereafter, the height image data acquired concerning the inspection target S is corrected such that the position of each portion on the surface of the inspection target S represents the distance from the registered reference plane in a direction orthogonal to the reference plane. In this case, with the height data after the correction, it is possible to easily confirm the position of each portion on the surface of the inspection target S from the reference plane.

After the alignment of the texture image data and the height image data concerning the inspection target S is completed, the size of the measurement target portion of the inspection target S is measured in accordance with the measurement procedure performed in the setting mode.

After the measurement is completed, it is determined whether or not the measurement result concerning each measurement target portion is within the range between the upper limit and the lower limit (tolerance) set in the setting mode. As a result, when the measurement results concerning all the measurement target portions are within the range between the upper limit and the lower limit, the inspection target S is determined to be a non-defective product. On the other hand, when the measurement result of at least one measurement target portion of the one or more measurement target portions is not within the range between the upper limit and the lower limit (tolerance), the inspection target S is determined to be a defective product.

There are cases where the measurement results of a part or all of the measurement target portions cannot be obtained due to an influence of erroneous operation of the image inspection device 500, erroneous setting of the image inspection device 500, disturbance, or the like. In this case, it may be determined in the CPU 210 of FIG. 1 that the inspection of the inspection target S has failed.

Figure 32:
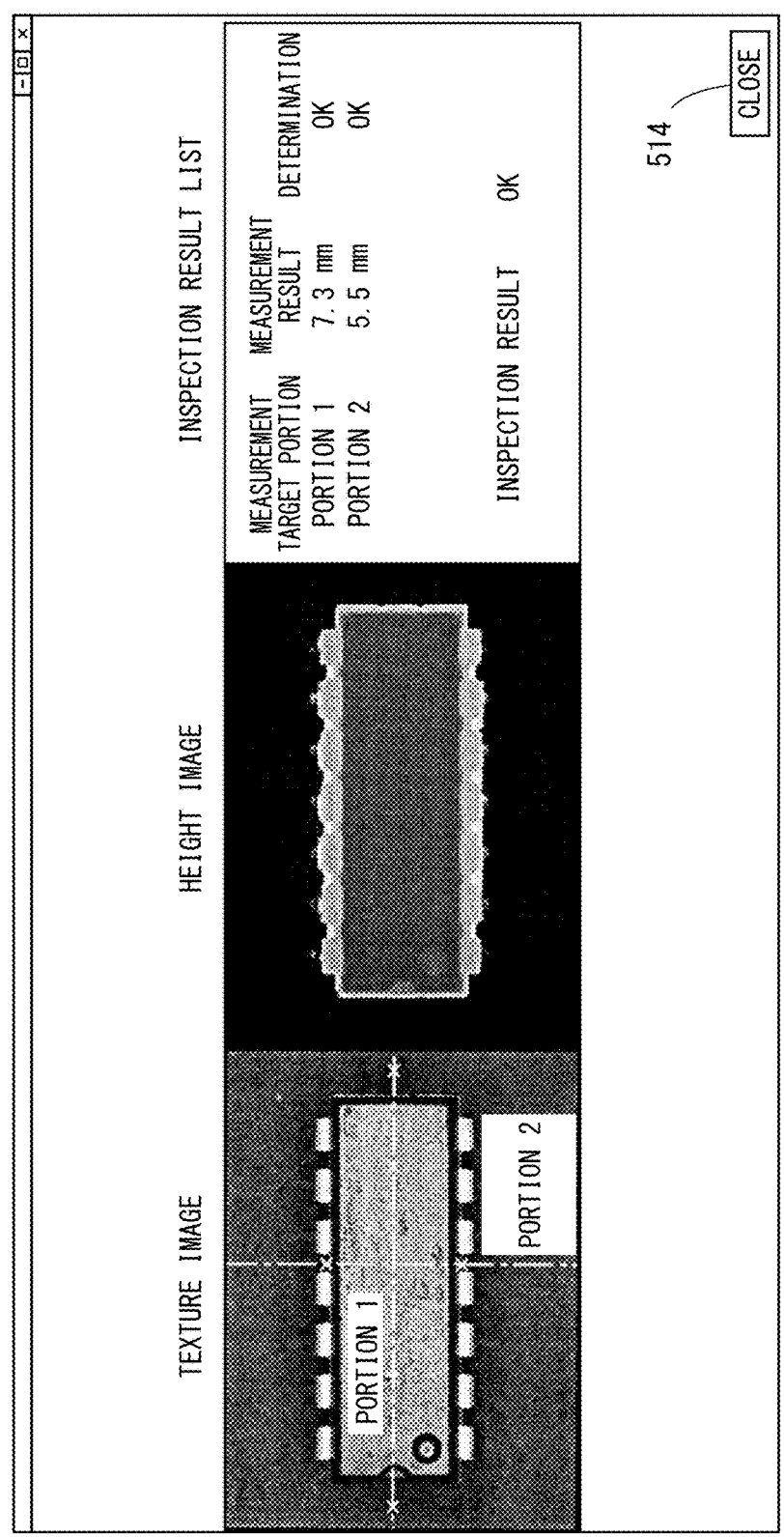
FIG. 32 is a view for explaining one example of use of the image inspection device in the inspection mode.

After the above series of processing is completed, for example, a list of the texture image, the height image and the inspection result of the inspection target S is displayed in the display part 400 as shown in FIG. 32. Further, a data file including the texture image data, the height image data, the synthesized image data, the size of each measurement target portion and the inspection result is stored into the storage device 240 as the inspection result file. Thereafter, the inspection operator operates a close button 514 of FIG. 32. Thereby, the display part 400 returns to the display state of FIG. 8.

In the list of inspection results, "OK" may be displayed as an inspection result when the inspection target S is determined to be a non-defective product. Further, "NG" may be displayed as an inspection result when the inspection target S is determined to be a defective product. "Fail" may be displayed as an inspection result when inspection of the inspection target S is determined to have failed. Further, in the list of inspection results, a determination result showing whether or not a measurement result is within the range between the upper limit and the lower limit may be displayed for each inspection target portion.

Figure 33:
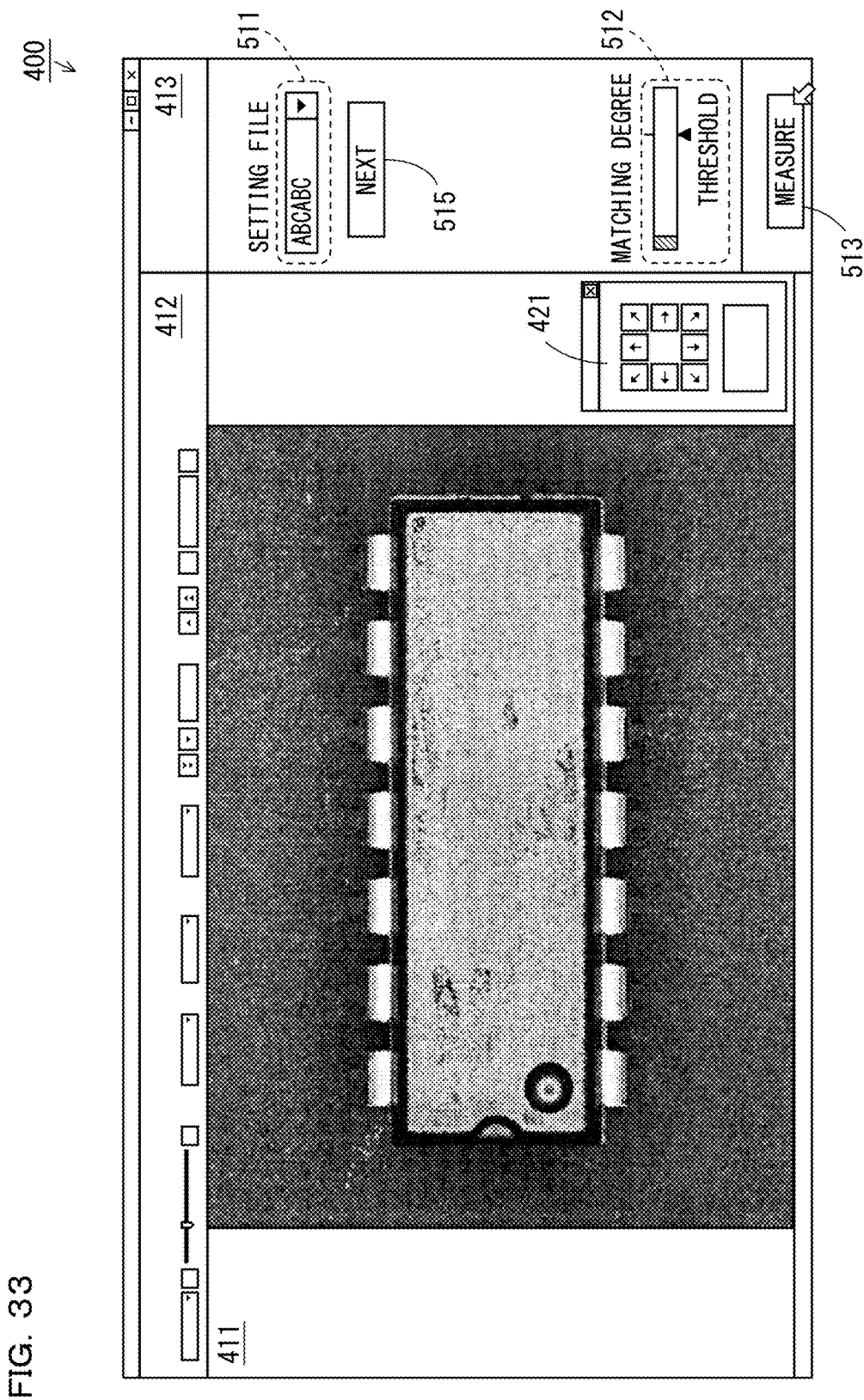
FIG. 33 is a view for explaining one example of use of the image inspection device in the inspection mode.

Here, a description will be given of a case where the inspection setting information read out in the inspection mode includes a plurality of pieces of registered positioning image data as shown in FIGS. 26 and 27. In this case, when the inspection setting information is read out, as shown in FIG. 33, a positioning image based on the firstly registered positioning image data is displayed in the translucent state in the main display field 411. Further, a next button 515 is displayed in the side sub-display field 413.

In the example of FIG. 33, as the first positioning image, a positioning image of the whole of the setting target S, acquired with a low magnification, is displayed. At this time, the imaging conditions such as the magnification of the light reception part 120 are adjusted to imaging conditions corresponding to the first positioning image data.

The inspection operator places the inspection target S on the stage 141 and adjusts the position and the posture of the inspection target S based on the matching degree displayed by the matching degree indicator while viewing the positioning image of the setting target S and the texture image of the inspection target S.

Figure 34:
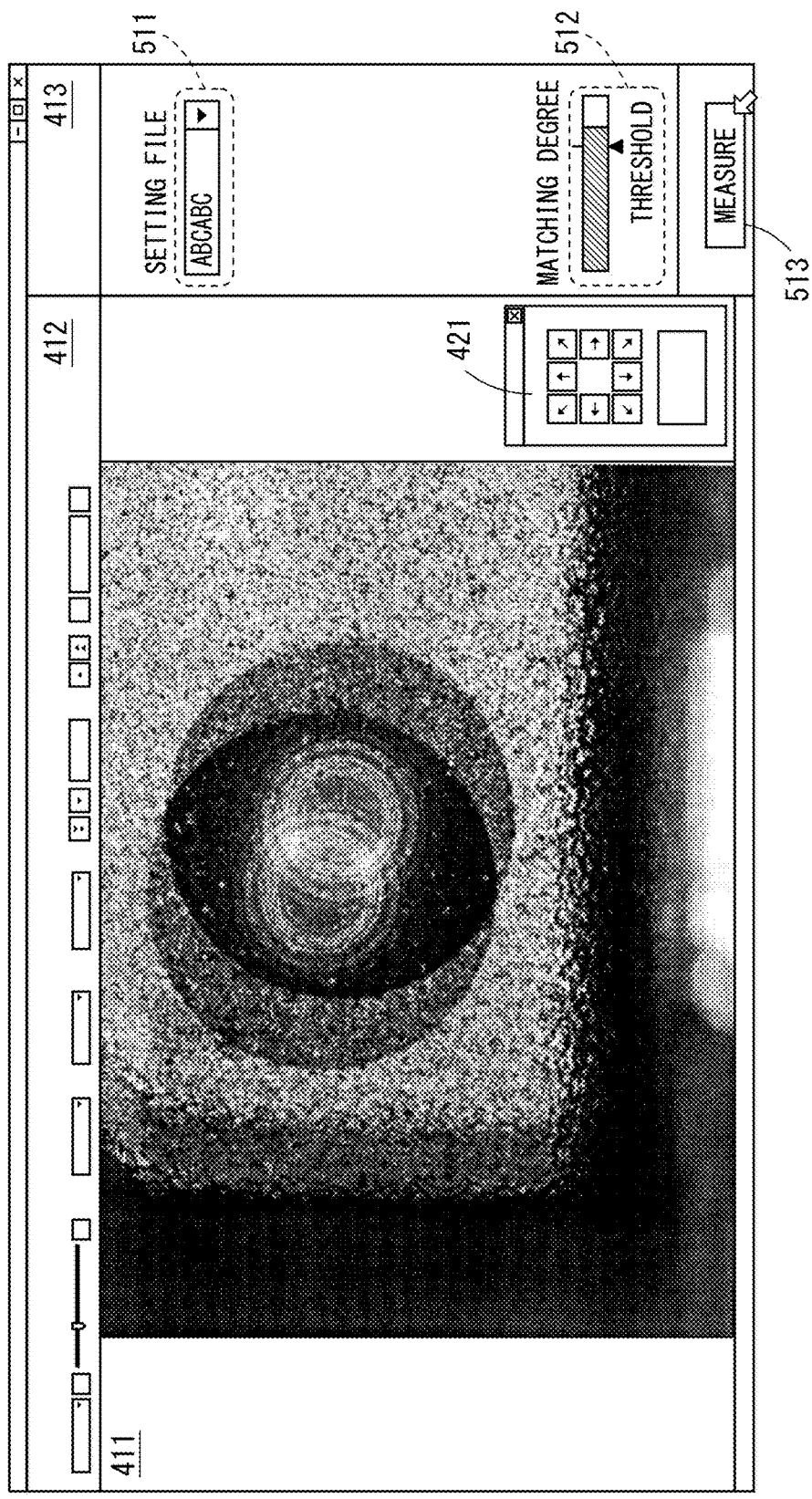
FIG. 34 is a view for explaining one example of use of the image inspection device in the inspection mode.

Thereafter, the inspection operator operates the next button 515. Thereby, as shown in FIG. 34, a positioning image based on the secondly registered positioning image data is displayed in the translucent state in the main display field 411. When the next positioning data (third and subsequent positioning image data) is not present, the next button 515 of FIG. 33 is not displayed in the side sub-display field 413.

In the example of FIG. 34, as the second positioning image, a positioning image showing one corner of the setting target S, acquired with a high magnification, is displayed. At this time, the imaging conditions such as the magnification of the light reception part 120 are adjusted to imaging conditions corresponding to the second positioning image data. Further, the X-Y stage 10 is moved by an amount corresponding to the stored movement amount so as to correspond to the first and second positioning image data. Thereby, the latest texture image showing one corner of the inspection target S is displayed in real time in the main display field 411.

In this case, since the inspection target S is almost accurately positioned based on the first positioning image, the stage 141 is finely adjusted when the second positioning image is displayed, and more accurate positioning can thereby be performed in a short period of time.

After the inspection result file is stored into the storage device 240 of FIG. 1 in the inspection mode, the setting creator operates the statistics analysis button 603 of FIG. 8, and can thereby perform statistics analysis of results of inspection performed in the past. In the statistics analysis, as analysis results concerning the inspection target S inspected in the past, it is possible to display in the display part 400 the inspection setting information, the number of inspected inspection targets S, a total of the inspected positions, the number of effectively inspected measurement target portions, the number of inspection targets S determined to be non-defective products, and the like.

Further, by operating the statistics analysis button 603 of FIG. 8, the setting creator can print out desired information from a desired inspection result file by use of a printing device. At this time, when the inspection result file includes information such as a "lot number", a "product name" and a "shipment destination" of the inspection target S, a report on the inspection result can be easily created in a short period of time.

By operating the setting edit button 604 of FIG. 8, the setting creator can specify a desired inspection setting file out of one or more inspection setting files stored in the storage device 240. Further, inspection setting information of the specified inspection setting file can be edited and the inspection setting file after edited can be stored into the storage device 240. For example, while selecting a desired inspection setting file, the setting creator can change positioning image data of the inspection setting information of the inspection setting file to another positioning image data.

(5-4) Inspection Setting Binding Function

By operating the setting edit button 604 of FIG. 8, the setting creator can not only edit the inspection setting file but also generate a new inspection setting file by binding a plurality of inspection setting files. This function is referred to as an inspection setting binding function.

Figure 35:
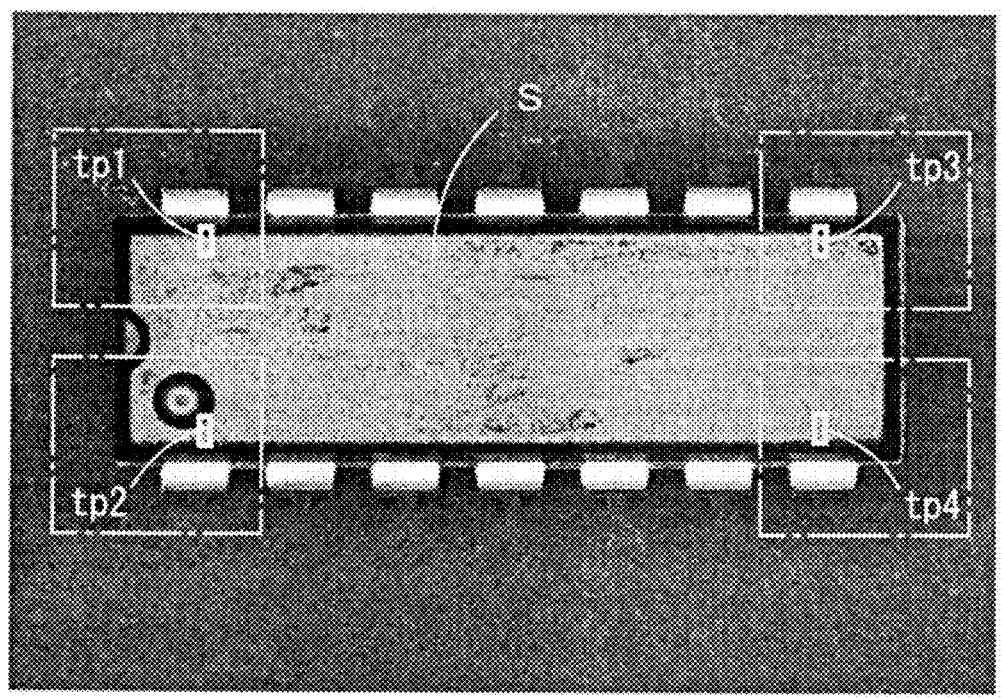
FIG. 35 is a view showing one example of a case where a plurality of measurement target portions exist with respect to one setting target.

The inspection setting binding function will be described along with a specific example of use. FIG. 35 is a view showing one example of a case where a plurality of measurement target portions exist with respect to one setting target S. In the example of FIG. 35, a first measurement target portion tp1, a second measurement target portion tp2, a third measurement target portion tp3, and a fourth measurement target portion tp4 exist in the vicinities of four corners of the setting target S being a semiconductor package.

Here, when the magnification of the light reception part 120 is set to a high magnification so as to inspect the first to fourth measurement target portions tp1 to tp4 with higher accuracy, the whole of the setting target S cannot be held within the imaging range of the light reception part 120. Then, the setting creator generates individual inspection setting information concerning the first to fourth measurement target portions tp1 to tp4. In this case, images of a plurality of portions respectively including the first to fourth measurement target portions tp1 to tp4 are captured by the light reception part 120 with a high magnification. In FIG. 35, a range for imaging by the light reception part 120 with a high magnification is indicated by a dashed line for each measurement target portion.

After the individual inspection setting information concerning the first to fourth measurement target portions tp1 to tp4 are generated, four respective inspection setting files corresponding to the first to fourth measurement target portions tp1 to tp4 are stored into the storage device 240. In the following description, a file name of the inspection setting file corresponding to the first measurement target portion tp1 is referred to as a first measurement target portion file, and a file name of the inspection setting file corresponding to the second measurement target portion tp2 is referred to as a second measurement target portion file. Further, a file name of the inspection setting file corresponding to the third measurement target portion tp3 is referred to as a third measurement target portion file, and a file name of the inspection setting file corresponding to the fourth measurement target portion tp4 is referred to as a fourth measurement target portion file.

Storage of the first to fourth measurement target portion files into the storage device 240 enables the setting creator to bind the first to fourth measurement target portion files by use of the inspection setting binding function and generate a new inspection setting file.

Figure 36:
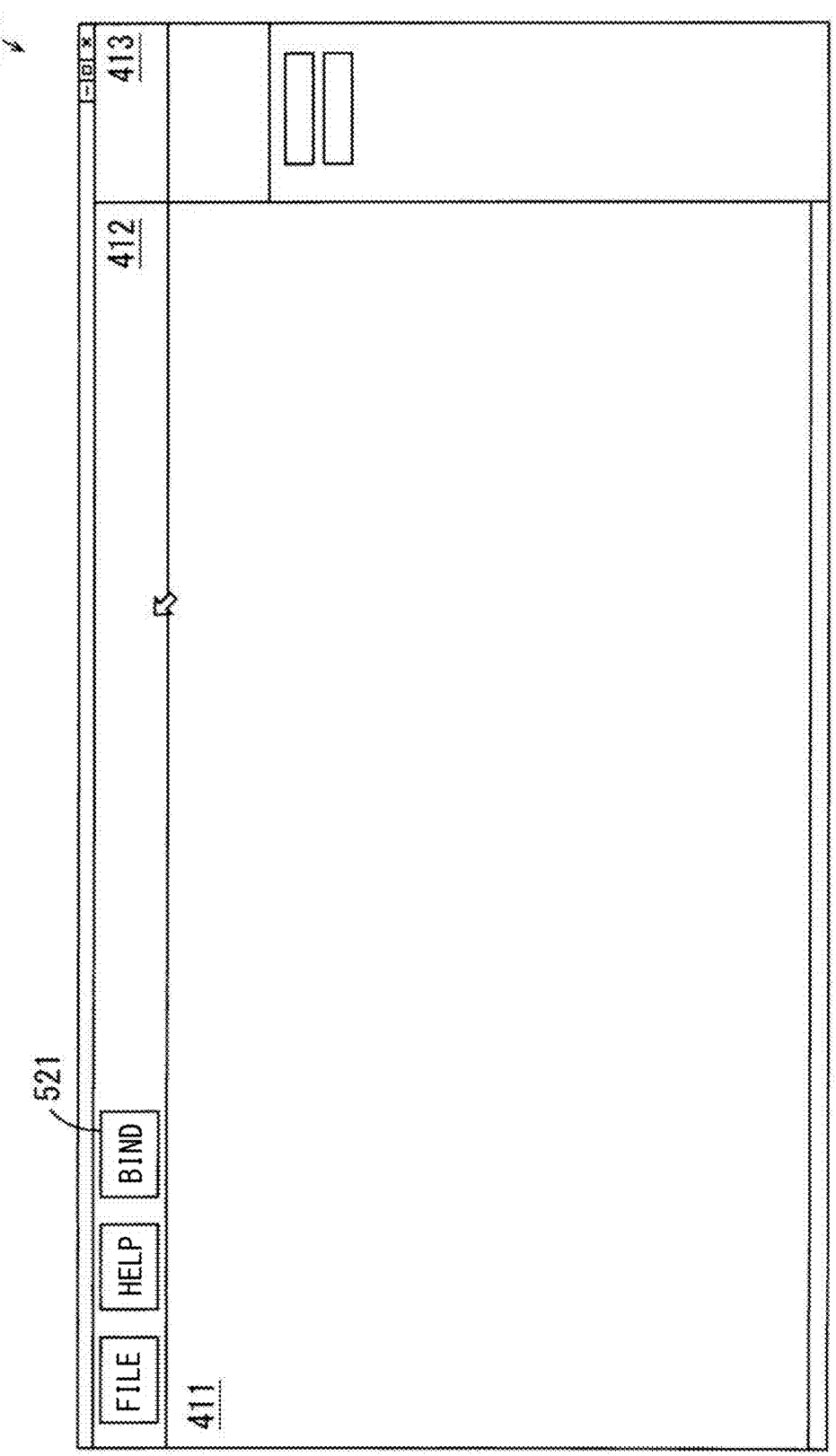
FIG. 36 is a view for explaining an example of use of an inspection setting binding function.
Figure 37:
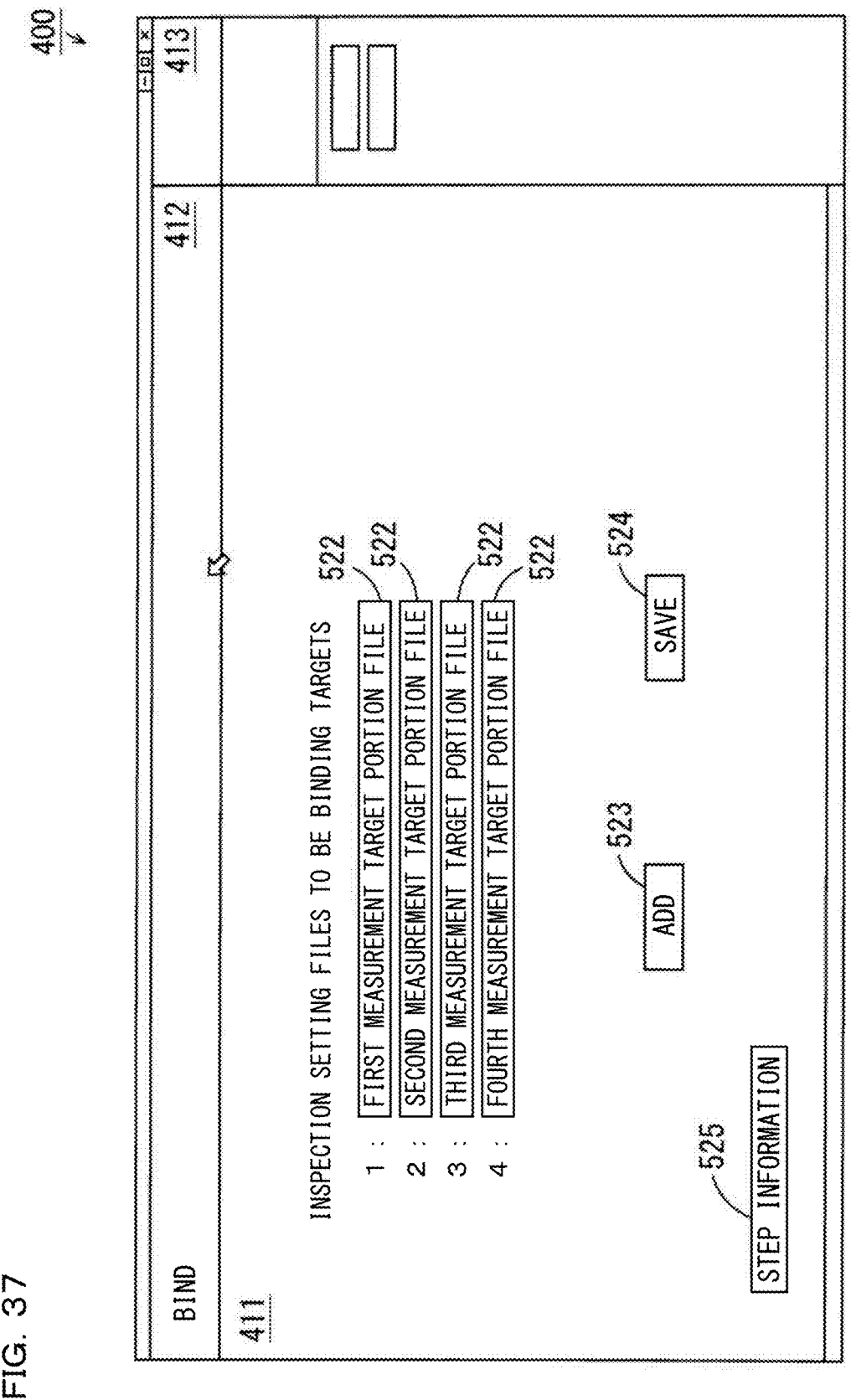
FIG. 37 is a view for explaining an example of use of the inspection setting binding function.

FIGS. 36 and 37 are views for explaining an example of use of the inspection setting binding function. In the case of using the inspection setting binding function, the setting creator first operates the setting edit button 604 of FIG. 8. Thereby, as shown in FIG. 36, a bind button 521 is displayed in the top sub-display field 412 of the display part 400 along with a file button and a help button.

Further, the setting creator operates the bind button 521 of FIG. 36. Thereby, as shown in FIG. 37, a plurality of input fields 522 for respectively receiving a plurality of inspection setting files being binding targets are displayed in the central part of the main display field 411. Then, the setting creator inputs into the input fields 522 the respective file names of the plurality of inspection setting files being binding targets. In the present example, the "first measurement target portion file", the "second measurement target portion file", the "third measurement target portion file", and the "fourth measurement target portion file" are inputted into the four input fields 522.

When a binding target is to be further added, the setting creator operates an add button 523. This allows a new input field 522 to be displayed on the main display field 411.

After inputting the desired file names, the setting creator operates a save button 524. Thereby, the inspection setting information of the inputted plurality of inspection setting files are bound to generate a new inspection setting file as a bound inspection setting file. The generated bound inspection setting file is stored into the storage device 240. In the present example, the first to fourth measurement target portion files are bound.

The setting creator operates a step information button 525 that is displayed in the main display field 411 before operation of the save button 524, and can thereby input the above information such as the "lot number", the "product name" and the "shipment destination" as inspection setting information of the bound inspection setting file.

In the inspection mode, when the inspection operator selects the bound inspection setting file, respective pieces of inspection setting information for inspecting the first to fourth measurement target portions are retrieved at once. Thereafter, the sizes of the first to fourth measurement target portions are sequentially inspected based on the plurality of pieces of inspection setting information of the first to fourth measurement target portion files.

(5-5) Binding Function of Texture Image Data and Height Image Data

In the setting mode, texture image data and height image data of the setting target S can be acquired while the X-Y stage 10 is moved. Also in the inspection mode, texture image data and height image data of the inspection target S can be acquired while the X-Y stage 10 is moved.

In this case, texture image data and height image data generated before movement of the X-Y stage 10 can be bound with texture image data and height image data generated after movement of the X-Y stage 10. Thereby, bound texture image data is generated in each mode which is made up of a plurality of pieces of texture image data being bound. Further, bound height image data is generated which is made up of a plurality of pieces of height image data being bound.

With the above function, the setting creator can acquire the bound texture image data and the bound height image data which correspond to a larger range than the imaging range of the light reception part 120. Accordingly, the setting creator can create one piece of inspection setting information corresponding to a plurality of measurement target portions scattered over a wider range than the imaging range of the light reception part 120.

Figure 38A:
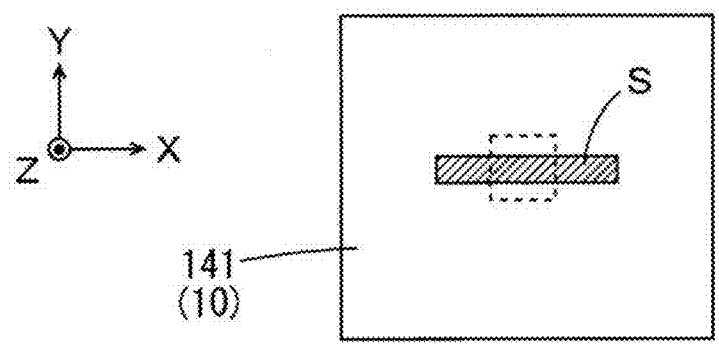
FIGS. 38A to 38C are diagrams for explaining one example of generation of bound texture image data and bound height image data.
Figure 38B:
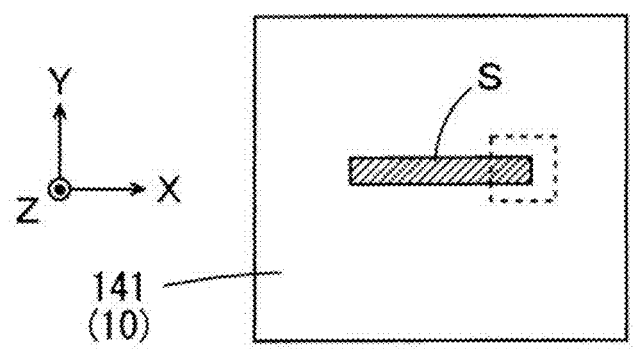
Figure 38C:
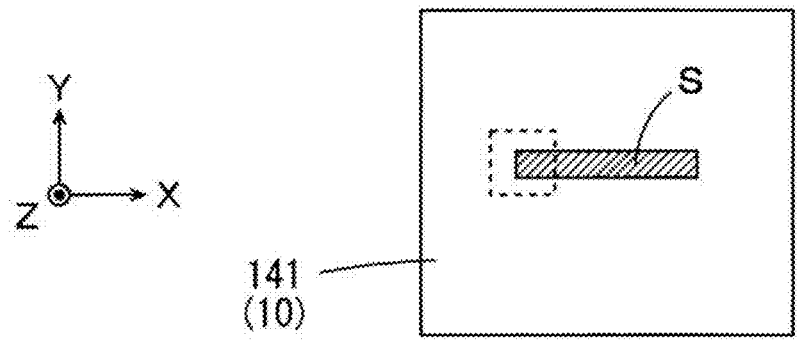

FIGS. 38A to 38C are diagrams for explaining one example of generation of bound texture image data and bound height image data. FIGS. 38A to 38C show plan views of the placement surface of the stage 141 seen from above. In each plan view, the imaging range of the light reception part 120 is indicated by a dotted line. On the placement surface of the stage 141, a band-like measurement target S is placed so as to extend in the X-direction.

As shown in FIG. 38A, the length of the measurement target S of the present example is not held within the imaging range of the light reception part 120. Thus, in order to capture an image of the whole of the measurement target S, it is necessary to capture an image of each part of the measurement target S a plurality of times while moving the X-Y stage 10 in the X-direction.

In this case, first, as shown in FIG. 38B, the setting creator moves the X-Y stage 10 so as to capture an image of one end of the measurement target S, and can thereby register the position of the X-Y stage 10 at the time of capturing the image of the one end of the measurement target S.

Next, as shown in FIG. 38C, the setting creator moves the X-Y stage 10 so as to capture an image of the other end of the measurement target S, and can thereby register the position of the X-Y stage 10 at the time of capturing the image of the other end of the measurement target S.

Accordingly, a movement amount of the X-Y stage 10 is calculated from the plurality of registered positions thereof, and based on the movement amount, the number of times the texture image data and the height image data are to be acquired (number of acquisition) at or between the plurality of registered positions of the X-Y stage 10 is calculated.

The number of acquisition is calculated such that the texture image data and the height image data acquired in adjacent positions partially overlap each other. The overlapping portions serve as overlap margins when the adjacent pieces of texture image data are bound and the adjacent pieces of height image data are bound. Acquisition of the texture image data and the height image data including the overlapping portions enables the adjacent pieces of texture image data and the adjacent pieces of height image data to be bound with high accuracy by use of pattern matching.

After the movement range of the X-Y stage 10 and the numbers of acquisition of the texture image data and the height image data are decided in such a manner as above, the image of the measurement target S is captured a plurality of times while the X-Y stage 10 is moved. A plurality of pieces of texture image data and a plurality of pieces of height image data, acquired by a plurality of times of imaging, are respectively bound, to generate bound texture image data and bound height image data.

Here, the bound texture image data and the bound height image data respectively include a plurality of pieces of texture image data and a plurality of pieces of height image data in wide ranges. Hence they have a larger data amount than those of normal texture image data and height image data.

Therefore, in the image inspection device 500 of the present example, at the time of generating the bound texture image data and the bound height image data in the setting mode, a selection operation part for selection of a size of amount of data to be saved from a plurality of candidates is displayed in the display part 400. Accordingly, the setting creator can select a size of a desired data amount. In this case, thinning (binning processing) is performed on pixel data of the generated bound texture image data and bound height image data such that the data amount is within the selected size, to save the thinned bound texture image data and bound height image data into the storage device 240.

(6) Image Inspection Processing (6-1) Configuration of CPU

By use of height image data measured in the measuring part 100, a size of an inspection target portion previously set concerning each of a plurality of measurement targets S can be measured. This enables inspection of a plurality of measurement targets S. Meanwhile, in measurement of the height image data, the inspection target portion often includes a portion impossible or difficult to accurately measure. The portion impossible or difficult to accurately measure is, for example, a portion where a shade is generated or multiple reflection of light is generated.

There has thus been a need for appropriately adjusting measurement conditions including the position and the posture of the measurement target S so as to make the inspection target portion measurable. However, appropriately adjusting the measurement conditions for the measurement target S is difficult for an unskilled setting creator. Further, when a plurality of measurement targets S are to be inspected, it is not easy to eliminate actual variations in inspection target portions among the plurality of measurement targets S.

Figure 39:
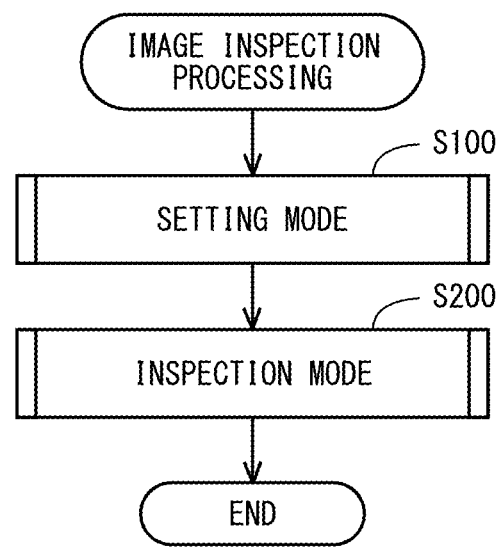
FIG. 39 is a flowchart showing image inspection processing performed by a CPU of a PC.

Then, as described above, the setting mode and the inspection mode are provided in the image inspection device 500. FIG. 39 is a flowchart showing image inspection processing performed by the CPU 210 of the PC 200. As shown in FIG. 39, in the image inspection processing, after the CPU 210 performs control operation in the setting mode (Step S100), the CPU 210 performs control operation in the inspection mode (Step S200).

Figure 40:
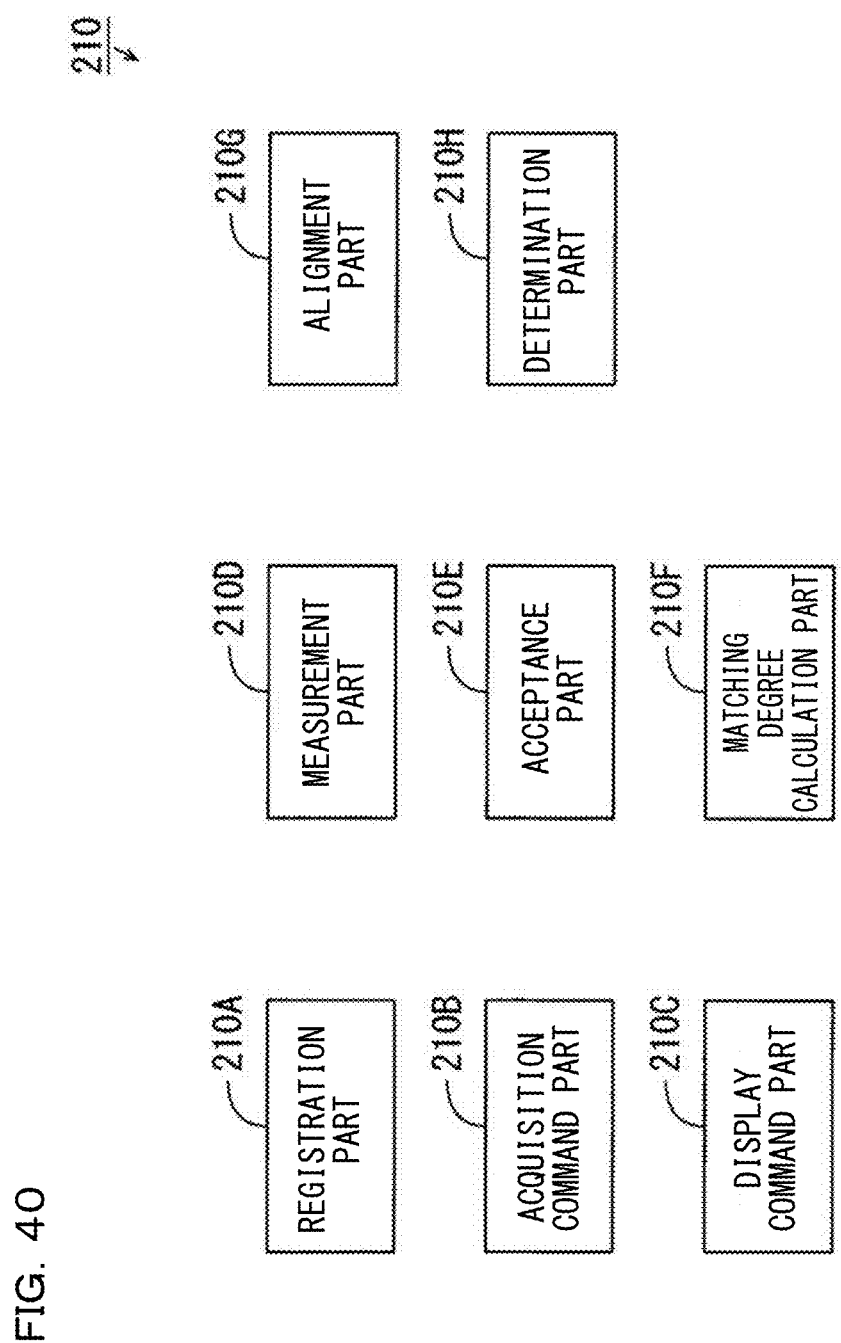
FIG. 40 is a block diagram showing a configuration of the CPU.
Figure 41:
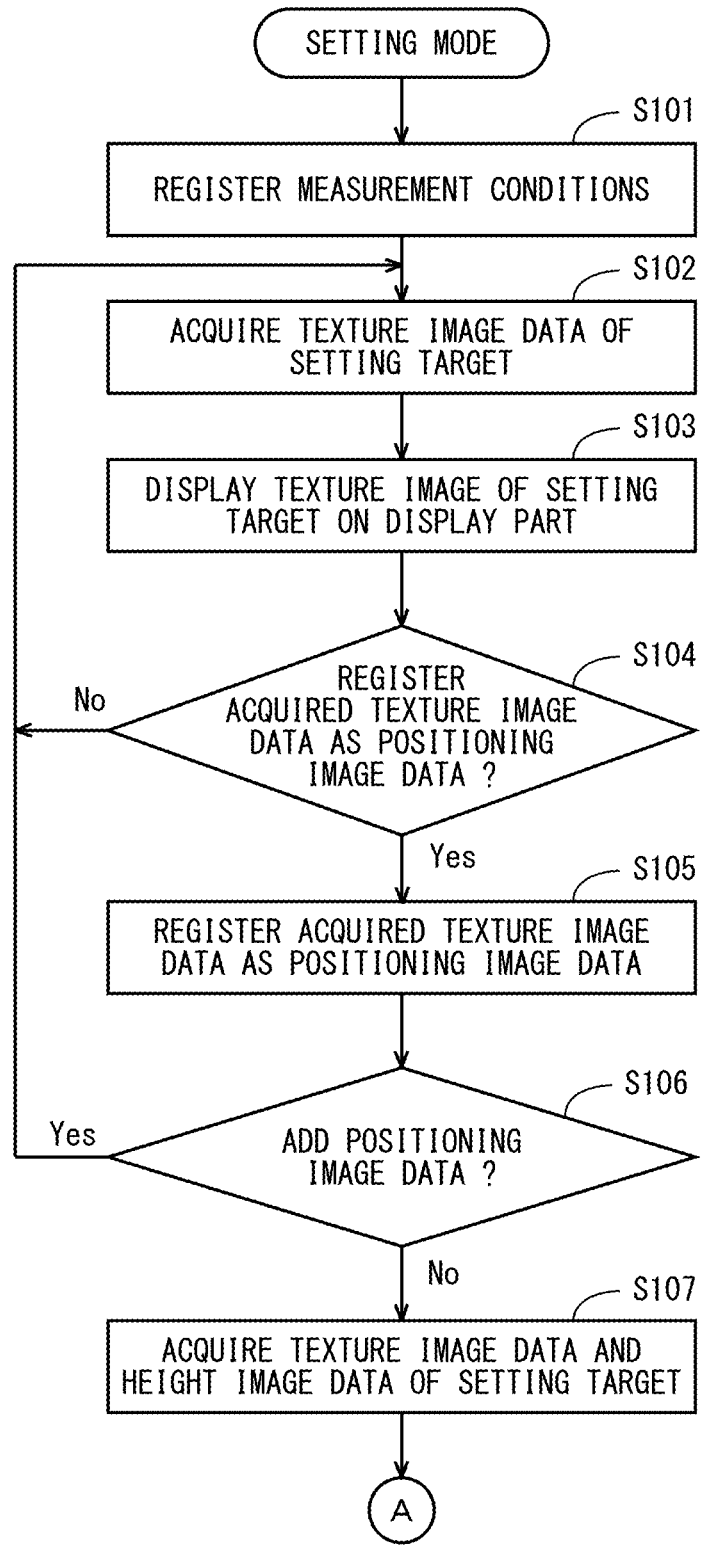
FIG. 41 is a flowchart showing control operation of the CPU in the setting mode.
Figure 42:
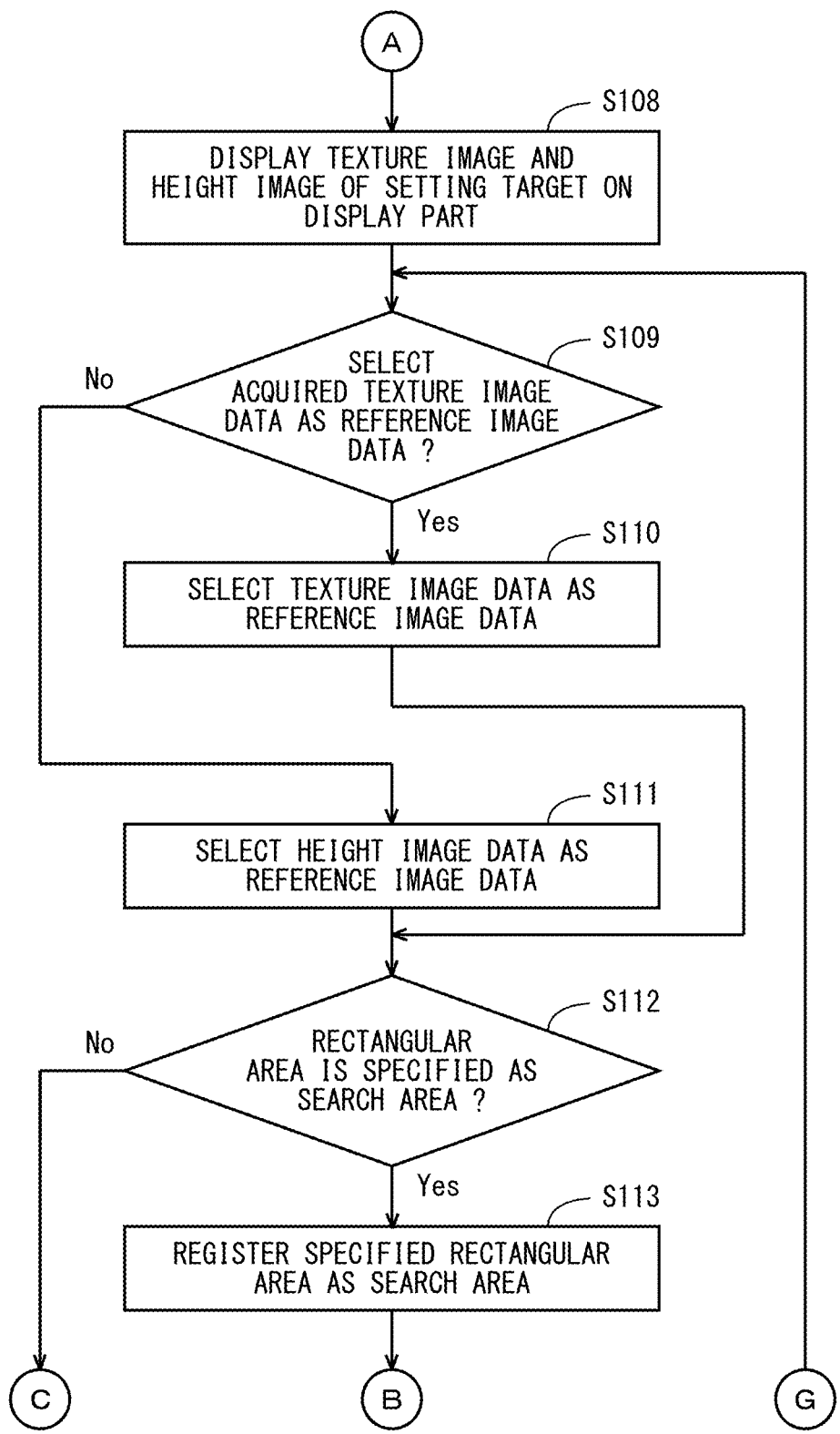
FIG. 42 is a flowchart showing control operation of the CPU in the setting mode.
Figure 43:
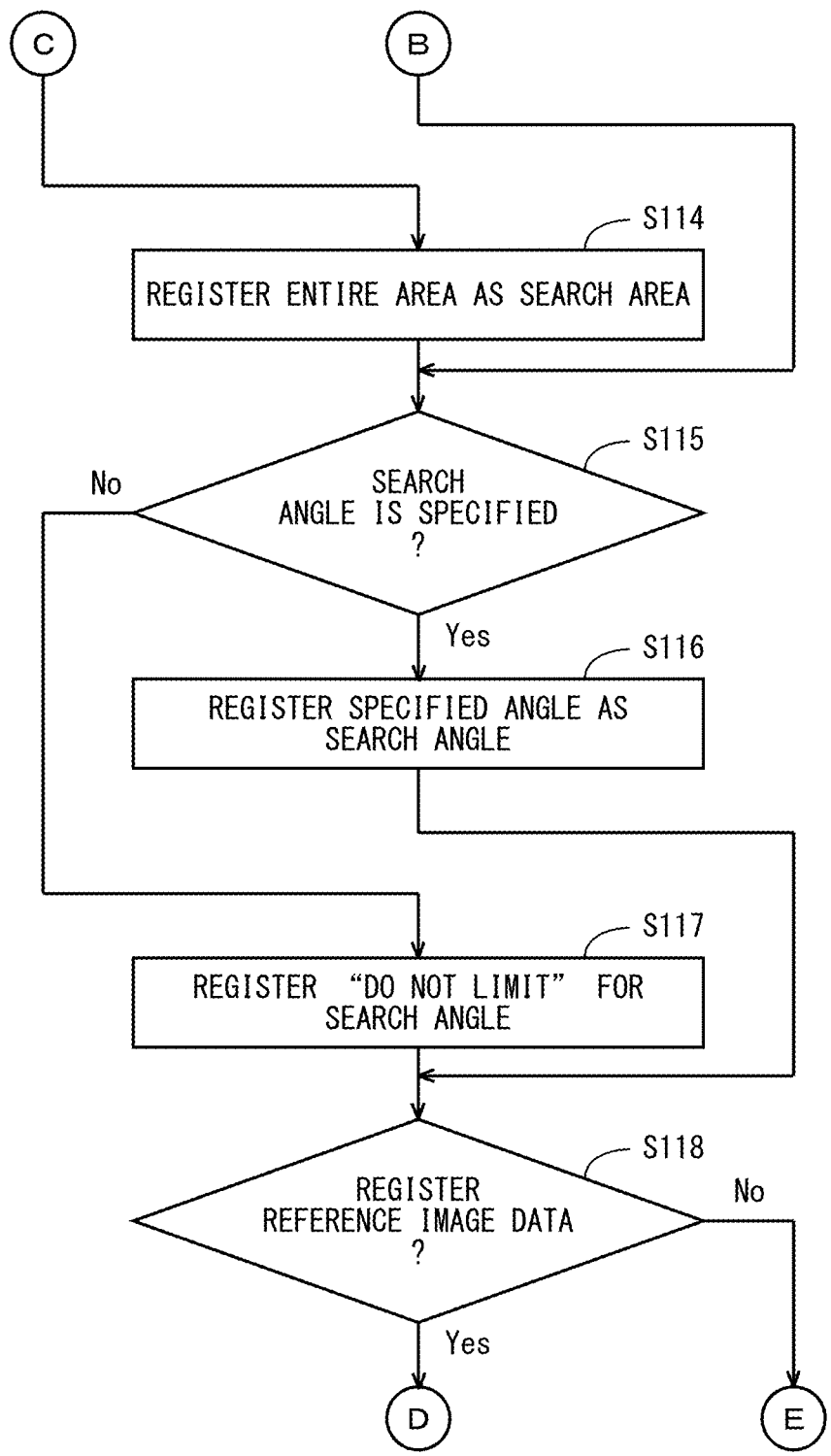
FIG. 43 is a flowchart showing control operation of the CPU in the setting mode.
Figure 44:
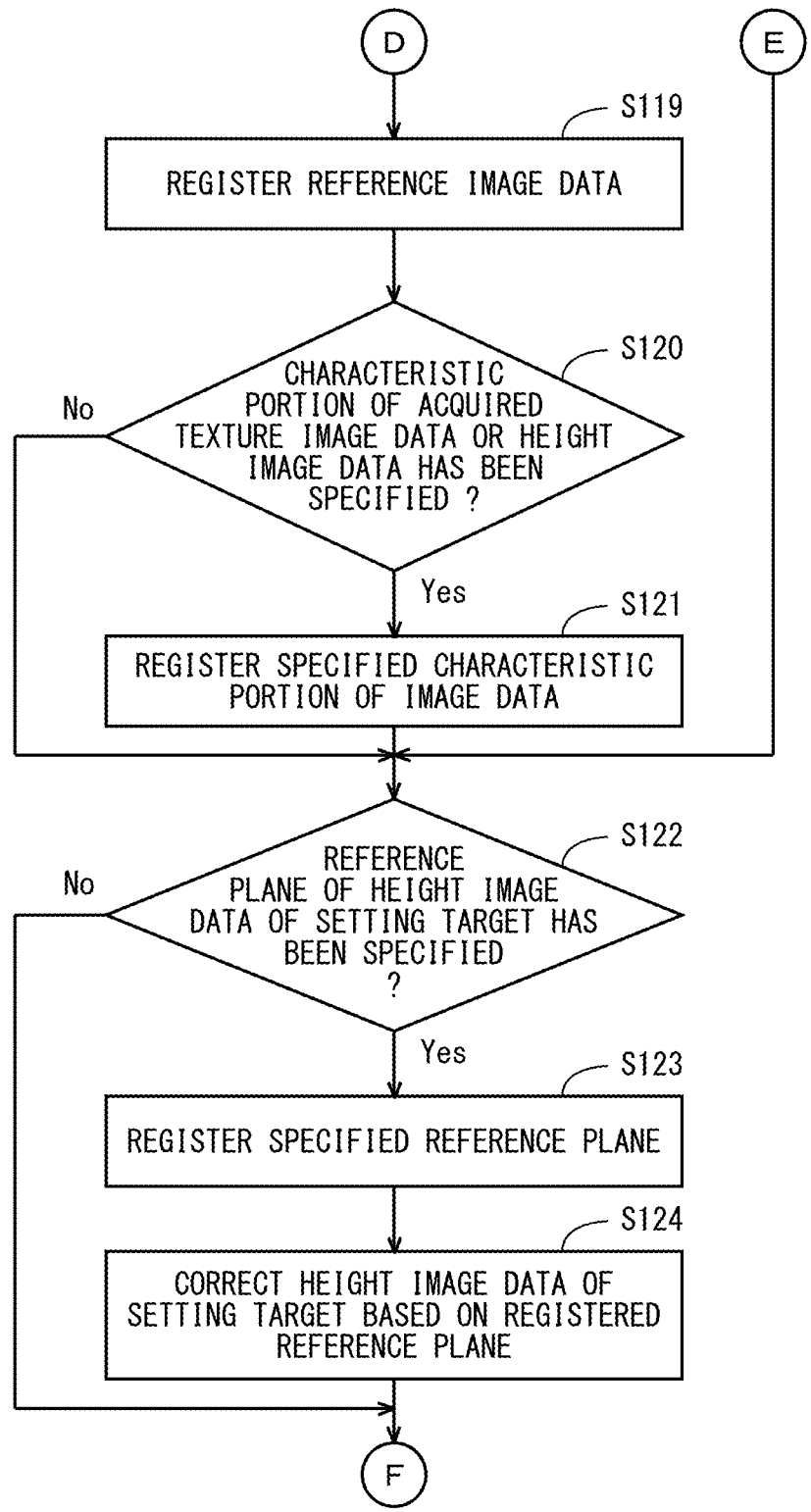
FIG. 44 is a flowchart showing control operation of the CPU in the setting mode.
Figure 45:
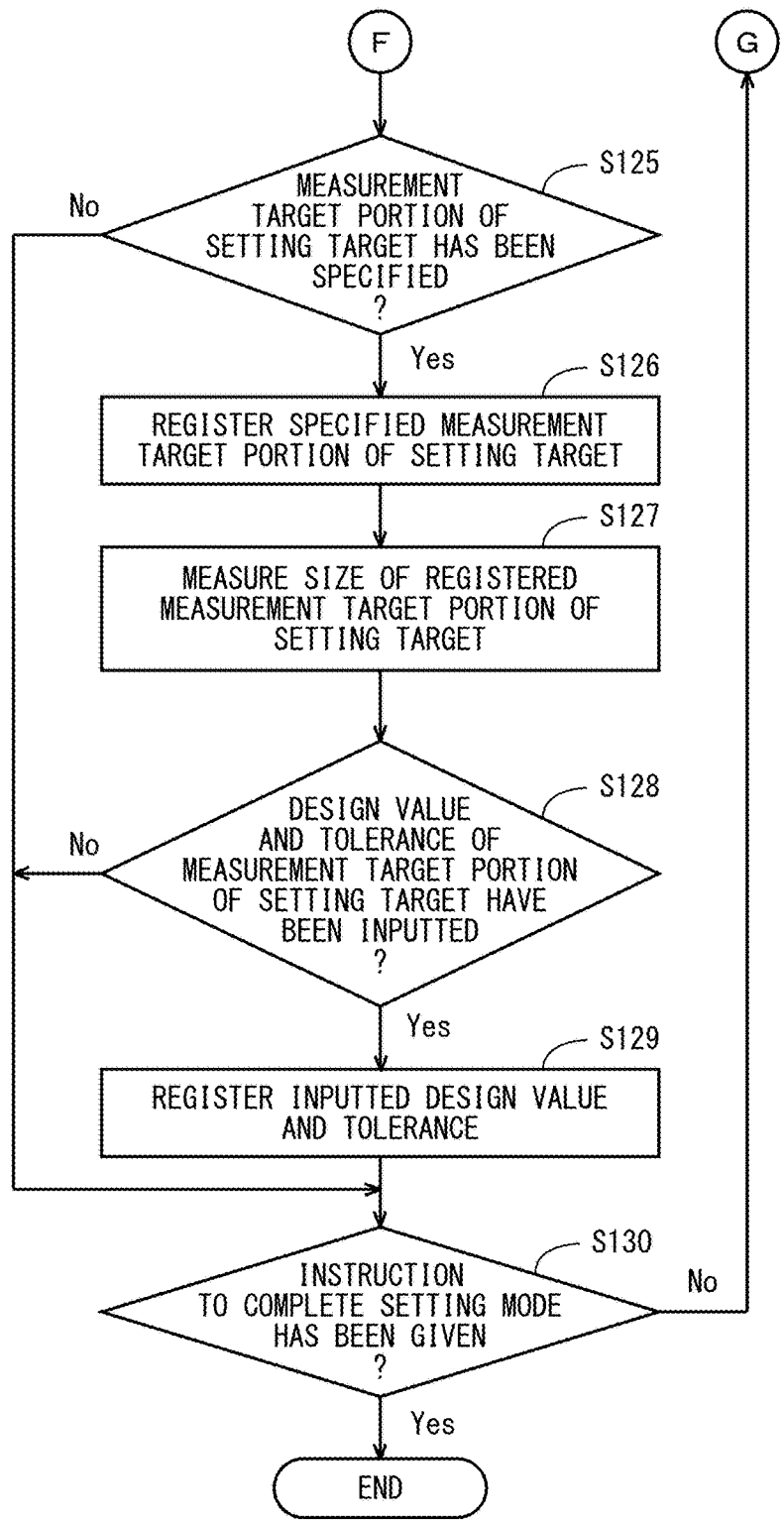
FIG. 45 is a flowchart showing control operation of the CPU in the setting mode.

FIG. 40 is a block diagram showing a configuration of the CPU 210. As shown in FIG. 40, the CPU 210 includes a registration part 210A, an acquisition command part 210B, a display command part 210C, a measurement part 210D, an acceptance part 210E, a matching degree calculation part 210F, an alignment part 210G, and a determination part 210H. By the CPU 210 executing an image inspection program stored in the storage device 240 of FIG. 1, functions of the registration part 210A, the acquisition command part 210B, the display command part 210C, the measurement part 210D, the acceptance part 210E, the matching degree calculation part 210F, the alignment part 210G and the determination part 210H are executed.

The registration part 210A stores into the storage device 240 a variety of data or information acquired through the measuring part 100 or the control part 300, to register the data or the information. The acquisition command part 210B gives a command to the measuring part 100 and the control part 300 to acquire texture image data or height image data of the measurement target S. The display command part 210C gives a command to the display part 400 so as to display an image or the like based on the texture image data, the height image data, or other image data.

The measurement part 210D measures the size of the measurement target portion of the measurement target S based on the texture image data or the height image data of the measurement target S. The acceptance part 210E accepts input of a design value and a tolerance of the measurement target portion of the measurement target S. The matching degree calculation part 210F calculates a matching degree between the registered positioning image data and the acquired texture image data.

The alignment part 210G aligns the alignment image data to the reference image data by pattern matching, to align the texture image data and the height image data. The determination part 210H determines Pass/Fail of the measurement target S based on the size measured concerning the measurement target S and the accepted design value and tolerance.

Hereinafter, the control operation of the CPU 210 in each of the setting mode and the inspection mode will be described with reference to FIG. 40 and flowcharts described later.

(6-2) Control Operation of CPU in Setting Mode

FIGS. 41 to 45 are flowcharts showing the control operation of the CPU 210 in the setting mode. First, the setting creator places the setting target S on the stage 141 and sets appropriate measurement conditions. The measurement conditions include the above imaging condition. The CPU 210 registers the measurement conditions based on operation of the operation part 250 by the setting creator (Step S101).

Next, with the setting target S placed on the stage 141, the CPU 210 gives a command to the measuring part 100 and the control part 300, to acquire texture image data of the setting target S (Step S102). The CPU 210 gives a command to the display part 400, to display a texture image of the setting target S in the display part 400 based on the acquired texture image data (Step S103).

Subsequently, the CPU 210 determines whether or not to register the acquired texture image data as positioning image data (Step S104). In the above specific example, when a plurality of pieces of positioning image data have been set to be registered, the setting creator operates the operation part 250, and can thereby instruct the CPU 210 on whether or not to register the texture image data as positioning image data.

When an instruction to register the texture image data as the positioning image data is given, the CPU 210 registers the texture image data as the positioning image data (Step S105). On the other hand, when the instruction to register the texture image data as the positioning image data is not given, the CPU 210 returns to the processing of Step S102. Until the positioning image data is registered, processing of Steps S102 to S104 is repeated.

After Step S105, the CPU 210 determines whether or not the positioning image data is to be added (Step S106). By operating the operation part 250, the setting creator can instruct the CPU 210 on whether or not to add the positioning image data. When an instruction to add the positioning image data is given, the CPU 210 returns to the processing of Step S102. Until all pieces of positioning image data are added, the processing of Steps S102 to S106 is repeated.

In the above specific example, when it is set that only one piece of positioning image data is to be registered, the processing from Step S104 to Step S106 described later is omitted, and texture image data acquired by processing of Step S107 described later is registered as the positioning image data.

After all pieces of positioning image data are added, the CPU 210 responds to operation of the operation part 250 by the setting creator and gives a command to the measuring part 100 and the control part 300, to sequentially acquire texture image data and height image data of the setting target S (Step S107). The CPU 210 gives a command to the display part 400, to display a texture image and a height image of the setting target S in the display part 400 based on the acquired texture image data and height image data (Step S108).

Next, the CPU 210 determines whether or not the acquired texture image data has been selected as reference image data (Step S109). By operating the operation part 250, the setting creator can instruct the CPU 210 on whether to select the texture image data as the reference image data or select the height image data as the reference image data. In the above specific example, the image data is selected by the setting creator operating the image selection operation part 461 of FIGS. 13 and 14 by use of the operation part 250.

Here, the texture image and the height image are displayed on the display part 400. This enables the setting creator to determine which of the texture image data or the height image data is to be selected as the reference image data, while viewing the texture image data and the height image data.

When an instruction to select the texture image data as the reference image data is given, the CPU 210 selects the texture image data as the reference image data (Step S110). On the other hand, when the instruction to select the texture image data as the reference image data is not given but an instruction to select the height image data as the reference image data is given, the CPU 210 selects the height image data as the reference image data (Step S111).

Next, the CPU 210 determines whether or not a rectangular area has been specified as a search area in the selected reference image data (Step S112). By operating the operation part 250, the setting creator can instruct the CPU 210 on whether to specify the rectangular area as the search area or specify the entire area as the search area. Further, when the rectangular area is to be specified, by operating the operation part 250, the setting creator can specify the position and the size of the rectangular area.

When the instruction to specify the rectangular area as the search area is given, the CPU 210 registers the specified rectangular area as the search area (Step S113). On the other hand, when the instruction to specify the rectangular area as the search area is not given but the instruction to specify the entire area as the search area is given, the CPU 210 registers the entire area as the search area (Step S114).

Next, the CPU 210 determines whether or not a search angle has been specified in the selected reference image data (Step S115). By operating the operation part 250, the setting creator can instruct the CPU 210 that the search angle is to be specified or not to be limited. Further, when the search angle is to be specified, by operating the operation part 250, the setting creator can specify the magnitude of the search angle.

When the instruction to specify the search angle is given, the CPU 210 registers the specified angle as the search area (Step S116). On the other hand, when the instruction to specify the search angle is not given but the instruction not to limit the search angle is given, the CPU 210 registers "do not limit" for the search angle (Step S117).

Thereafter, in Steps S109 to S117, the CPU 210 determines whether or not to register the reference image data with settings made in Steps S109 to S117 (Step S118). By operating the operation part 250, the setting creator can instruct the CPU 210 on whether or not to register the reference image data.

When an instruction to register the reference image data is given, the CPU 210 registers the reference image data (Step S119). On the other hand, when the instruction to register the reference image data is not given, the CPU 210 goes to the processing of Step S122.

Next, if the reference image data is registered, the CPU 210 determines whether or not a characteristic portion of the acquired texture image data or height image data has been specified (Step S120). By operating the operation part 250, the setting creator can specify any characteristic portion of the acquired texture image data or height image data to be registered in the CPU 210. When the characteristic portion of the acquired texture image data or height image data is specified, the CPU 210 registers the specified characteristic portion of the image data (Step S121). On the other hand, when the characteristic portion of the reference image data is not specified, the CPU 210 goes to processing of Step S122.

Next, the CPU 210 determines whether or not the reference plane of the height image data of the setting target S has been specified (Step S122). By operating the operation part 250, the setting creator can specify the reference plane of the height image data of the setting target S to be registered in the CPU 210. When the reference plane is specified, the CPU 210 registers the specified reference plane of the height image data of the setting target S (Step S123). On the other hand, when the reference plane is not specified, the CPU 210 goes to processing of Step S125.

When the reference plane is registered, the CPU 210 corrects the height image data of the setting target S based on the registered reference plane (Step S124). Specifically, the CPU 210 corrects the acquired height image data such that the position of each portion on the surface of the setting target S represents a distance from the registered reference plane in the height direction.

Next, the CPU 210 determines whether or not the measurement target portion of the setting target S has been specified (Step S125). By operating the operation part 250, the setting creator can specify the measurement target portion of the setting target S to be registered in the CPU 210. When the measurement target portion is specified, the CPU 210 registers the specified measurement target portion of the setting target S (Step S126). On the other hand, when the measurement target portion is not specified, the CPU 210 goes to processing of Step S130. When the measurement target portion is registered, the CPU 210 measures the size of the registered measurement target portion based on the acquired texture image data or height image data (Step S127).

Subsequently, the CPU 210 determines whether or not a design value and a tolerance of the measurement target portion of the setting target S have been inputted (Step S128). Note that one of the design value and the tolerance may be omitted. By operating the operation part 250, the setting creator can input the design value and the tolerance of the measurement target portion of the setting target S into the CPU 210. When the design value and the tolerance are inputted, the CPU 210 registers the inputted design value and tolerance of the measurement target portion of the setting target S (Step S129). On the other hand, when the design value and the tolerance have not been inputted, the CPU 210 goes to processing of Step S130.

Thereafter, the CPU 210 determines whether or not an instruction to complete the setting mode has been given (Step S130). By operating the operation part 250, the setting creator can instruct the CPU 210 to complete the setting mode. In the above specific example, the setting creator can operate the save button 441 of FIG. 25 by use of the operation part 250, to instruct completion of the setting mode. At this time, in response to the instruction to complete the setting mode, the CPU 210 stores a data file of the inspection setting information, including the information registered by above processing of Steps S101 to S129, into the storage device 240 as the inspection setting file.

When the instruction to complete the setting mode is not given, the CPU 210 returns to the processing of Step S109. Thus, the processing of Steps S109 to S130 is repeated until the instruction to complete the setting mode is given. On the other hand, when the instruction to complete the setting mode is not given, the CPU 210 completes the setting mode.

(6-3) Control Operation of CPU in Inspection Mode

Figure 46:
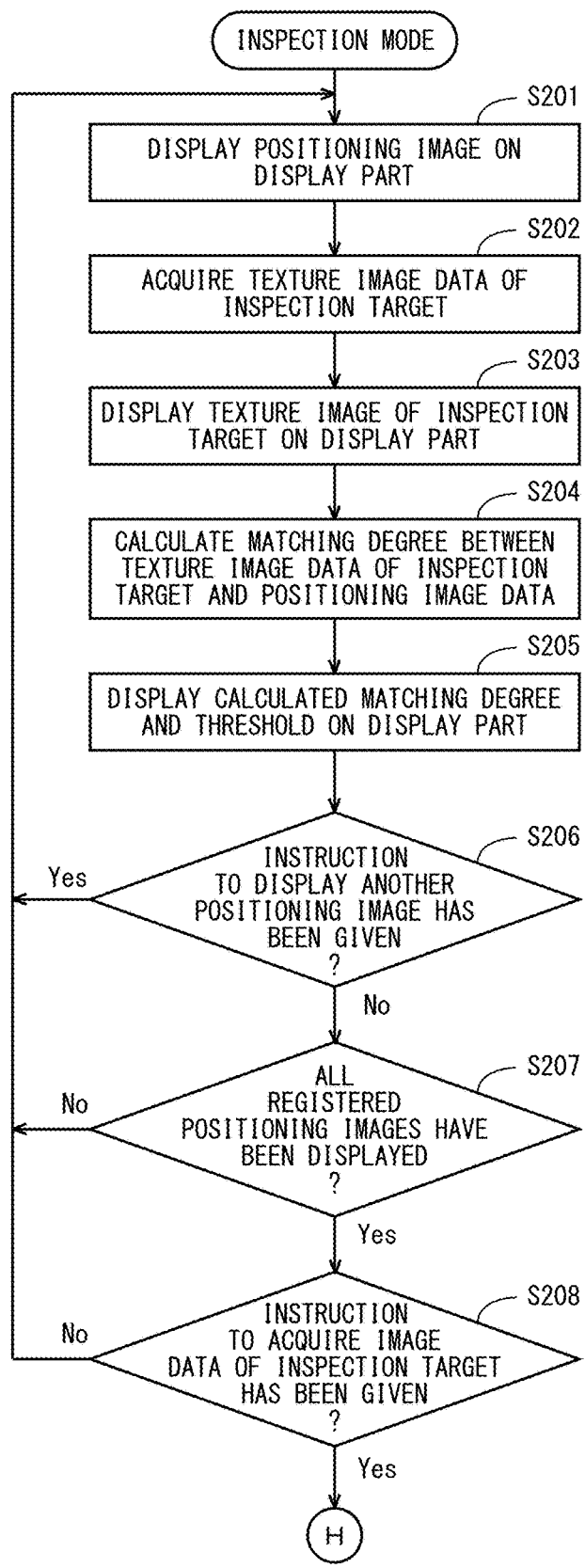
FIG. 46 is a flowchart showing control operation of the CPU in the inspection mode.
Figure 47:
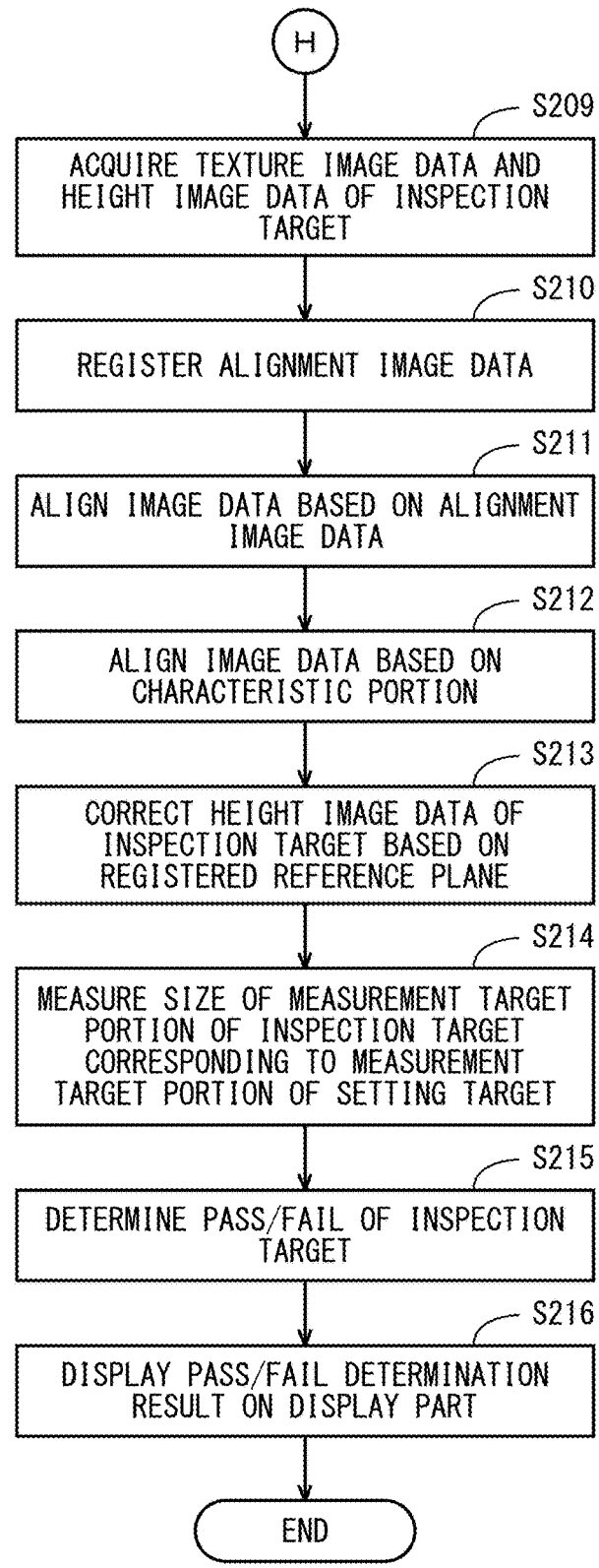
FIG. 47 is a flowchart showing control operation of the CPU in the inspection mode.

FIGS. 46 and 47 are flowcharts showing the control operation of the CPU 210 in the inspection mode. By the inspection operator specifying any inspection setting file, the processing of FIGS. 46 and 47 is performed based on inspection setting information of the specified inspection setting file.

First, the CPU 210 gives a command to the display part 400, to display a positioning image on the display part 400 based on one piece of positioning image data of the one or more pieces of registered positioning image data (Step S201). The inspection operator places the inspection target S on the stage 141.

With the inspection target S placed on the stage 141, the CPU 210 gives a command to the measuring part 100 and the control part 300 to acquire texture image data, thereby acquiring texture image data of the inspection target S (Step S202). The CPU 210 gives a command to the display part 400, to display a texture image of the inspection target S in the display part 400 based on the acquired texture image data (Step S203).

Here, the positioning image and the texture image of the inspection target S are displayed on the display part 400. This enables the inspection operator to adjust the position and the posture of the inspection target S placed on the stage 141 while viewing the positioning image and the texture image of the inspection target S. Hence the inspection operator can bring the position and the posture of the inspection target S close to the position and the posture of the setting target S.

Further, the CPU 210 calculates a matching degree between the positioning image data and the texture image data of the inspection target S (Step S204). By giving a command to the display part 400, the CPU 210 displays the calculated matching degree and a threshold concerning the matching degree on the display part 400 (Step S205). In the above specific example, the matching degree and the threshold are displayed by the matching degree indicator 512 of FIGS. 29 to 31. By viewing the matching degree displayed on the display part 400, the inspection operator can easily bring the position and the posture of the inspection target S close to the position and the posture of the setting target S at the time of placing the inspection target S on the stage 141. Further, by viewing the threshold concerning the matching degree displayed on the display part 400, the inspection operator can recognize a permissible degree at the time of bringing the position and the posture of the inspection target S close to the position and the posture of the setting target S.

Subsequently, the CPU 210 determines whether or not an instruction to display another positioning image has been given (Step S206). By operating the operation part 250, the inspection operator can instruct the CPU 210 on whether or not to display another positioning image. When the instruction to display another positioning image is given, the CPU 210 returns to the processing of Step S201.

When the instruction to display another positioning image is not given, the CPU 210 determines whether or not positioning images based on all the registered pieces of positioning image data have been displayed on the display part 400 (Step S207). When all the positioning images have not been displayed, the CPU 210 returns to the processing of Step S200. On the other hand, when all the positioning images have been displayed, the CPU 210 determines whether or not an instruction to acquire image data of the inspection target S has been given (Step S208). By operating the operation part 250, the setting creator can instruct the CPU 210 to acquire the image data of the inspection target S. When the instruction to acquire the image data of the inspection target S has not been given, the CPU 210 returns to the processing of Step S201.

According to the above flow, when a plurality of positioning images are registered, the processing of Steps S201 to S207 is repeated until all the positioning images are displayed. Thereby, the inspection operator can adjust the position and the posture of the inspection target S in stages by use of the plurality of positioning images.

When the instruction to acquire the image data of the inspection target S is given, the CPU 210 gives a command to the measuring part 100 and the control part 300, to sequentially acquire texture image data and height image data of the inspection target S (Step S209). Next, of the acquired texture image data and height image data of the inspection target S, the CPU 210 registers image data corresponding to the registered reference image data as alignment image data (Step S210).

Subsequently, based on the set alignment image data, the CPU 210 aligns the texture image data and the height image data of the inspection target S (Step S211). Specifically, the CPU 210 aligns the alignment data to the reference image data by pattern matching, to align the texture image data and the height image data of the inspection target S. When the search area or the search angle is set, pattern matching is performed within the search area or within the search angle.

Thereafter, based on the registered characteristic portion of the image data, the CPU 210 aligns in detail the texture image data and the height image data of the inspection target S (Step S212). When the characteristic portion of the reference image is not registered in the setting mode, the processing of Step S211 is omitted. Next, the CPU 210 corrects the height image data of the inspection target S based on the registered reference plane (Step S213). When the reference plane is not registered in the setting mode, the processing of Step S213 is omitted.

Subsequently, the CPU 210 measures the size of the measurement target portion of the inspection target S which corresponds to the registered measurement target portion of the setting target S (Step S214). Thereafter, the CPU 210 determines Pass/Fail of the inspection target S based on the size measured concerning the setting target S, the size measured concerning the inspection target S, and the accepted design value or tolerance (Step S215). When one of the design value and the tolerance has been omitted in the setting mode, the CPU 210 determines Pass/Fail of the inspection target S based on the size measured concerning the setting target S, the size measured concerning the inspection target S, and the other of the design value and tolerance accepted. By giving a command to the display part 400, the CPU 210 displays a determination result on the display part 400 (Step S216). Thereby, the CPU 210 completes the inspection mode. When completing the inspection mode, the CPU 210 stores the data file of the above determination result and the like into the storage device 240 as the inspection result file.

(7) Effects

In the image inspection device 500 according to the present embodiment, in the setting mode, the positioning image data showing the position and the posture of the setting target S is registered. The positioning image based on the positioning image data shows the position and the posture of the setting target S. In the setting mode, the positioning image data can be acquired in a state where the setting creator has adjusted the position and the posture of the setting target S so as to prevent generation of a shade, multiple reflection of light, and the like in the measurement target portion of the setting target S.

In the inspection mode, the texture image data of the inspection target S is acquired, and the texture image of the inspection target S based on the texture image data is displayed on the display part 400 along with the positioning image. Thus, by viewing the texture image of the inspection target S and the positioning image displayed on the display part 400, the inspection operator can bring the position and the posture of the inspection target S close to the position and the posture of the setting target S at the time of placing the inspection target S on the stage 141. Accordingly, even when the inspection operator is not a skilled operator, the position and the posture of the inspection target S can be adjusted so as to prevent generation of a shade, multiple reflection of light, and the like in the measurement target portion of the inspection target S in the inspection mode.

Further, the texture image data and the height image data concerning the inspection target S which are acquired in the inspection mode are aligned with high accuracy to the texture image data and the height image data concerning the setting target S which are acquired in the setting mode. Hence the size of the measurement target portion of the inspection target S, which corresponds to the measurement target portion of the setting target S measured in the setting mode, can be measured with high accuracy in the inspection mode. Accordingly, even when the inspection operator is not a skilled operator, a size of a desired measurement target portion can be measured concerning a plurality of inspection targets S in the inspection mode. As a result, it is possible to easily and accurately inspect the shape of the inspection target S.

(8) Other Embodiments (8-1) In the above embodiment, after the texture image data and the height image data of the setting target S are acquired in the setting mode, the image data to be used for registering the reference image data is selected, but the present invention is not restricted thereto. The selection of the image data to be used for registering the reference image data may be performed before the texture image data and the height image data are acquired. In this case, in the image inspection device 500, only the image data selected at the time of registration of the reference image data may be acquired as the reference image data.

(8-2) In the above embodiment, the texture image data and the height image data are acquired by operation of the measurement buttons 432, 513, the reference image data, the alignment image data and the positioning image data are registered based on the acquired texture image data and height image data, and the image data to be used for registering the characteristic portion is then selected, to measure the measurement target portion of the measurement target S. However, the present invention is not restricted thereto.

Image data may be acquired for each processing of the registration processing for the reference image data, the registration processing for the alignment image data, the registration processing for the positioning image data, the selection processing for the image data to be used for registering the characteristic portion, and the measurement processing for the measurement target portion of the measurement target S.

For example, when it is previously known that the texture image data is to be registered as the reference image data, only the texture image data of the measurement target S may be acquired at the time of the registration processing for the reference image data. Further, when only the size in the height direction of the measurement target S is to be measured, only the height image data of the measurement target S may be acquired at the time of the measurement processing for the measurement target portion of the measurement target S.

(8-3) In the above embodiment, the texture image data and the height image data are acquired for measuring the measurement target portion of the measurement target S, but the present invention is not restricted thereto. For example, when only the size in the height direction of the measurement target S is to be measured, only the height image data may be acquired as the image data for measuring the size of the measurement target portion.

(8-4) In the above embodiment, the texture image data and the height image data are generated by use of the common light reception part 120, but the present invention is not restricted thereto. The texture image data and the height image data may be generated by use of separate light reception parts. In this case, the image inspection device 500 is provided with a storage part for storing the texture image data generated by one light reception part in association with the height image data generated by the other light reception part. The storage part may be provided in the one light reception part or may be provided in the other light reception part. Alternatively, the storage part may be executed by the storage device 240 of the PC 200.

(8-5) In the above embodiment, one of the texture image data and the height image data of the setting target S acquired in the setting mode is selected by the setting creator as the reference image data, but the present invention is not restricted thereto. The selection of the image data used as the reference image data may be performed by the CPU 210 in accordance with a predetermined condition instead of being performed based on operation of the image selection operation part 461 by the setting creator.

As the predetermined condition, for example, there is stored into the storage device 240 a condition that, of the acquired texture image data and height image data, image data having a larger edge detected amount is used as the reference image data. The CPU 210 selects image data appropriate for alignment in accordance with the condition stored in the storage device 240. In this case, an unskilled setting creator is prevented from erroneously selecting image data not appropriate for alignment.

(8-6) In the above embodiment, the texture image data of the setting target S is used as the positioning image data, but the present invention is not restricted thereto. The positioning image data may be different from the texture image data to be used for measuring the size of the measurement target portion of the setting target S. For example, the height image data of the setting target S may be used as the positioning image data. Further, texture image data or height image data obtained by capturing an image of an object different from the setting target S may be used as the positioning image data.

(8-7) In the inspection mode of the above embodiment, the positioning image for allowing the inspection operator to adjust the position and the posture of the inspection target S is displayed in the display part 400 based on the positioning image data, but the present invention is not restricted thereto. In the inspection mode, a positioning image may not be displayed on the display part 400 based on the positioning image data.

For example, in the inspection mode, the stage 141 may be moved by the stage drive part 143 based on the positioning image data. In this case, based on the positioning image data and the texture image data of the inspection target S placed on the stage 141, the stage 141 is automatically moved such that the position and the posture of the inspection target S get close to the position and the posture of the setting target S. This eliminates the need for the inspection operator to adjust the position and the posture of the inspection target S.

Figure 48:
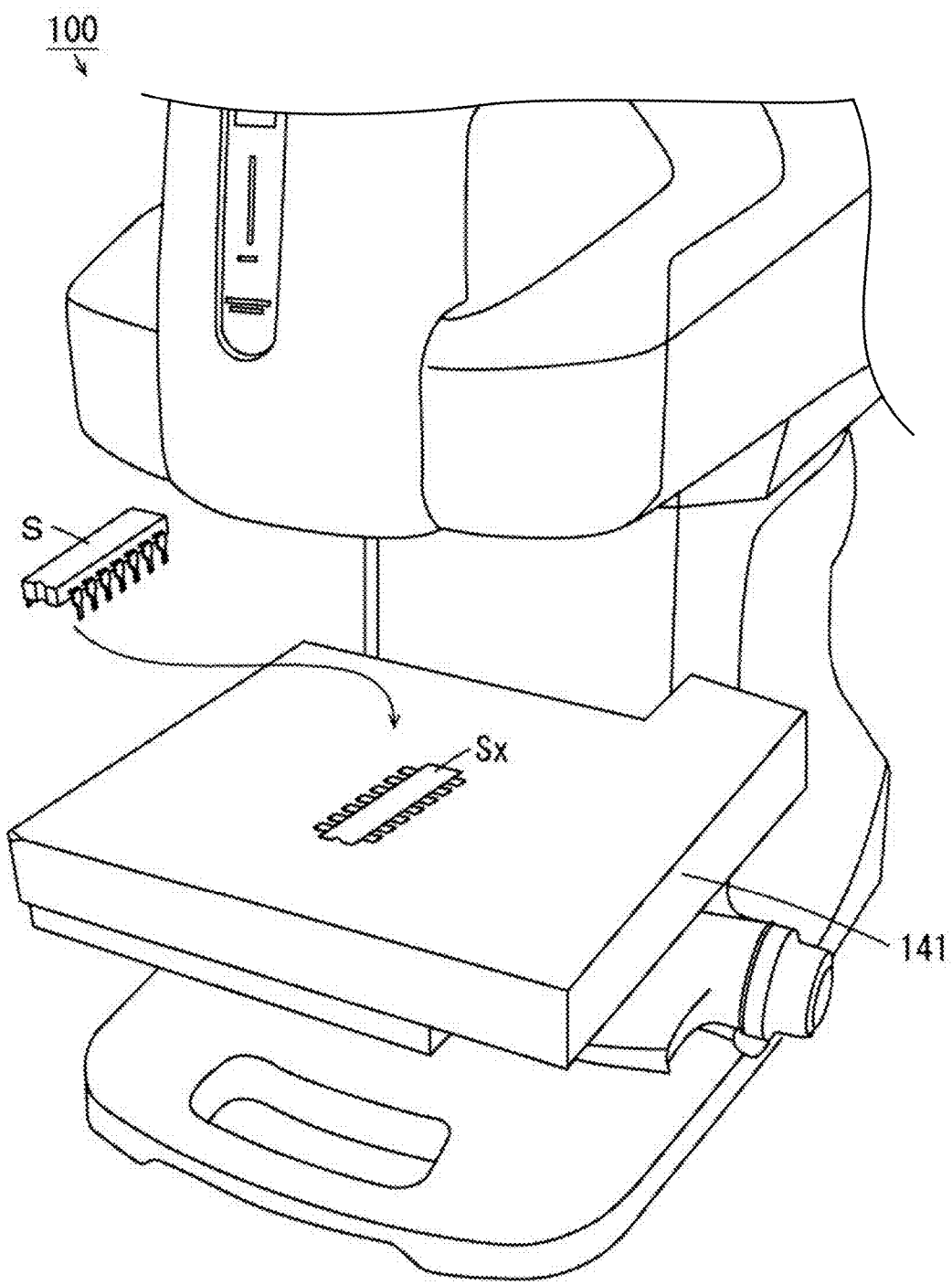
FIG. 48 is a view showing one example of video guidance based on positioning image data.

Alternatively, in the inspection mode, audio guidance or video guidance for the inspection operator to adjust the position and the posture of the inspection target S may be performed based on the positioning image data. FIG. 48 is a view showing one example of the video guidance based on the positioning image data. As a projector, the pattern generation part 112 of the light projection part 110 can project a video image to the stage 141 by use of the measurement light. Then, as shown in FIG. 48, in the inspection mode, a plane video image Sx of the measurement target S may be projected to the stage 141 based on the positioning image data. By placing the measurement target S on the stage 141 so as to overlap the plane video image Sx, the inspection operator can adjust the position and the posture of the inspection target S.

Figure 49:
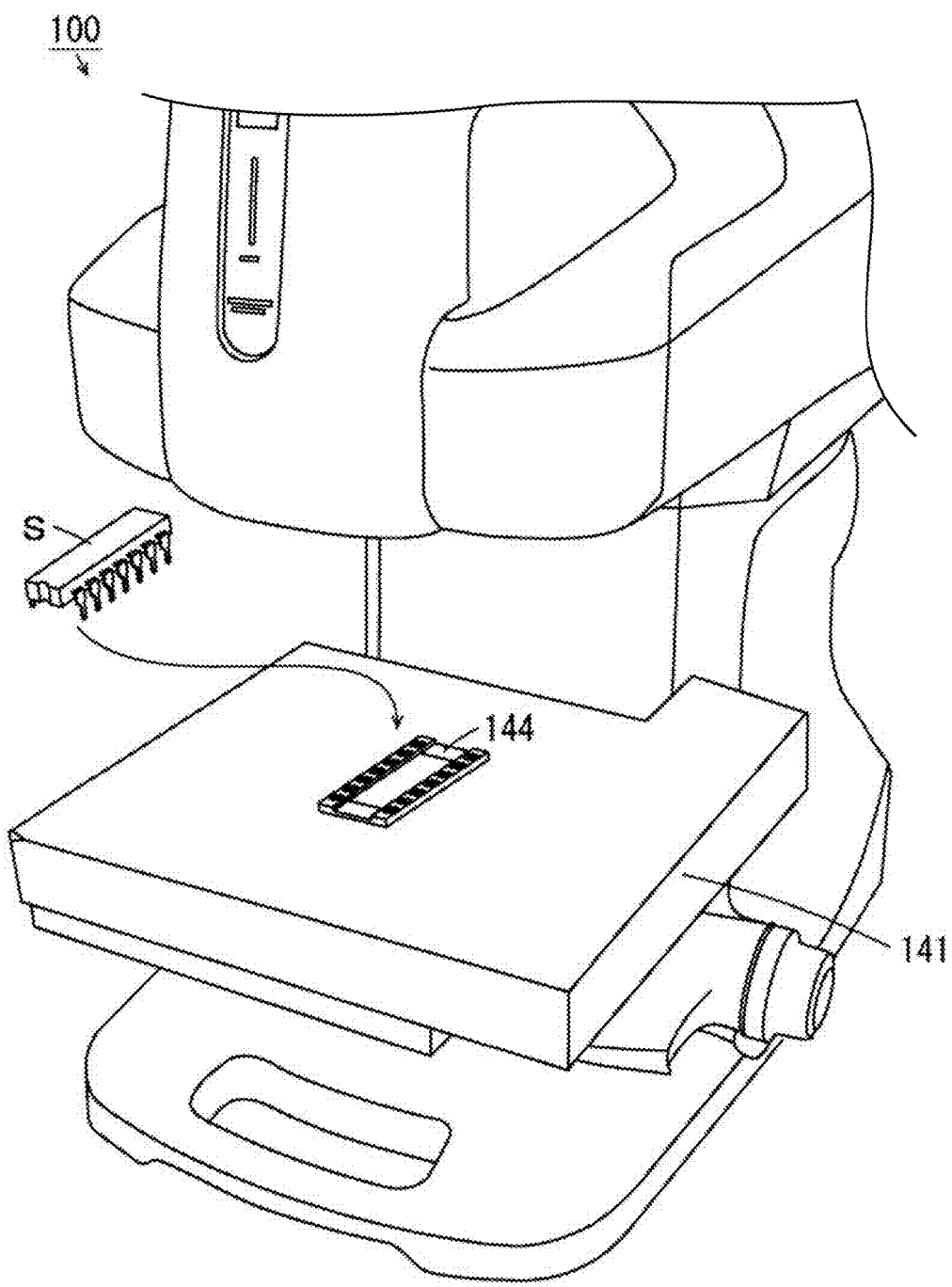
FIG. 49 is a diagram showing an example where a jig for positioning the measurement target is provided on the stage.

Alternatively, a jig may be provided on the stage 141. FIG. 49 is a diagram showing an example where a jig for positioning the measurement target S is provided on the stage 141. As shown in FIG. 49, a jig 144 is fixed at the substantially center of the stage 141. The measurement target S can be inserted into the jig 144. In the setting mode, the setting creator inserts the setting target S into the jig 144 in a state where the position and the posture of the setting target S have been adjusted. In the inspection mode, by inserting the inspection target S into the jig 144, the inspection operator can adjust the position and the posture of the inspection target S. In this case, the positioning image data may not be registered in the setting mode.

(8-8) In the above embodiment, in the inspection mode, the positioning image is displayed in the translucent state on the main display field 411, but the present invention is not restricted thereto. The positioning image may be displayed in an area different from the display area of the texture image that is displayed in the main display field 411. For example, the positioning image may be displayed in the side sub-display field 413. Also in this case, the inspection operator can adjust the position and the posture of the inspection target S while viewing the positioning image.

(8-9) In the above embodiment, in the same image inspection device 500, inspection setting information is generated in the setting mode and the inspection target S is inspected based on the inspection setting information in the inspection mode. However, the present invention is not restricted thereto. For example, inspection setting information generated in the setting mode in one image inspection device 500 may be stored into the storage device 240 of the other image inspection device 500. In this case, the inspection target S may be inspected in the inspection mode of the other image inspection device 500 by use of the inspection setting information generated in the one image inspection device 500.

(8-10) In the above embodiment, it is configured such that the measurement head 100H is fixed and the stage 141 moves relatively to the measurement head 100H, but the present invention is not restricted thereto. For example, the stage 141 may be fixed, and the measurement head 100H may move relatively to the stage 141.

(8-11) In the above embodiment, the image inspection device 500 generates height image data based on the triangular ranging system, but the present invention is not restricted thereto. The image inspection device 500 may generate height image data based on another method.

For example, the image inspection device 500 may generate height image data by generating image data while changing a distance between the measurement target S and the light reception part 120, and synthesizing image data of a portion in focus on the measurement target S. In this case, the measurement head 100H may be formed of a single focus type optical system, a confocal type optical system, or a light interference type optical system.

(9) Corresponding Relation Between Each Constituent of Claims and Each Part of Embodiment Hereinafter, examples of the correspondence between each constituent of the claims and each part of the embodiment will be described, but the present invention is not restricted to the following examples.

In the above embodiment, the measurement target S, the setting target S and the inspection target S are examples of the measurement target. The stage 141 is an example of the stage. The light reception part 120, the illumination light output part 130, the control board 310, and the illumination light source 320 are examples of the first image data acquisition unit. The light projection part 110, the light reception part 120 and the control board 310 are examples of the second image data acquisition unit. The CPU 210 is an example of the control unit and the processing device. The display part 400 is an example of the display unit. The operation part 250 and the display part 400 are examples of the first to fourth operation units. The image inspection device 500 is an example of the image inspection device.

The acquisition command part 210B is an example of the first to sixth acquisition command units. The registration part 210A is an example of the first to fourth registration unit. The measurement part 210D is an example of the first and second measurement units. The acceptance part 210E is an example of the acceptance unit. The display command part 210C is an example of the first to fifth display command units. The alignment part 210G is an example of the alignment unit. The determination part 210H is an example of the determination unit. The matching degree calculation part 210F is an example of the matching degree calculation unit.

A variety of other constituents having the configuration or the function recited in the claims may be used as the constituents of the claims.

The present invention can be effectively used for inspection of sizes of a variety of targets.

What is claimed is:

1. An image inspection device comprising:
   a camera;
   a stage on which a measurement target is to be placed;
   a first image data acquisition part which acquires, by the camera, first image data representing a texture image of the surface of the measurement target placed on the stage;
   a second image data acquisition part which acquires, by the camera, second image data representing a height image of the surface of the measurement target placed on the stage;
   a controller which performs control operation in a setting mode to make setting for inspection and in an inspection mode to perform inspection; and
   a display,
   wherein the controller includes in the setting mode,
      a first acquisition command part which gives a command to the first or second image data acquisition part to acquire first or second image data for positioning in a state where a setting target is placed on the stage,
      a first registration part providing positioning image data showing a position and a posture of the setting target based on the command of the first acquisition command part,
      a second acquisition command part providing a command to the first or second image data acquisition part to acquire first or second image data for alignment in the state where the setting target is placed on the stage,
      a second registration part providing as reference image data the image data for alignment which is acquired by the command of the second acquisition command part, a third acquisition command part providing a command to the second image data acquisition part to acquire second image data for measurement in the state where the setting target is placed on the stage, a first measurement part which measures a size in a height direction of a measurement target portion of the setting target based on the second image data for measurement, an acceptance part which accepts input of at least either value of a design value or a tolerance of the measurement target portion of the setting target, in the inspection mode, a first display command part which gives a command to the display to display a positioning image based on the positioning image data, a fourth acquisition command part which gives a command to the first or second image data acquisition part to acquire first or second image data for positioning in a state where an inspection target is placed on the stage, a second display command part which gives a command to the display to display an image based on the image data for positioning which is acquired in the inspection mode, a fifth acquisition command part which gives a command to the first or second image data acquisition part to acquire image data for alignment which corresponds to the reference image data after the command by the first and second display command parts, a third registration part which registers, as alignment image data, the image data for alignment in the inspection mode, a sixth acquisition command part which gives a command to the second image data acquisition part to acquire second image data for measurement in the state where the inspection target is placed on the stage, an alignment part which aligns the second image data acquired by the command of the sixth acquisition command part by alignment of the alignment data and the reference image data with pattern matching, a second measurement part which measures a size of a measurement target place of the inspection target which corresponds to a measurement target place of the setting target based on the second image data for measurement, a determination part which determines Pass/Fail of the inspection target based on the size measured by the first measurement part, the size measured by the second measurement part, and at least either value of the design value or the tolerance accepted by the acceptance part, and a third display command part which gives a command to the display to display the determination result determined by the determination part.

2. The image inspection device according to claim 1, wherein the first registration part registers a plurality of pieces of positioning image data respectively showing a plurality of portions of the setting target, or a plurality of pieces of positioning image data with mutually different magnifications, in the setting mode.

3. The image inspection device according to claim 2, further comprising:

a first operation part that is operated for sequentially displaying on the display a plurality of positioning images registered by the first registration part, wherein the first display command part gives a command to the display to sequentially display positioning images based on the plurality of pieces of positioning image data registered by the first registration part on the basis of operation of the first operation part in the inspection mode.

4. The image inspection device according to claim 1, wherein the controller further includes a matching degree calculation part which calculates a matching degree between the positioning image data registered by the first registration part and the image data for positioning which is acquired by the command of the fourth acquisition command part in the inspection mode, and a fourth display command part which gives a command to the display to display a result of calculation by the matching degree calculation part in the inspection mode.

5. The image inspection device according to claim 4, wherein the fourth display command part gives a command to the display to display information showing a threshold concerning a predetermined matching degree.

6. The image inspection device according to claim 1, wherein the fourth acquisition command part gives a command to the first image data acquisition part to acquire, as live image data, first image data showing a temporal change of the inspection target placed on the stage in the inspection mode, and the second display command part gives a command to the display to display a live image overlapped with a positioning image in the inspection mode, the live image showing the temporal change of the inspection target based on the live image data acquired by the command of the fourth acquisition command part.

7. The image inspection device according to claim 1, wherein the second acquisition command part gives commands respectively to the first and second image data acquisition parts to acquire first and second image data in the state where the setting target is placed on the stage in the setting mode, the image inspection device further comprises a second operation part which is operated for selecting either the first or second image data acquired by the command of the second acquisition command part, and the second registration part registers, as the reference image data, image data selected by operation of the second operation part in the setting mode.

8. The image inspection device according to claim 7, wherein the controller further includes a fifth display command part which gives a command to the display to display at least one of a texture image based on the first image data and a height image based on the second image data acquired by the command of the second acquisition command part in the setting mode.

9. The image inspection device according to claim 1, further comprising:

a third operation part that is operated for specifying a search range for pattern matching, wherein the alignment part aligns the alignment image data to the reference image data by pattern matching within the search range specified by operation of the third operation part in the inspection mode.

10. The image inspection device according to claim 1, wherein the first and second image data acquisition parts are disposed so as to respectively acquire the first and second image data from a common axis.

11. The image inspection device according to claim 1, further comprising:
a fourth operation part that is operated for specifying any reference plane in the second image data acquired by the second image data acquisition part,
wherein
the controller further includes a fourth registration part which registers the reference plane specified by operation of the fourth operation part in the setting mode, and
the second image data acquisition part corrects the acquired second image data such that a position of each portion on the surface of the measurement target represents a distance from the reference plane registered by the fourth registration part in a direction orthogonal to the reference plane.

12. An image inspection method comprising the steps of:
acquiring first image data representing a texture image of the surface of a setting target, or second image data representing a height image of the surface of the setting target, as image data for positioning in a state where the setting target is placed as a measurement target on a stage in a setting mode;
registering positioning image data showing a position and a posture of the setting target based on the acquired image data for positioning in the setting mode,
acquiring first or second image data for alignment in the state where the setting target is placed on the stage in the setting mode,
registering as reference image data the acquired image data for alignment in the setting mode,
acquiring second image data for measurement in the state where the setting target is placed on the stage in the setting mode,
measuring a size in a height direction of a measurement target portion of the setting target based on the acquired second image data for measurement in the setting mode,
accepting input of at least either value of a design value or a tolerance of the measurement target portion of the setting target in the setting mode,
moving the stage or an inspection target to a position where second image data representing a height image of the surface of the inspection target can be acquired based on the registered positioning image data in a state where the inspection target is placed as the measurement target on the stage in an inspection mode,
acquiring image data for alignment which corresponds to the registered reference image data after movement of the stage or the inspection target in the state where the inspection target is placed on the stage in the inspection mode,
registering the acquired image data for alignment as alignment image data in the inspection mode,
acquiring second image data for measurement in the state where the inspection target is placed on the stage in the inspection mode,
aligning the second image data for measurement concerning the inspection target by alignment of the alignment data and the reference image data by pattern matching in the inspection mode,
measuring a size of a measurement target place of the inspection target which corresponds to a measurement target place of the setting target based on the aligned second image data for measurement in the inspection mode,
determining Pass/Fail of the inspection target based on the size measured concerning the setting target, the size measured concerning the inspection target, and at least either value of the design value or tolerance accepted in the inspection mode, and
displaying the determined determination result on a display in the inspection mode.

13. The image inspection method according to claim 12, wherein the step of moving the stage or the inspection target includes
displaying a positioning image on the display based on the registered positioning image data in the inspection mode,
acquiring first or second image data for positioning in the state where the inspection target is placed on the stage in the inspection mode,
displaying an image on the display based on the acquired image data for positioning in the inspection mode, and
accepting movement of the stage or the inspection target after the positioning image and the image based on the image data for positioning are displayed in the inspection mode.

14. A non-transitory computer readable medium storing a program to cause a computer to execute image inspection method comprising the steps of:
acquiring first image data representing a texture image of the surface of a setting target, or second image data representing a height image of the surface of the setting target, as image data for positioning in a state where the setting target is placed as a measurement target on a stage in a setting mode;
registering positioning image data showing a position and a posture of the setting target based on the acquired image data for positioning in the setting mode,
acquiring first or second image data for alignment in the state where the setting target is placed on the stage in the setting mode,
registering as reference image data the acquired image data for alignment in the setting mode,
acquiring second image data for measurement in the state where the setting target is placed on the stage in the setting mode,
measuring a size in a height direction of a measurement target portion of the setting target based on the acquired second image data for measurement in the setting mode,
accepting input of at least either value of a design value or a tolerance of the measurement target portion of the setting target in the setting mode,
moving the stage or an inspection target to a position where second image data representing a height image of the surface of the inspection target can be acquired based on the registered positioning image data in a state where the inspection target is placed as the measurement target on the stage in an inspection mode,
acquiring image data for alignment which corresponds to the registered reference image data after movement of the stage or the inspection target in the state where the inspection target is placed on the stage in the inspection mode,
registering the acquired image data for alignment as alignment image data in the inspection mode,
acquiring second image data for measurement in the state where the inspection target is placed on the stage in the inspection mode, aligning the second image data for measurement concerning the inspection target by alignment of the alignment data and the reference image data by pattern matching in the inspection mode, measuring a size of a measurement target place of the inspection target which corresponds to a measurement target place of the setting target based on the aligned second image data for measurement in the inspection mode, determining Pass/Fail of the inspection target based on the size measured concerning the setting target, the size measured concerning the inspection target, and at least either value of the design value or tolerance accepted in the inspection mode, and displaying the determined determination result on a display in the inspection mode.

15. The non-transitory computer readable medium according to claim 14, wherein the processing of moving the stage or the inspection target includes displaying a positioning image on the display based on the registered positioning image data in the inspection mode, acquiring first or second image data for positioning in the state where the inspection target is placed on the stage in the inspection mode, displaying an image on the display unit based on the acquired image data for positioning in the inspection mode, and accepting movement of the stage or the inspection target after the positioning image and the image based on the image data for positioning are displayed in the inspection mode.

* * * * *